(12) United States Patent
Cho et al.

(10) Patent No.: US 10,708,396 B2
(45) Date of Patent: Jul. 7, 2020

(54) MOBILE TERMINAL HAVING CARD UNIT AND METHOD FOR CONTROLLING SAME

(71) Applicant: LG ELECTRONICS INC., Seoul (KR)

(72) Inventors: Taehoon Cho, Seoul (KR); Jie Seol, Seoul (KR); Hyunseok Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 15/753,706

(22) PCT Filed: Aug. 20, 2015

(86) PCT No.: PCT/KR2015/008700
§ 371 (c)(1),
(2) Date: Feb. 20, 2018

(87) PCT Pub. No.: WO2017/030223
PCT Pub. Date: Feb. 23, 2017

(65) Prior Publication Data
US 2018/0241856 A1    Aug. 23, 2018

(51) Int. Cl.
*G09G 5/00* (2006.01)
*H04M 1/02* (2006.01)
*G06Q 20/40* (2012.01)
*G06Q 20/34* (2012.01)
*G06Q 20/32* (2012.01)
*G06K 19/00* (2006.01)
(Continued)

(52) U.S. Cl.
CPC .......... *H04M 1/026* (2013.01); *G06F 1/1658* (2013.01); *G06F 3/016* (2013.01); *G06F 3/0412* (2013.01); *G06F 3/0416* (2013.01); *G06F 3/0482* (2013.01); *G06F 21/32* (2013.01); *G06K 9/00087* (2013.01); *G06K 19/005* (2013.01); *G06Q 20/227* (2013.01);
(Continued)

(58) Field of Classification Search
CPC ...... H04M 1/026; G06F 1/1658; G06F 3/016; G06F 3/0412; G06F 3/0416; G06F 3/0482; G06F 21/32; G06K 9/00087; G06K 19/005; G06Q 20/227; G06Q 20/3224; G06Q 20/3226; G09G 5/003
USPC .......................... 345/169, 173; 234/379, 380
See application file for complete search history.

(56) References Cited

U.S. PATENT DOCUMENTS 8,511,548 B1 *   8/2013   Mori ................ G06K 19/06206
                                                   235/379
9,459,794 B1 *  10/2016   Soegiono ............ G06F 3/04883
(Continued)

FOREIGN PATENT DOCUMENTS

CN          101517592 A       8/2009
CN          202475507 U      10/2012
(Continued)

*Primary Examiner* — Jennifer T Nguyen
(74) *Attorney, Agent, or Firm* — Birch, Stewart, Kolasch & Birch, LLP

(57) ABSTRACT

The present invention provides a mobile terminal comprising: a body; a display unit, formed on one surface of the body, for displaying screen information comprising at least one item of content item corresponding to at least one piece of card information; a card module withdrawable from the body; and a control unit for selecting at least one item of content item according to a touch applied on the screen information and applying at least one piece of card information corresponding to the selected item of content to the card module.

19 Claims, 52 Drawing Sheets

(51) Int. Cl.
*G06Q 20/22* (2012.01)
*G07F 7/08* (2006.01)
*G06F 1/16* (2006.01)
*G06F 3/01* (2006.01)
*G06F 3/041* (2006.01)
*G06F 3/0482* (2013.01)
*G06F 21/32* (2013.01)
*G06K 9/00* (2006.01)

(52) U.S. Cl.
CPC ..... *G06Q 20/3224* (2013.01); *G06Q 20/3226* (2013.01); *G06Q 20/3227* (2013.01); *G06Q 20/3278* (2013.01); *G06Q 20/347* (2013.01); *G06Q 20/3572* (2013.01); *G06Q 20/40145* (2013.01); *G07F 7/082* (2013.01); *H04M 2250/04* (2013.01); *H04M 2250/14* (2013.01); *H04M 2250/22* (2013.01)

(56) References Cited

U.S. PATENT DOCUMENTS

| | | |
|---|---|---|
| 2003/0045328 A1 | 3/2003 | Natsuno |
| 2008/0017721 A1 | 1/2008 | Zehnacker |
| 2008/0126260 A1 | 5/2008 | Cox et al. |
| 2012/0270528 A1 | 10/2012 | Goodman |
| 2014/0084059 A1 | 3/2014 | Sierchio et al. |
| 2014/0279565 A1 | 9/2014 | Trump et al. |
| 2015/0170210 A1* | 6/2015 | Rhee .............. G06Q 30/0241 705/14.64 |
| 2015/0229754 A1* | 8/2015 | Won ................. G06F 1/165 455/575.8 |
| 2015/0346994 A1* | 12/2015 | Chanyontpatanakul ............... G06F 3/0482 715/828 |
| 2019/0114623 A1* | 4/2019 | Wurmfeld ......... G06K 19/0723 |

FOREIGN PATENT DOCUMENTS

| | | |
|---|---|---|
| CN | 103152468 A | 6/2013 |
| CN | 104834353 A | 8/2015 |
| KR | 10-2009-0115926 A | 11/2009 |
| KR | 10-2013-0063323 A | 6/2013 |
| KR | 10-2014-0026263 A | 3/2014 |
| KR | 10-2014-0126786 A | 11/2014 |

* cited by examiner

MOBILE TERMINAL HAVING CARD UNIT AND METHOD FOR CONTROLLING SAME

CROSS REFERENCE TO RELATED APPLICATIONS

This application is the National Stage filing under 35 U.S.C. 371 of International Application No. PCT/KR2015/008700, filed on Aug. 20, 2015, which is hereby expressly incorporated by reference into the present application.

TECHNICAL FIELD

The present disclosure relates to a mobile terminal having a card unit available for payment.

BACKGROUND ART

A mobile terminal includes every device which has a battery and a display unit 151, outputs information to the display unit 151 using power supplied from the battery, and is formed to allow a user to carry it. The mobile terminal includes a device for recording and playing back video, a device for displaying a graphic user interface (GUI), and the like, and includes a notebook computer, a mobile phone, and glasses, a watch, a game player, and the like, capable of displaying screen information.

As functions of mobile terminals are diversified, mobile terminals are implemented as multimedia players having multiple functions such as capturing images and video, playing music or a video file, playing games, receiving broadcasts, and the like. In order to support and enhance the functionality of mobile terminals, improvement of structural and/or software parts of mobile terminals may be considered.

In recent years, technologies for storing information regarding a card have been developed for the convenience of users who have various payment devices (i.e., means for payment or payment means), but a payment function is performed in a manner different from the use of an actual card. In addition, payment using stored card information is weak in security due to loss of a mobile terminal, and the like, and payment based on a plurality of pieces of card information is to undergo a payment process several times.

DISCLOSURE

Technical Problem

An aspect of the present disclosure provides a mobile terminal including a card module capable of enhancing a security state of information of a card stored therein and allowing a user to more conveniently use the card module.

Technical Solution

According to an aspect of the present disclosure, there is provided a mobile terminal including: a terminal body; a memory storing at least one piece of card information; a display unit provided on one surface of the terminal body and displaying screen information including at least one content item corresponding to the at least one piece of card information; a card module provided to be withdrawable from the terminal body; and a controller selecting at least one content item based on a touch applied to the screen information and applying at least one piece of card information corresponding to the selected content item to the card module. Accordingly, a user may apply desired card information to a card module having a physically withdrawable structure to perform a payment function.

According to an embodiment, when user authentication is completed based on a sensed fingerprint in a state in which the card module is received in the terminal body, a portion of the card module may be drawn out to the outside, whereby only a designated user may use the card module, enhancing security.

According to an embodiment, the card module may be separated (i.e., detached or removed) from the terminal body in a state in which card information is applied thereto, and when the card module is separated, a payment function may be partially limited, and thus, security may be strengthened, while enhancing convenience of card use.

According to an embodiment, since a recommended content item is output based on a location of the terminal body, the user may perform a payment function using desired card information, without having to retrieve required card information among a plurality of pieces of stored card information.

According to an embodiment, since a region of the cover covering the display unit installed in the terminal body includes a payment module for performing a payment function, an additional card module is not required, resulting in a thinner terminal body.

Advantageous Effects

According to the present invention, the user may perform a payment function by applying desired card information to a card module having a physically withdrawable structure, eliminating the necessity of a separate card having different card information. Also, since the card module can be brought into contact with a payment device, the user may feel as if he uses an actual card.

In addition, since the card module is drawn out through user authentication, when the card module is separated, a payment function may be limited by selecting authentication information to be applied, whereby security of using the card module using card information may be strengthened.

Since a plurality of pieces of card information can be applied to the card module, a plurality of payment steps are unnecessary.

BEST MODES

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
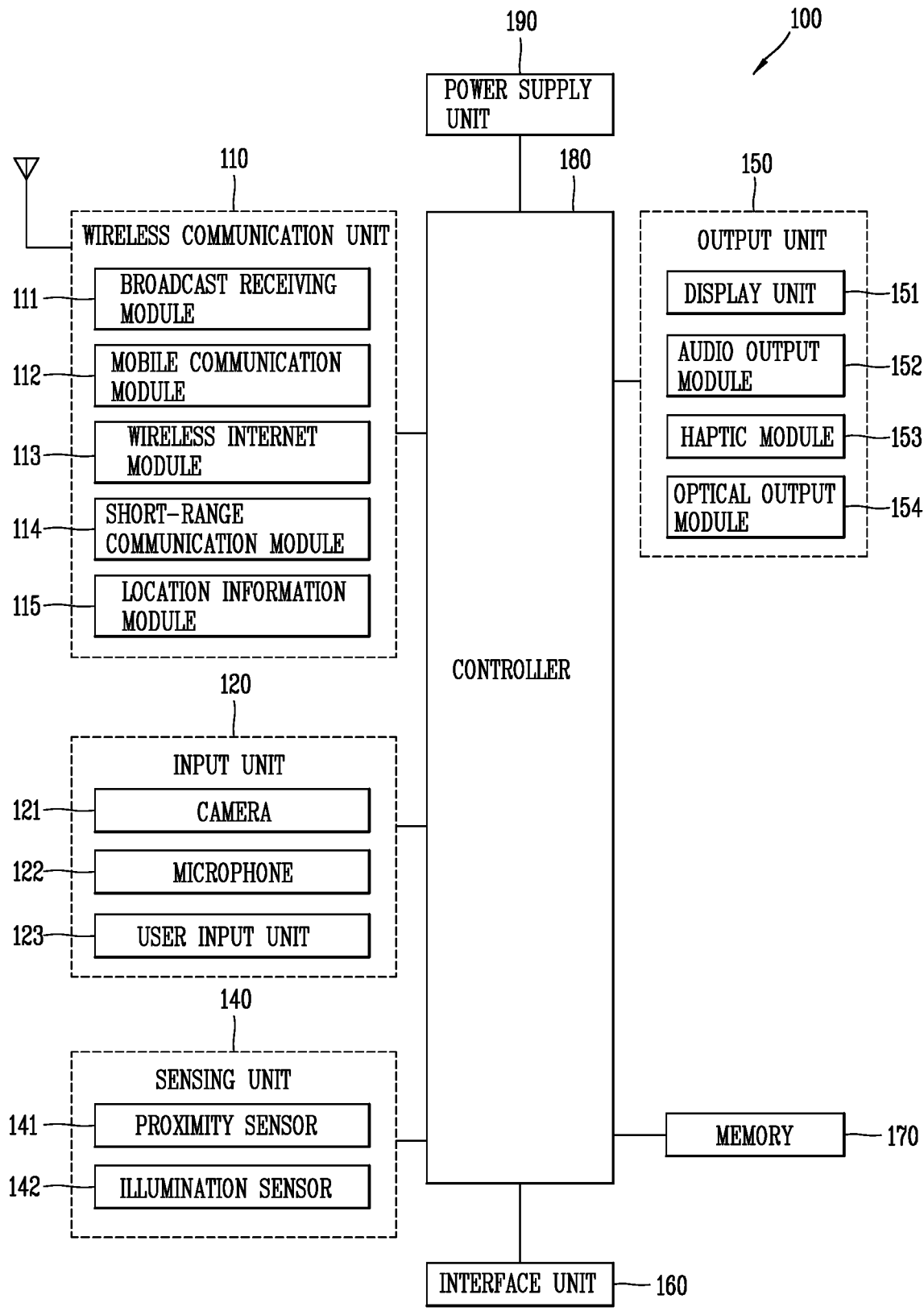
FIG. 1A is a block diagram illustrating a mobile terminal related to the present disclosure.
Figure 1B:
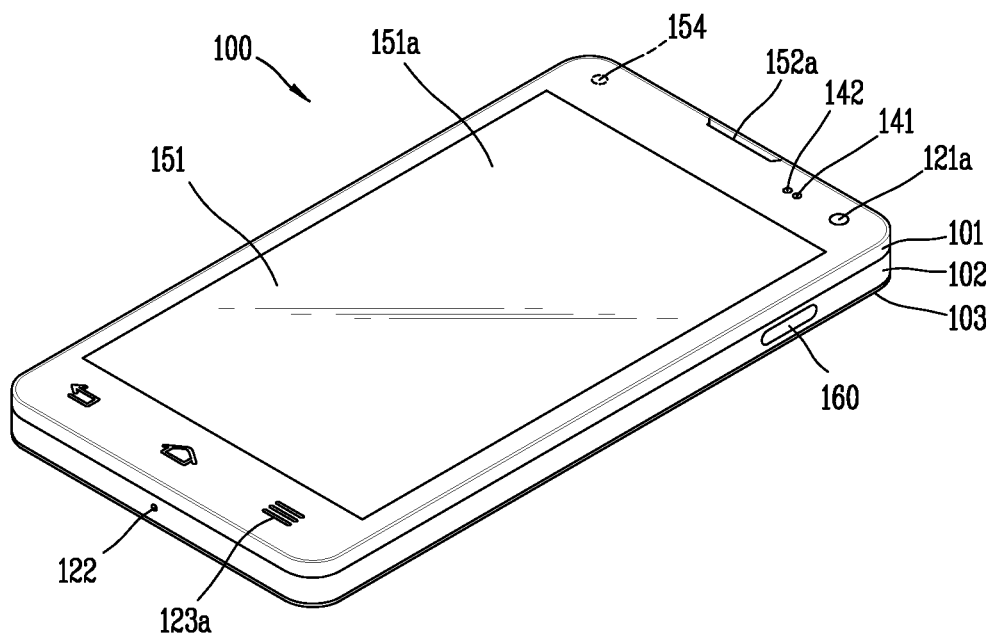
FIGS. 1B and 1C are conceptual diagrams of a mobile terminal related to the present disclosure, viewed in different directions.
Figure 1C:
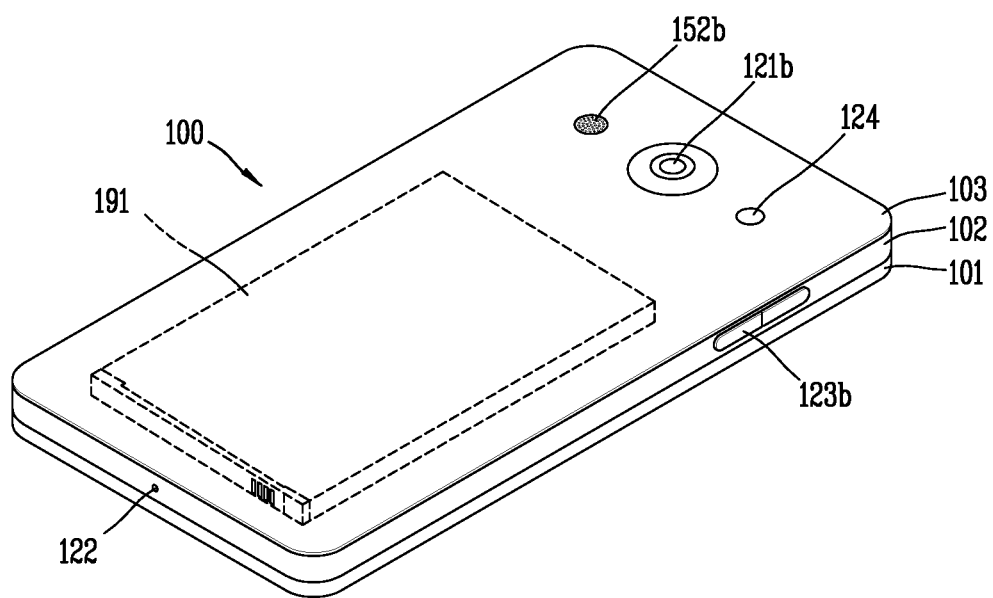

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal according to the present embodiment may further include a cover 200 provided to surround an outer surface of a terminal body of the mobile terminal. The cover 200 is detachable from the terminal body. The cover 200 may be formed to cover a region of the display unit 151. A state in which the display unit 151 is entirely exposed may be defined as an open state and a state in which a region of the display unit 151 is covered may be defined as a closed state. The cover 200 according to an embodiment of the present disclosure may include a first opening region 211 exposing a region of the display unit 151 in the closed state.

The mobile terminal according to the present disclosure includes a card module 310 received by the cover 200 in a state in which the cover 200 is mounted on the terminal body. A payment function may be performed using card information stored in the memory 170 of the mobile terminal and a card module 310. Hereinafter, structural characteristics of the card module 310 mounted on the cover and a control method of the mobile terminal for performing a payment function will be described.

FIGS. 2A to 2D are conceptual diagrams illustrating a structure of a card module drawn out from a cover.

Figure 2A:
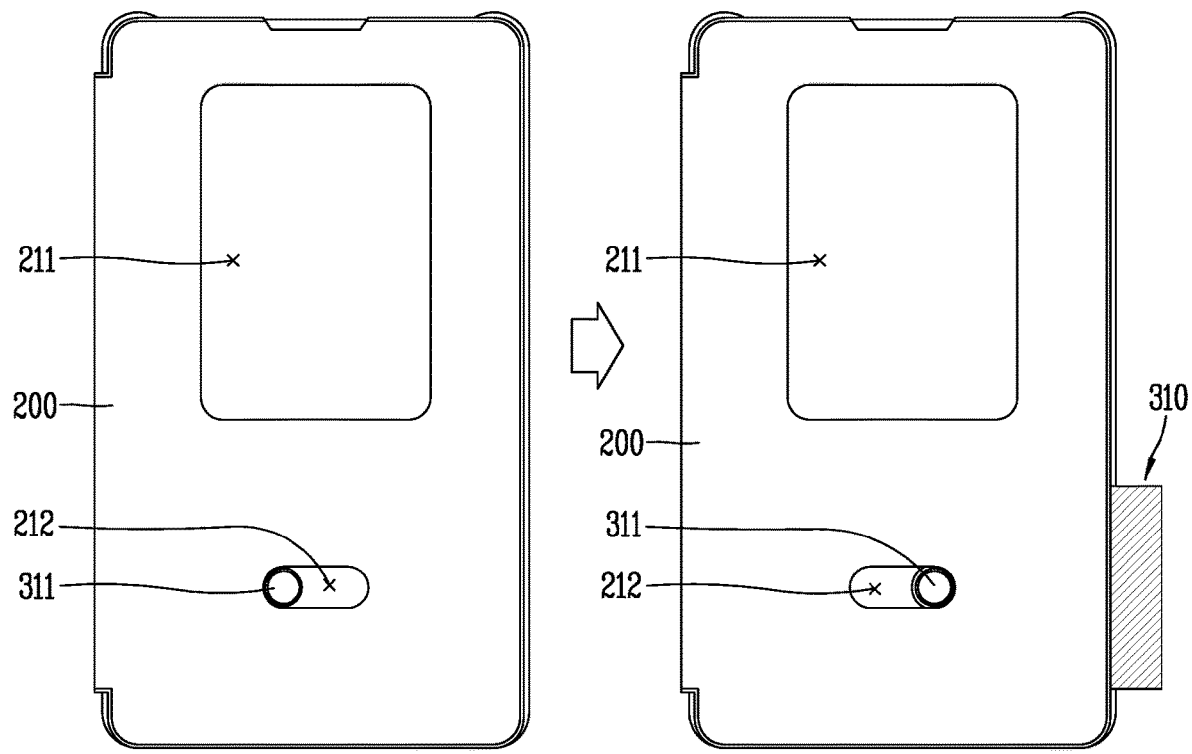
FIGS. 2A to 2D are conceptual diagrams illustrating a structure of a card module drawn out from a cover.
Figure 2B:
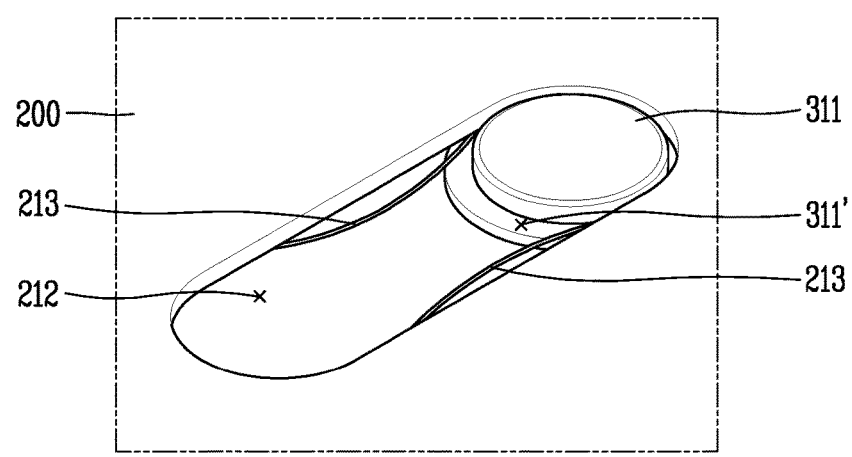
Figure 2C:
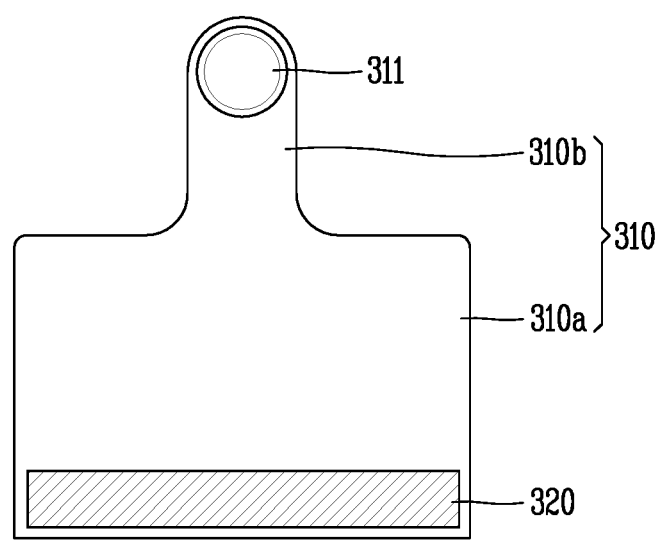

FIG. 2A illustrates a structure of a cover for receiving a card module according to an embodiment, FIG. 2B illustrates a structure of a moving part 311 inserted into the cover 200, and FIG. 2C illustrates a card module according to an embodiment.

Referring to FIGS. 2A to 2C, in the closed state, the card module 310 is accommodated in the cover 200 in a state of overlapping the display unit 151. When not in use, the card module 310 is accommodated not to be exposed to the outside of the cover 200, and when at least a region of the card module 310 is exposed to the outside according to a control command from the user, the card module 310 is switched to a use mode. When the card module 310 is switched to the use mode, the card module 310 is drawn out from a side surface (i.e., a region covering a side surface of the terminal body of the mobile terminal 100) of the cover 200.

Referring to FIG. 2C, the card module includes first and second regions 310a and 310b. A magnetic part 320 including payment information is formed in the first region 310a. The magnetic part 320 is formed at one end of the first region 310a and is exposed by the cover 200. When the magnetic part 320 is exposed from the cover 200, the magnetic part 320 may come into contact with a payment device (or a payment means) to transmit the payment information.

The second region 310b is formed to extend from the other end of the first region 310a. The moving part 311 is formed on one surface of the second region 310b. The moving part 311 and the magnetic part 320 may be formed on different surfaces of the card module 310.

Referring to FIG. 2B, the cover 200 includes a second opening region 212. A portion of the second region 310b and the moving part 311 formed in the second region 310b are exposed through the second opening region 212. The cover 200 further includes an elastic fixing part 213 disposed in the second opening region 212. The elastic fixing part 213 are configured as a pair of elastic members facing each other, and the moving part 311 is arranged to move between the pair of elastic members.

The moving part 311 includes a step 311'. A region of one of the pair of elastic fixing parts 213 is fixed to the step 311' to prevent separation of the moving part 311. A distance between the pair of elastic fixing parts 213 is smaller than a width of the moving part 311, and the elastic fixing part 213 is formed at a central part of the second opening region 212. Accordingly, the moving part 311 is moved to opposing ends of the second opening region 212 by virtue of elastic force of the elastic fixing part 213. Since movement of the moving part 311 within the second opening region 212 is limited by the elastic fixing part 213, the card module 310 may be more stably fixed. Thus, although payment is made with respect to a payment device in a state in which one region of the card module 310 is exposed, the card module may be stably maintained to be exposed.

Referring to FIG. 2A, when the moving part 311 exposed from the second opening region 212 of the cover 200 is moved by an external force, a portion of the first region 310a is drawn out from the cover 200. The drawn-out portion of the first region 310a is determined by a length of the second opening region 212, and the magnetic part is provided in a portion of the first region 310a which may be exposed.

The magnetic part includes information of a card to be used. The user performs a payment function through at least one of a plurality of pieces of card information stored in the memory 170. Hereinafter, a control method of applying at least one of the plurality of pieces of card information to the card module will be described.

Figure 2D:
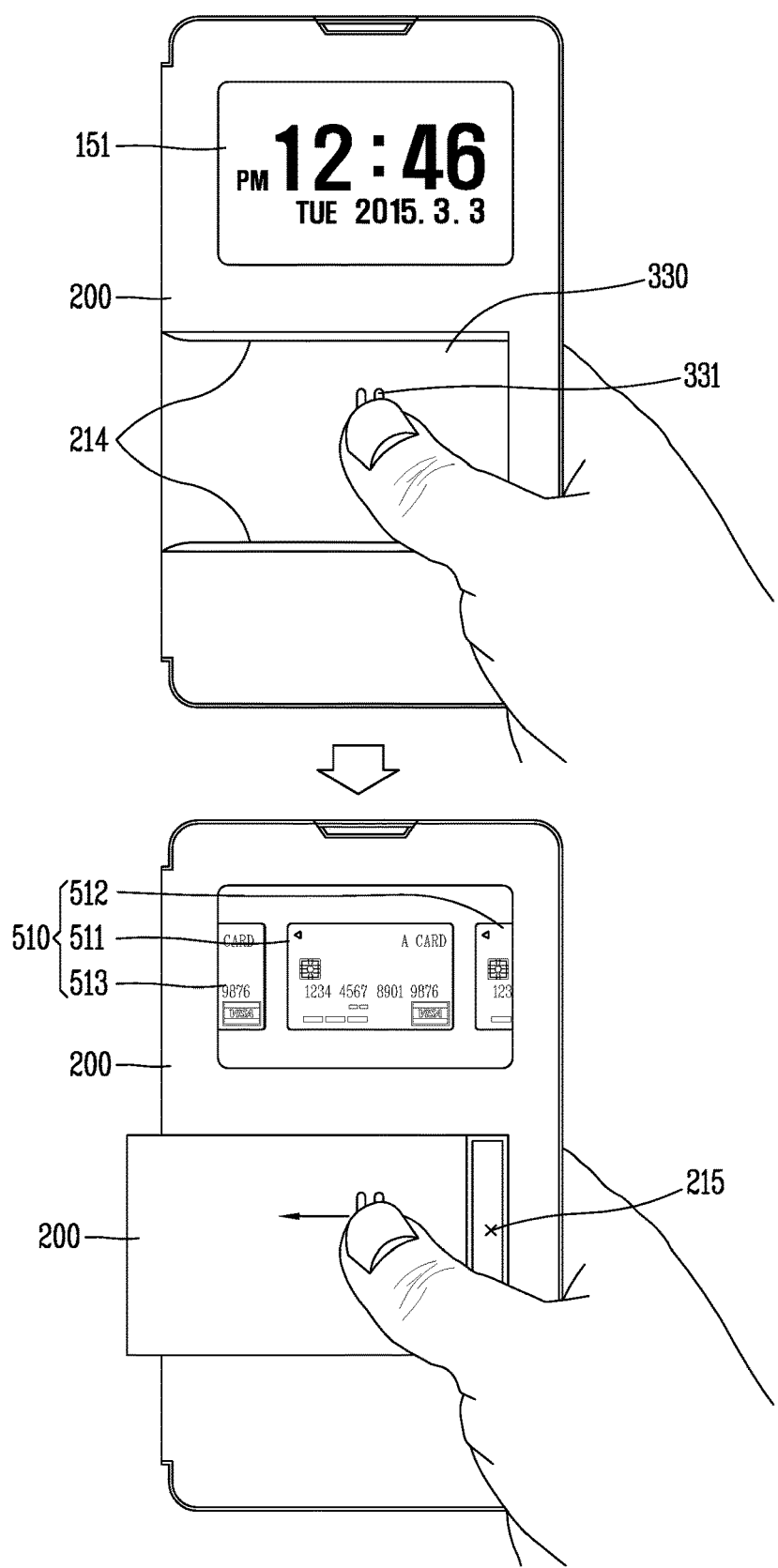

FIG. 2D is a conceptual diagram illustrating a control method of applying card information to a card module according to an embodiment. Another card module 330 according to the present embodiment is mounted to be exposed to the outside of the cover 200. The card module 330 may have a rectangular shape, but the present disclosure is not limited thereto. The mobile terminal 100 according to the present disclosure includes a sensing unit that senses movement or separation of the card module 330 from the cover 200, and here, an implementation form is not limited. The sensing unit may include a hall sensor sensing a change in magnetism, a button module physically deformed according to movement of the card module, and the like. The sensing unit may be provided in the cover 200 or the terminal body of the mobile terminal 100. The controller 180 may activate an application for executing the card payment function according to movement of the card module sensed by the sensing unit. In addition, the controller 180 may perform preset different functions based on the state of the card module accommodated (or housed) in the cover.

The cover 200 includes an accommodation region 215 for receiving the card module 330. The accommodation region 215 is formed to be recessed from an outer surface of the cover 200 and includes an insertion protrusion 214 protruding to prevent separation of the card module. The insertion protrusion 214 extends in one direction to fix both ends of the card module 330. Accordingly, the card module 330 may be moved in one direction and separated from the cover 200.

A moving protrusion 331 is formed on one side of the card module 300 exposed to the outside. The user may move the card module 300 using the moving protrusion 331 to take out the card module 330.

Although not specifically illustrated in the drawings, a stopper may be provided to limit movement of the card module 330 in the one direction to prevent separation of the card module 330 from the cover 200. Alternatively, the card module 330 may be formed to be completely separated from the cover 200.

When the card module 330 is drawn out from the cover 200 by a specific range or greater, the controller 180 may execute a card payment application and control the display unit 151 to output first screen information 510 corresponding thereto. The display unit 151 outputs the first screen information 510 on a quick window of the display unit 151 exposed through the first opening region 212 (see FIG. 2A).

The first screen information 510 includes portions of a plurality of content items corresponding to a plurality of cards. For example, the quick window may output first content item 511 and portions of second content item 512 and third content item 513. The second content item 512 and third content item 513 are arranged based on the first content item 511.

The content item includes information regarding a card stored in the memory 170. For example, a type of the card (credit card, cashbag card, membership card, check card, etc.), a name of a card, an expiration date, a card number, and the like. The content item may have the same card image as an image of an actual card, but the present disclosure is not limited thereto. The content item may be text.

The controller 180 may select at least one of the stored cards based on a touch applied to the quick window in the closed state and apply the selected card to the card module, and the card module may be drawn out from the cover and brought into contact with a payment device to perform a payment function using the applied card information. The control method according to this embodiment is applied substantially in the same manner to the card module and the structure of the cover according to the embodiment of FIG. 2A.

Hereinafter, an authentication method for applying card information to the card module will be described.

FIGS. 3A to 3D are conceptual diagrams illustrating an authentication method according to various embodiments.

Figure 3A:
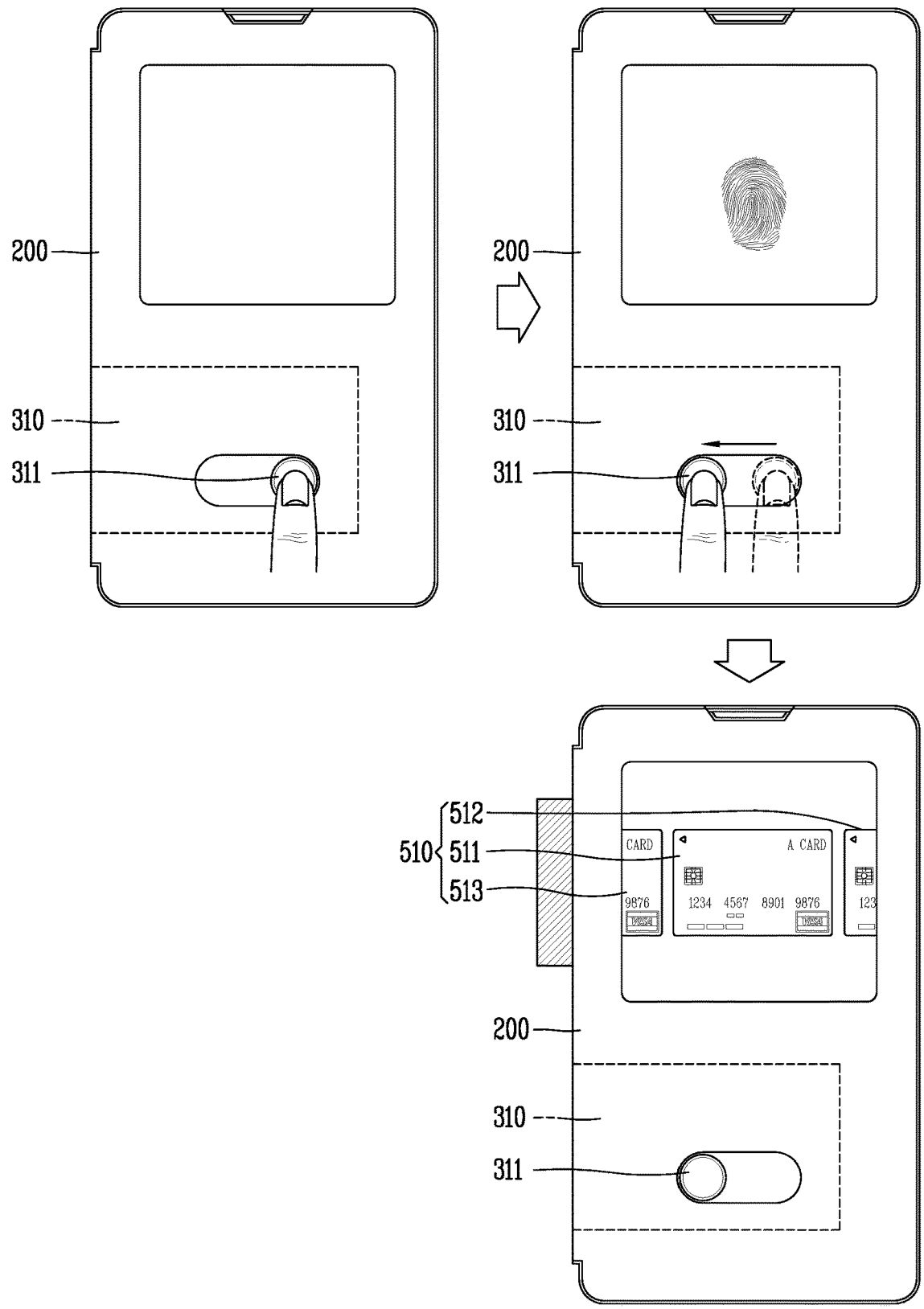
FIGS. 3A to 3D are conceptual diagrams illustrating an authentication method according to various embodiments.

FIG. 3A is a conceptual diagram illustrating an authentication method using a fingerprint sensing module formed in the moving part 311. Referring to FIGS. 2A and 3A, the moving part 311 is exposed to the outside through the second opening region 212, and the fingerprint sensing module is provided on one exposed surface of the moving part 311.

In the closed state, the display unit 151 may output an image corresponding to the sensed fingerprint, but the present disclosure is not limited thereto. The display unit 151 may output information indicating that a fingerprint is being scanned by the fingerprint sensing module, in various forms.

When the user's finger touches the moving part 311, the controller 180 senses the fingerprint. The controller 180 determines whether the fingerprint sensed as the finger touches the moving part 311 matches a previously stored reference fingerprint.

The controller 180 cancels a locked state when it is determined that the sensed fingerprint matches the reference fingerprint. Here, the locked state corresponds to a state in which movement of the card module 310 is blocked by limiting movement of the moving part 311. Although not specifically illustrated in the drawing, the cover 200 further includes a blocking structure for blocking movement of the card module. In the locked state, the blocking structure limits movement of the card module.

If the sensed fingerprint does not match the reference fingerprint, the display unit 151 may output notification information indicating that authentication for releasing the locked state has failed.

When the lock state is released and an external force is applied to the moving part 311, a region of the card module 310 is drawn out from the cover 200 based on movement of the moving part 311.

When movement of the card module 310 is sensed, the controller 180 controls the display unit 151 to output the first screen information 510. When the card module 310 is sensed as being drawn sufficiently to perform the payment function, the controller 180 may output the first screen information 510. Alternatively, when user authentication is successful as the sensed fingerprint and the reference fingerprint are substantially the same, the display unit 151 may output the first screen information 510, regardless of movement of the moving part 511.

The controller 180 may output the card information selected using the fingerprint of the authenticated user, as content item. For example, the controller 180 may preferentially provide information of the card set by the user of the sensed fingerprint, card information recommended based on the user's card use history information, a card selected based on the user's current position information, and a card based on a recorded life pattern of the user.

The controller 180 applies the selected card to the card module based on a touch applied to the first screen information 510. That is, the card module may receive and temporarily store information regarding the selected card. Accordingly, the user may use the card module in the same manner as that of an actual card.

According to this embodiment, since the fingerprint sensing module, which is an authentication means, is formed in the moving part 511, movement of the card module may be controlled, and if the user is not authenticated, card information of the user stored in the memory is not provided, whereby use of the card information by a user who is not authenticated may be effectively prohibited.

Figure 3B:
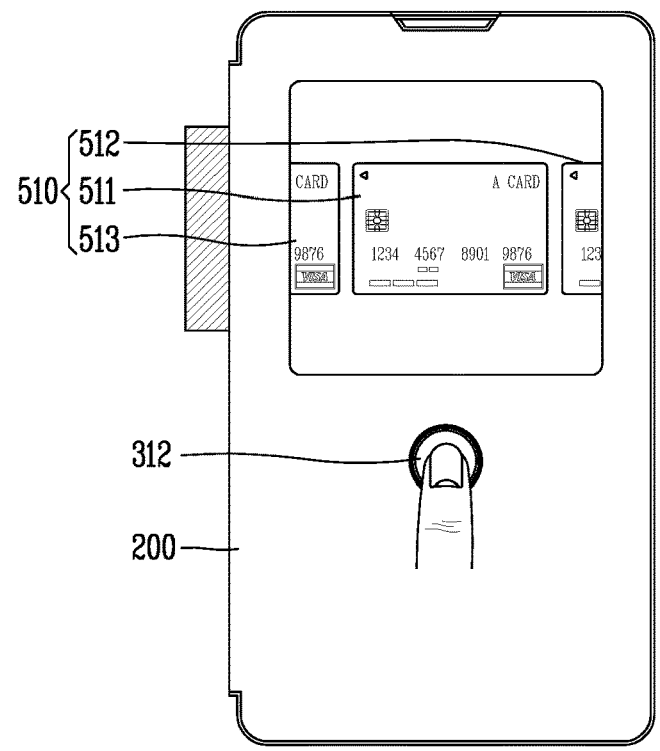

FIG. 3B is a conceptual diagram illustrating a mobile terminal including a button unit 312 according to another embodiment. The cover 200 according to the present embodiment includes a press type button unit 312 pressed toward the inner side of the terminal by an external force and the fingerprint sensing module provided on the press type button unit 312.

The controller 180 may further include an elastic structure that provides an elastic force so that the card module is drawn out when the fingerprint sensed while the press type button unit 312 is being pressed matches the reference fingerprint.

When the fingerprint is different from the reference fingerprint, the controller 180 may control the button unit 312 not to be pressed or may control the elastic structure such that the card module may not be drawn out although the button unit 312 is pressed.

When the user is authenticated based on the button unit 312, the controller 180 executes an application of the payment function and controls the display unit 151 to output the first screen information 510.

Figure 3C:
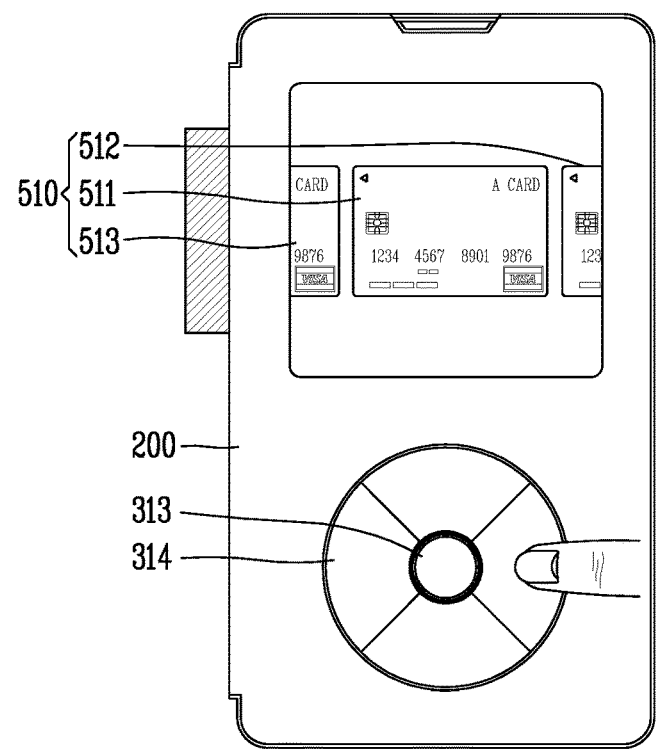

Referring to FIG. 3C, the cover 200 includes a touch module 314 and a button 313. For example, the touch module 314 may surround the button 313 and may be divided into a plurality of regions to receive a knock code. The controller 180 may perform an authentication procedure based on a touch applied to the touch module 314. The memory 170 stores a knock code for authentication, and when it is determined that a knock pattern applied by the user is the same as the stored knock code, user authentication may be completed.

The button 313 may further include a fingerprint sensing unit. When a fingerprint previously stored together with the knock code is sensed, the controller 180 may complete user authentication.

In case where a fingerprint different from a previously stored fingerprint is sensed but a knock pattern which is the same as the knock code is sensed, the controller may provide card information within a specific range.

According to the present embodiment, complementation of using a card may be enhanced by forming a user authentication procedure with a fingerprint and a knock code. Although not shown, a control command for forming a control command related to a card payment application or a control command for controlling other functions may be formed based on a touch applied to the touch module.

Figure 3D:
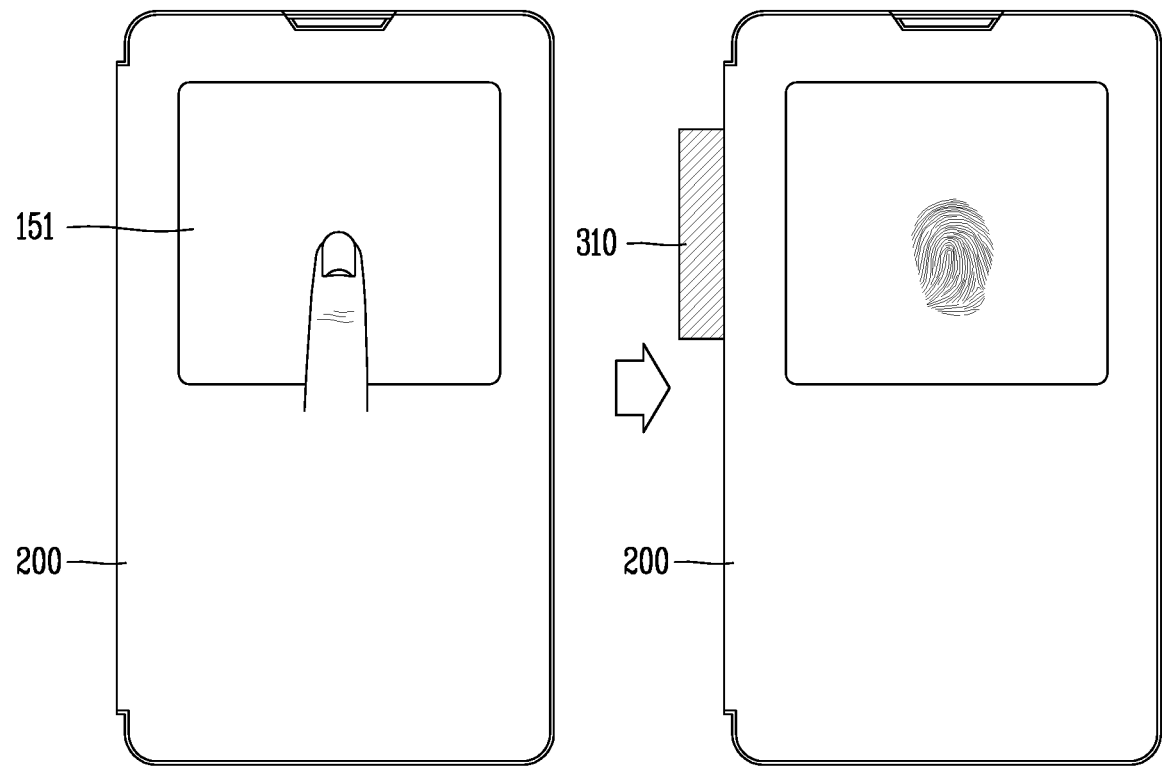

FIG. 3D is a conceptual diagram illustrating a control method of a mobile terminal according to another embodiment. A fingerprint sensing unit is formed in one region of the display unit 151 corresponding to the second opening region 212. Or, the cover 200 may include a light-transmittive protective layer in the second opening region 212, and a fingerprint sensing unit may be formed in the light-transmittive protective layer.

The controller 180 senses a fingerprint which comes into contact with the display unit 151 or the protection layer and determines whether the fingerprint matches the stored reference fingerprint. While the fingerprint is being sensed, the display unit 151 may display a fingerprint image or notification information corresponding thereto.

The controller 180 may draw out the card module when the fingerprint matches the previously stored fingerprint. Although not specifically illustrated in the drawing, the cover 200 may further include a moving structure for moving the card module to the outside by the controller 180. According to the present embodiment, since the user may take out the card module only through fingerprint recognition, an external structure for drawing out the card is unnecessary, so that an appearance of the cover may be simply realized.

Figure 4:
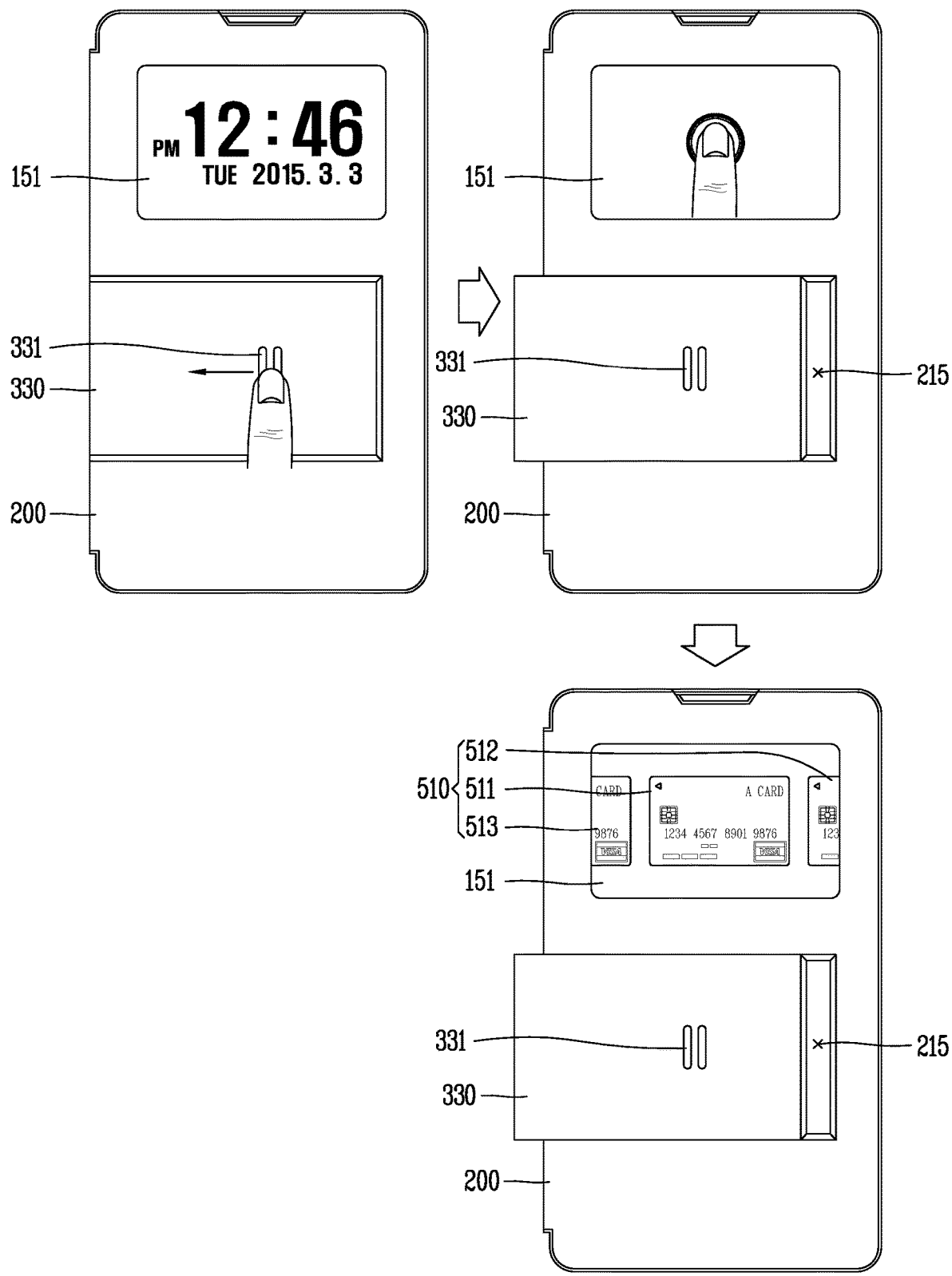
FIG. 4 is a conceptual diagram illustrating a cover according to another embodiment.

FIG. 4 is a conceptual diagram illustrating a cover according to another embodiment. The cover according to the present embodiment is substantially the same as the cover according to the embodiment illustrated in FIG. 2D, and therefore, a description of the components included in the cover will be omitted.

Referring to FIGS. 2D and 4, the controller 180 activates a fingerprint recognition sensor when the card module 330 is moved to be drawn out from the cover 200. The fingerprint recognition sensor may be formed by a transparent protective film provided in the opening region or may be formed on a region of the display unit 151 exposed through the opening region.

The controller 180 controls the display unit 151 to output the first screen information 510 when user authentication is completed by the sensed fingerprint. The first screen information 510 includes the first to third content items 511, 512, and 513. The user may apply a touch to the first to third content items 511, 512, and 513 to select card information to be used.

FIGS. 5A to 5E are conceptual diagrams illustrating a control method of applying card information to a card module according to various embodiments.

Figure 5A:
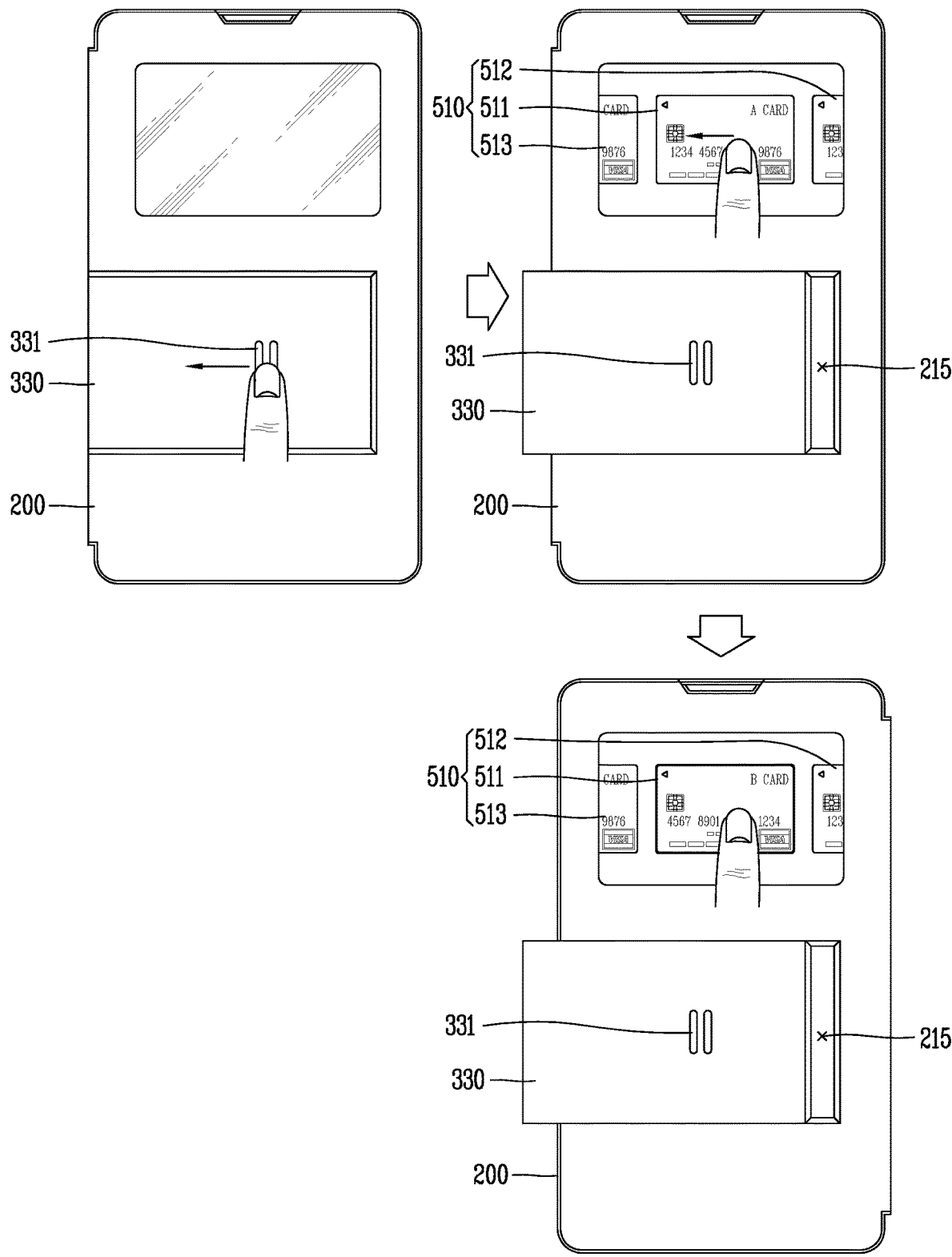
FIG. 5A to 5E are conceptual diagrams illustrating a control method of applying card information to a card module according to various embodiments.

Referring to FIGS. 2D and 5A, when it is sensed that the card module is moved by an external force in a state in which the display unit 151 is in an inactive state, the controller 180 switches the display unit 151 to an active state. The display unit 151 outputs the first screen information 510 including the first to third content items 511, 512, and 513.

The controller 180 may change content item displayed on the display unit 151 based on a touch applied to the first screen information 510 and may select at least one content item. When the content item is selected, card information corresponding to the selected content item is applied to the card module. Accordingly, the use of the card module is performed based on the applied card information.

For example, the first to third content items 511, 512 and 513 included in the first screen information 510 may be arranged in one direction (horizontal direction). In this case, the content item may be converted into content item including other card information by a touch (for example, a drag touch) applied in the one direction. The first to third content items 511, 512 and 513 may be switched into first, second and fourth content items 511, 512 and 514.

The controller 180 selects one of the plurality of content items based on a touch applied to the first screen information 510. The display unit 151 outputs a visual effect to display the selected content item. Accordingly, the user may use the card using the card module 330 while checking card information applied to the card module 330.

Figure 5B:
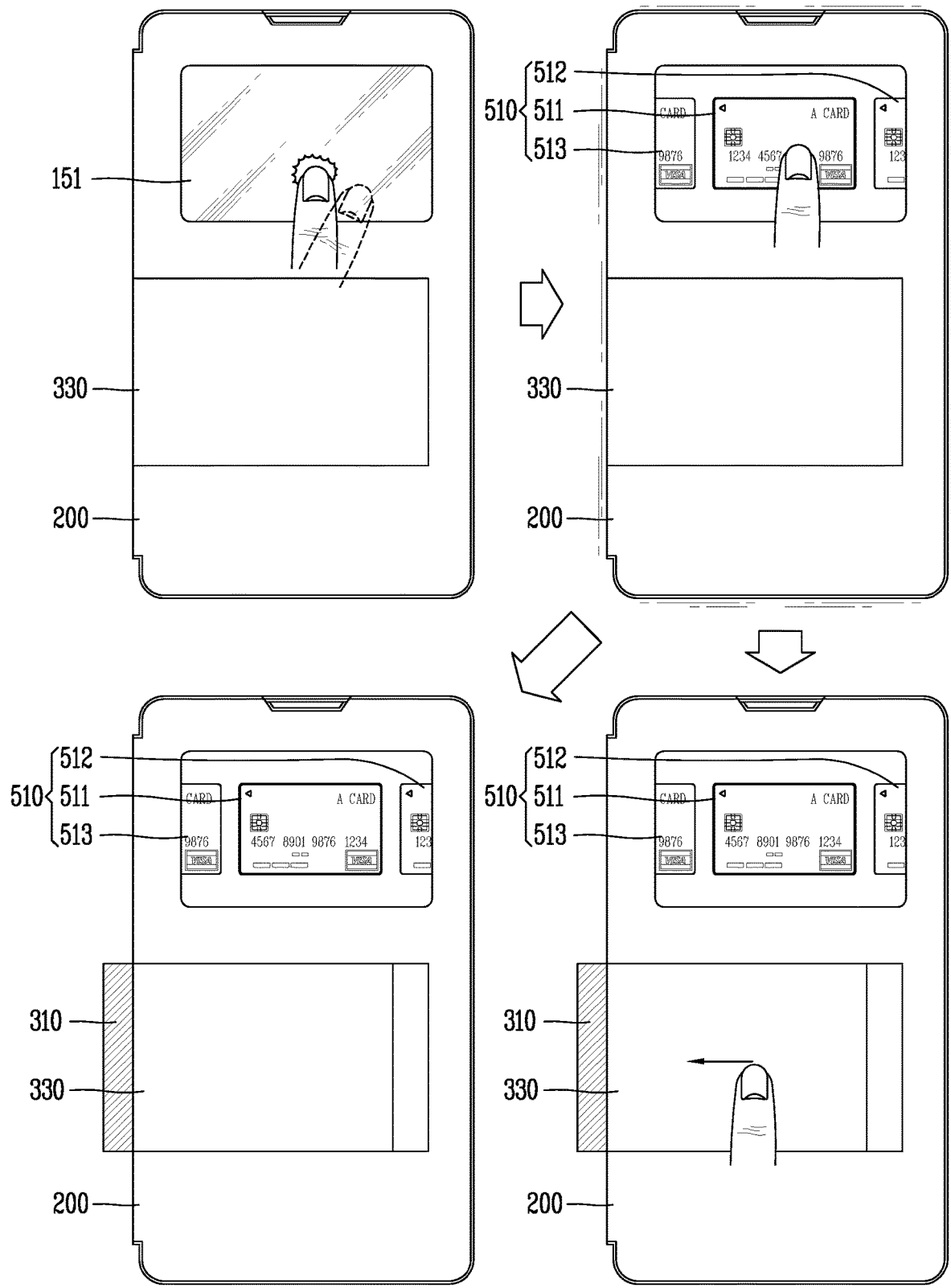

Referring to FIGS. 2D and 5B, in a state in which the card module 330 is accommodated in the cover 200, the controller 180 outputs the first screen information on the display unit 151 based on a control command of a specific scheme applied to the display unit 151. For example, the specific scheme may be a knock-on scheme.

The controller 180 selects one of the plurality of content items included in the first screen information 510 when a specific type of touch is applied to the first screen information 510. For example, the content item to be selected may correspond to content item displayed at the center of the first screen information 510. The specific type of touch may be a long touch input applied for a specific time (several seconds).

The controller 180 selects the content item based on the specific type of touch, applies the selected content item to the card module 330, and forms a control command for drawing out the card module 330. The cover 200 according to the present embodiment may further include an elastic part (not shown) for physically moving the card module 330.

The display unit 151 according to the present embodiment may include a fingerprint sensor. While a long-touch type touch is applied, the controller 180 may activate the fingerprint sensor to perform an authentication function. The controller 180 may draw out the card module from the cover when user authentication is completed. If, however, user authentication fails, the controller 180 limits movement of the card module and controls the display unit 151 to output a notification message indicating failure of user authentication.

Meanwhile, when one of the plurality of content items is selected based on the specific type of touch, the controller 180 applies the card information of the selected content item to the card module. The card module is drawn out of the cover by an external force. In this embodiment, the controller 180 may further include a stopper (not shown) for preventing the card module from being drawn out when the card information is not selected or the display unit 151 is in the inactive state.

Figure 5C:
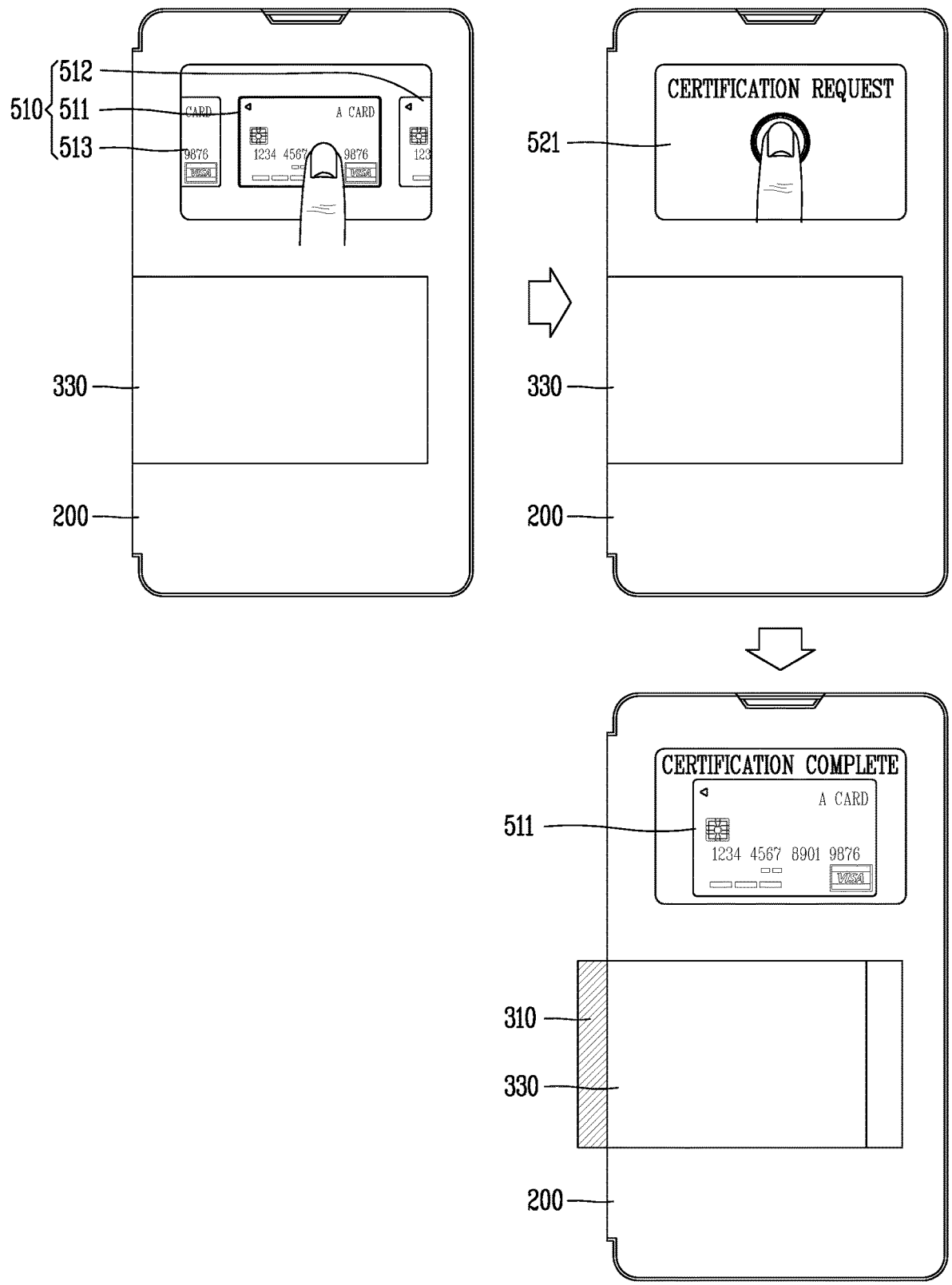

Referring to FIGS. 2D and 5C, when one content item is selected based on a touch applied to the first screen information 510, the controller 180 activates the fingerprint sensor. The controller 180 performs a user authentication procedure based on a fingerprint sensed by the fingerprint sensor.

When the user authentication is completed, the display unit 151 outputs a notification window 511 indicating information regarding completion of authentication and card information of the selected content item. The card information may be an actual image or text of the card.

Figure 5D:
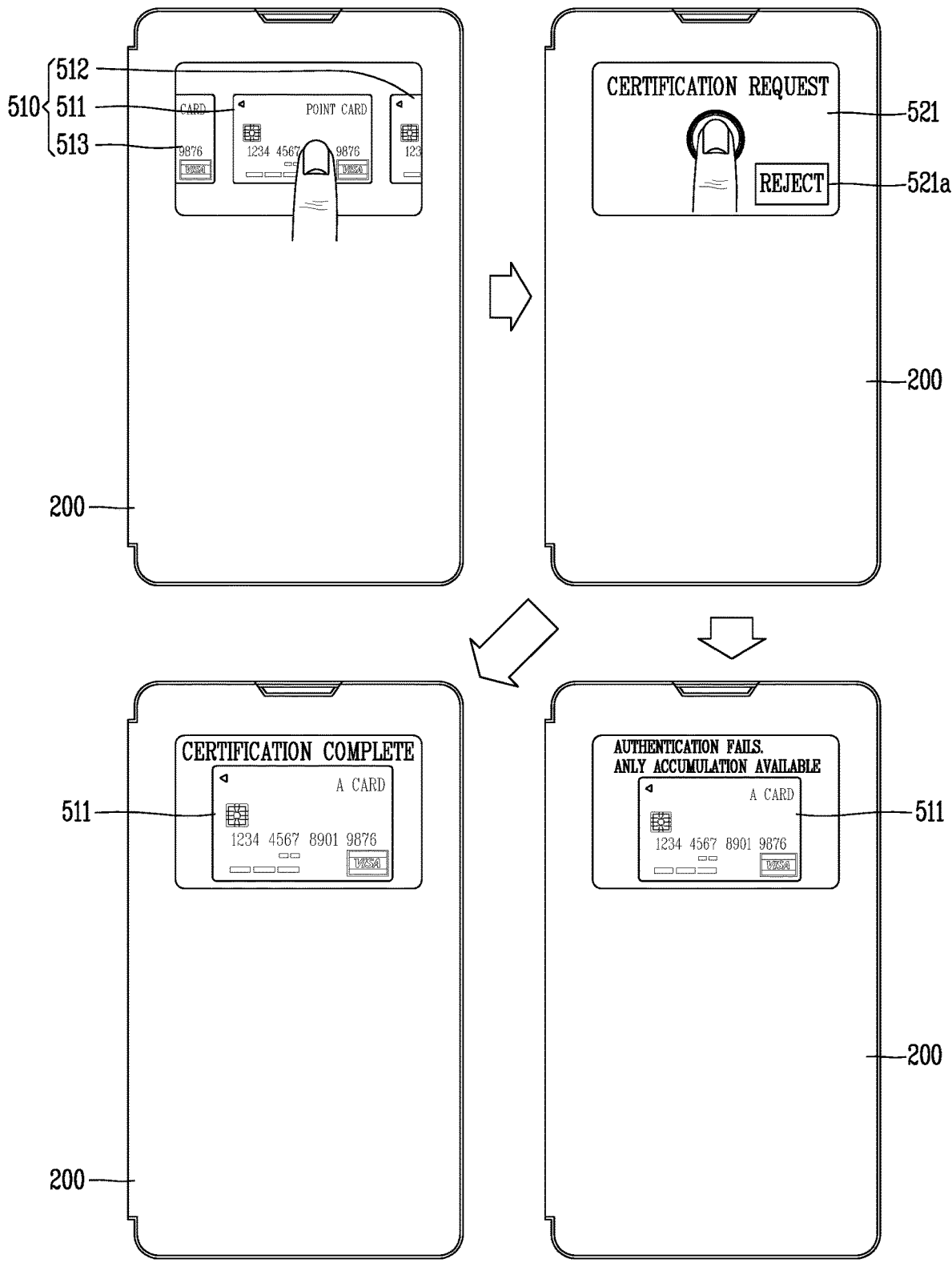

A control method of performing different functions by the controller 180 using card information according to whether user authentication is completed will be described with reference to FIGS. 2D and 5D.

When one content item is selected in the state in which the first screen information 510 is output, the display unit 151 outputs an authentication screen 521 for user authentication.

The controller 180 controls the fingerprint sensor to sense a user's fingerprint on the authentication screen 521. The authentication screen 521 includes a guide image for guiding a finger position of the user to sense the fingerprint and an icon 521a for disregarding the authentication procedure.

When authentication is completed by the user's finger touching the authentication screen 521, the controller 180 controls the display unit 151 to output the notification window 511 (FIG. 5D) and apply all card information of the selected content item to the card module.

Meanwhile, if the icon 521a is selected or the user authentication fails, the controller 180 applies a portion of the card information of the selected content item to the card module. For example, in case where the card information includes information for point earning and information for point use, when the user authentication fails, the controller 180 applies only the information for point earning to the card module.

Also, the display unit 151 displays a portion of the card information applied to the card module.

That is, if it is determined that the user is not a card user corresponding to the selected content item, a portion of the card information is not applied so that the functions such as payment, use of points, etc. requiring user authentication is limited.

Figure 5E:
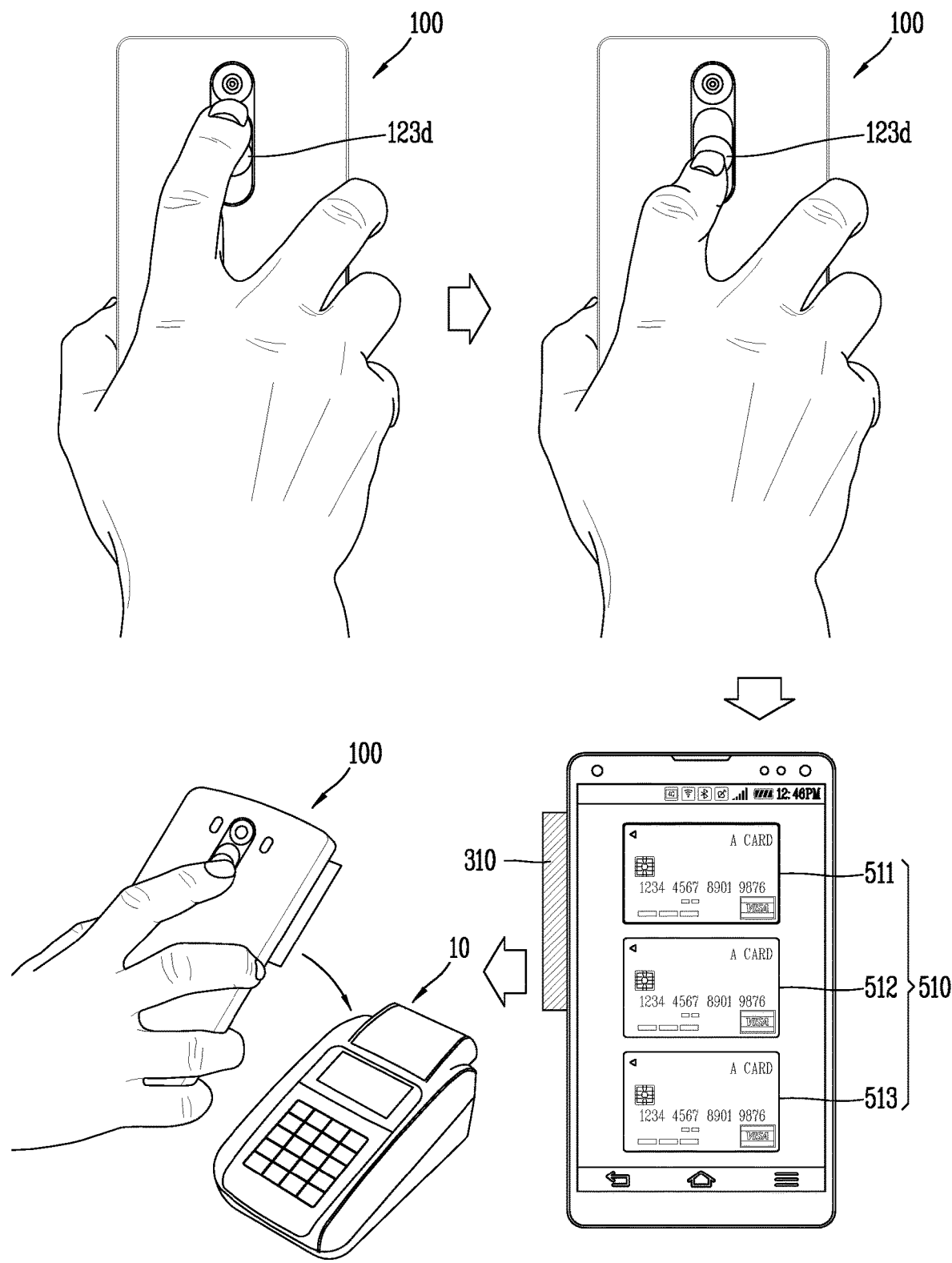

A control method of selecting card information using a rear key 123d will be described with reference to FIG. 5E. The mobile terminal according to the present embodiment has the rear key 123d for forming a control command on the rear surface facing the front surface on which the display unit 151 is formed. The rear key 123d may be configured as a touch key, a mechanical key, or the like. The fingerprint sensor may be formed in a region of the rear key 123d, but the present disclosure is not limited thereto.

The controller 180 may select one of a plurality of content items included in the first screen information 510 based on a touch applied to the rear key 123d. The rear key 123d may be a +/−key. For example, when the first to third content items 511, 512 and 513 are included in the first screen information 510, any one of the first to third content items 511, 512, and 513 may be selected arranged in one direction by the rear key 123d. In addition, the card module 310 may be drawn out from the cover 200 based on a control command by the rear key 123d.

Meanwhile, the controller 180 may activate the fingerprint sensor in a state in which the card module 310 is drawn out from the cover 200. The controller 180 controls the card module 310 to perform a function of the card in a state in which a preset fingerprint of the user is sensed by the fingerprint sensor. Meanwhile, if the user's fingerprint is not sensed by the fingerprint sensor or a fingerprint different from the user's fingerprint is sensed, the controller 180 may perform control to limit performing of the function of the card module 310.

According to the present exemplary embodiments, the controller 180 may perform a card use function using all the card information of the selected content item only when the user authentication is completed. If the user authentication fails, at least a portion of the card information may be limited to prevent the use of the card by someone else.

FIGS. 6A to 6D are conceptual diagrams illustrating a control method of applying card information to a card module according to various embodiments.

Figure 6A:
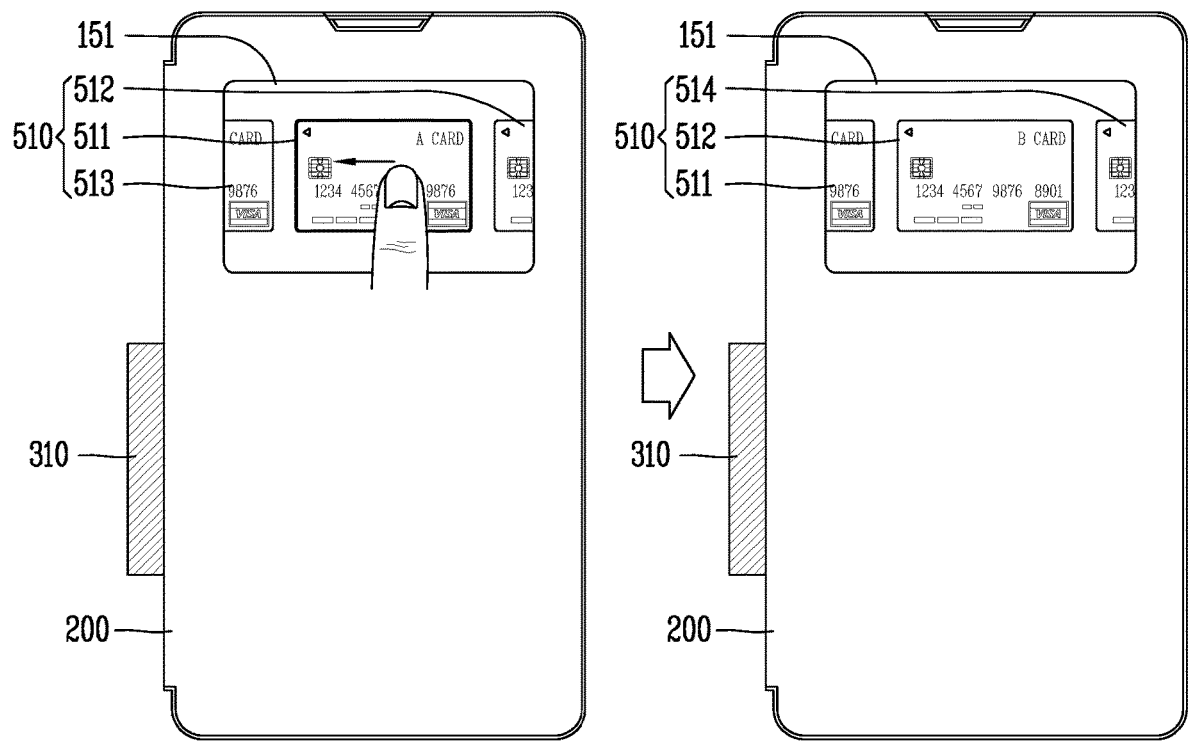
FIGS. 6A to 6D are conceptual diagrams illustrating a control method of applying card information to a card module according to various embodiments.

Referring to FIG. 6A, the first screen information 510 includes first to third content items 311, 512, and 513 arranged in one direction. As illustrated in the figure, the third content item 513, the first content item 511, and the second content item 512 are displayed in order from the left. A region of each of the second and third content items 512 and 513 is displayed and the first content item 511 are displayed entirely in a central region of the display unit 151 exposed through the opening region.

The controller 180 may change the content item placed in the central region based on a drag-touch input applied in the one direction. The plurality of content items are moved based on the drag-touch input, and here, the third content item 513 disappears due to the movement, the second content item 512 is displayed in the center region, and a portion of a fourth content item 514 is displayed.

When a touch is applied to the first screen information 510, the controller 180 performs control to selectively apply content item displayed in the most central region to the card module 310.

According to the present embodiment, in case where a plurality of pieces of card information are stored, content item items respectively corresponding to the plurality of pieces of card information may be sequentially output.

Figure 6B:
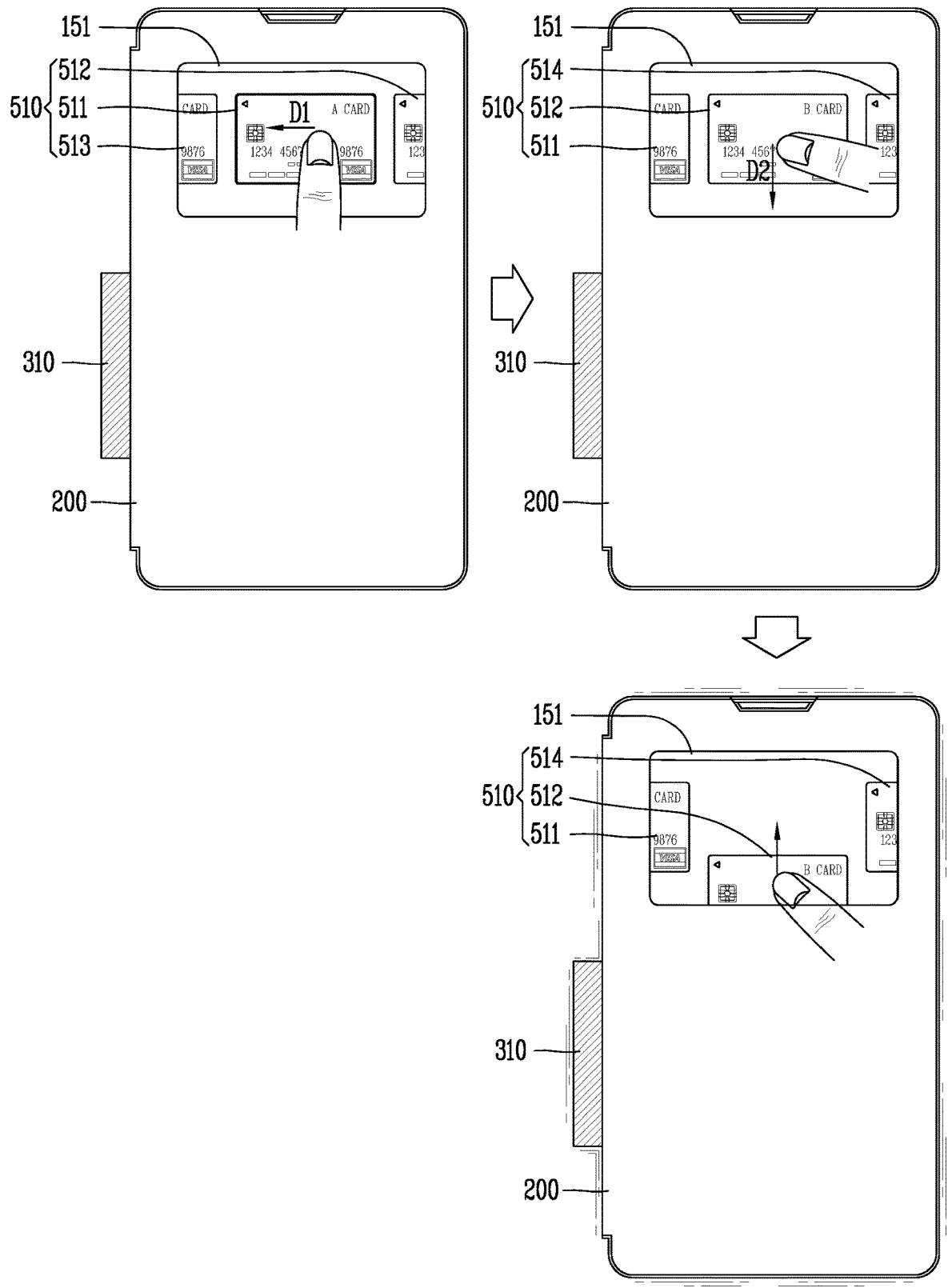

Referring to FIG. 6B, the display unit 151 outputs some of a plurality of content items arranged in a first direction D1. The first screen information 510 includes second and third content items 512 and 513 arranged on both sides of the first content item 511. The controller 180 may change the content item included in the first screen information 510 by a drag touch applied in the first direction D1.

The controller 180 may select one of the plurality of content items based on a drag touch applied in a second direction D2. As illustrated in FIG. 6B, the display unit 151 moves a second content item 512 in a touch direction by a touch applied in the second direction D1. For example, the second direction D2 may correspond to a direction toward an accommodation region of the card module 310 on the display unit 151. As the region in which the second content item 512 is output is changed, a portion of the second content item 512 disappears from the display unit 151.

When the second content item 512 is moved, the second content item 512 is applied to the card module 310. The display unit 151 outputs an image in which it looks as if the second content item 512 is inserted in the card module. Representative information (e.g., a card name, an expiration date, etc.) of the card information corresponding to the second content item 512 may be displayed in a remaining region of the second content item 512 displayed on the display unit 151.

While the card module is performing the card function using the card information corresponding to the selected content item, the display unit 151 continuously displays the image in which the second content item is inserted into the card module 310 to continuously provide card information which is currently used by the user.

Meanwhile, when a touch is applied to the display unit 151 in a direction opposite to the second direction D2, the controller 180 cancels the selection of the content item. The display unit 151 restores the position of the content item. According to the present embodiment, the user may intuitively notice the selected card information based on the movement of the content item.

Figure 6C:
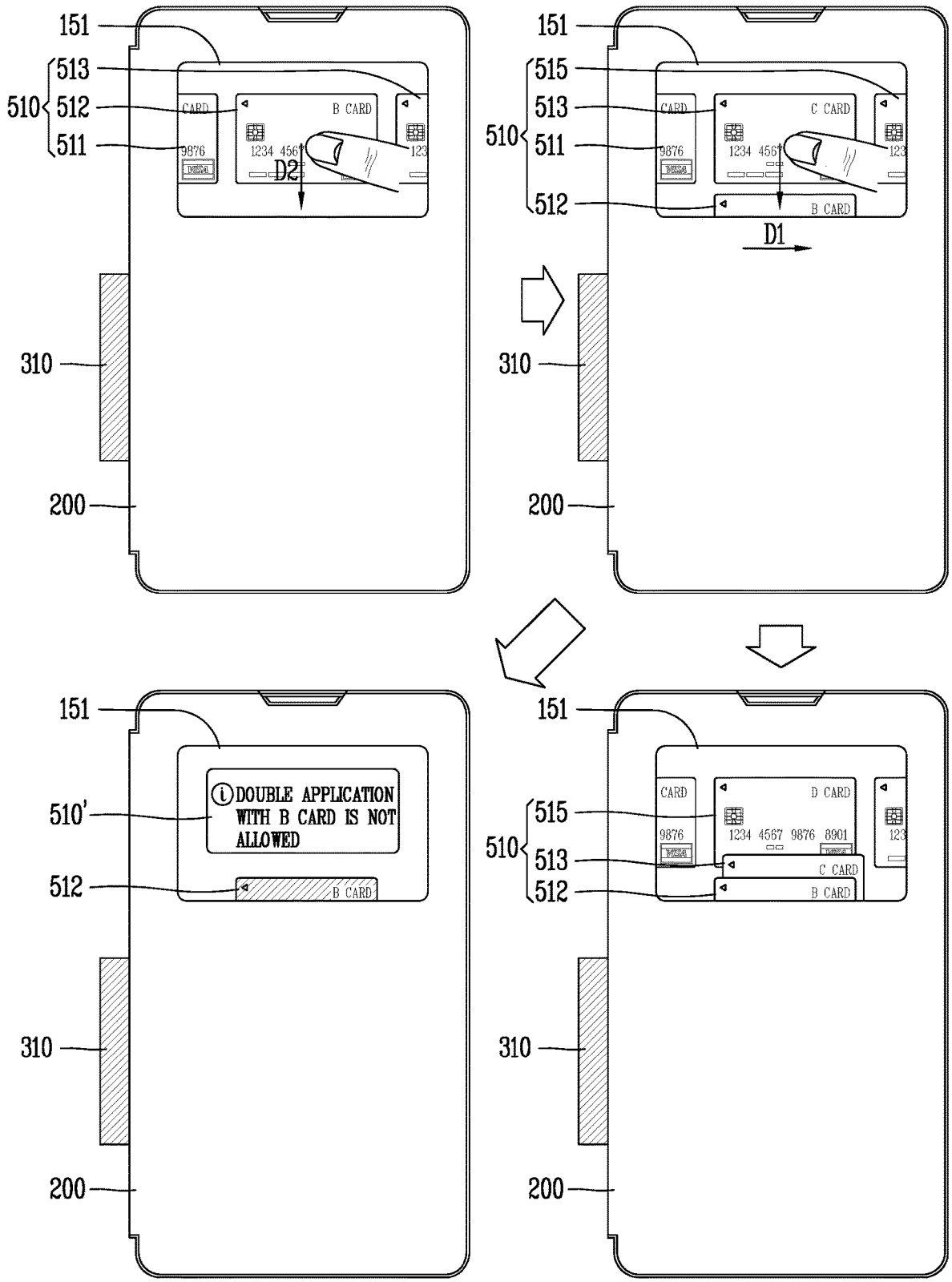

A control method of applying a plurality of pieces of card information to the card module will be described with reference to FIG. 6C. The controller 180 selects the second content item 512 based on the touch applied in the second direction D2 and applies the selected second content item 512 to the card module 310. An output position of the second content item 512 is changed and a region of the second content item 512 is displayed on the display unit 151.

When the output position of the second content item 512 is changed, another content item (fourth content item 514 in the drawing) is output on the region where the second content item 512 was output. The first, third and fifth content items (511, 513, 515) arranged in the first direction D1 are output together with a portion of the second content item 512.

The controller 180 changes the output position of the third content item 513 based on a touch applied to the third content item 513 in the second direction D2. A portion of the fourth content item 513 may disappear and card information corresponding to the fourth content item 514 may be displayed in a remaining region.

The plurality of selected content items (second and third content items 512 and 513 are output as an image in an overlap state. The controller 180 applies pieces of card information corresponding to the plurality of selected content items to the card module 310.

When a plurality of content items are selected, the controller 180 determines whether a plurality of pieces of card information corresponding to the plurality of content items may be applied together. In case where the plurality of pieces of card information may be applied together, for example, in case where a card for a payment function and a card for point earning may applied together, the controller 180 selects a plurality of content items. If the plurality of pieces of card information cannot be applied together, the controller 180 controls the display unit 151 to output guidance information 510' indicating that the plurality of pieces of card information cannot be applied in a combined manner (i.e., together).

According to the present embodiment, when a plurality of cards are selected, the plurality of cards are displayed as overlapping images so that the user may intuitively notice that a plurality of pieces of card information are applied. Further, when the user selects a plurality of pieces of card information, the case where the plurality of pieces of selected card information cannot be applied together is determined, preventing an error such as repeated payment.

Meanwhile, in case where a combined application of point earning or a discount is not possible, the controller 180 may determine that by using payment information based on card information and information regarding a payment target.

Figure 6D:
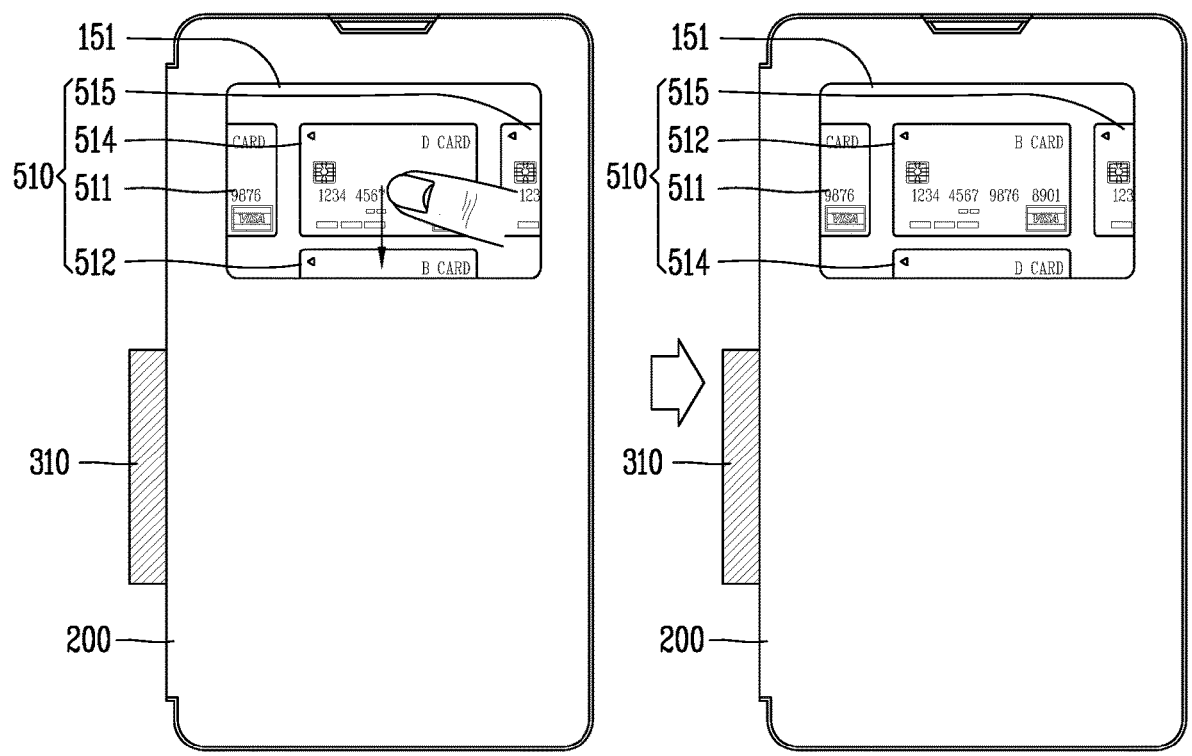

Referring to FIG. 6D, in a state in which a partial region of the already selected content item is output (in a state in which a region of the second content item 512 in FIG. 6D is displayed), if a touch is applied to the fifth content item 515 in the second direction D2, the selected content item may be replaced with a different content item. That is, the controller 180 cancels the application of the second content item 512 to the card module 510 and applies the fifth content item 515 to the card module 510.

For example, in case where the second and fifth content items 512 and 515 include substantially the same kind of card information, that is, in case where the second and fifth content items 512 and 515 include card information which cannot be used in a combined manner, the controller 180 may change the applied content item.

According to these embodiments, the user may more intuitively select card information to be applied to the card module based on a touch for changing a position of content item output on the display unit 151.

Figure 7A:
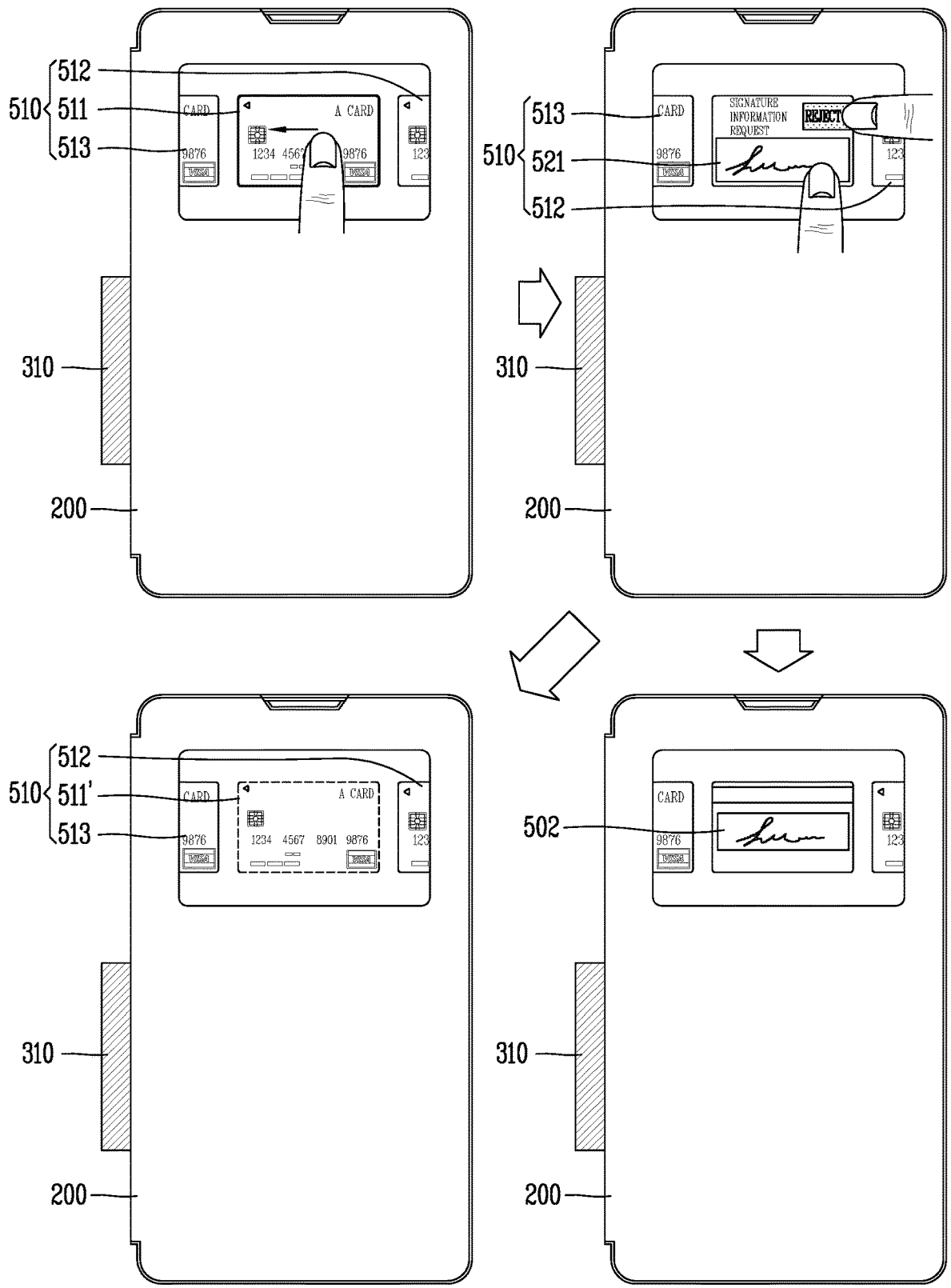
FIG. 7A to 7C are conceptual diagrams illustrating a control method for inputting additional authentication information.
Figure 7B:
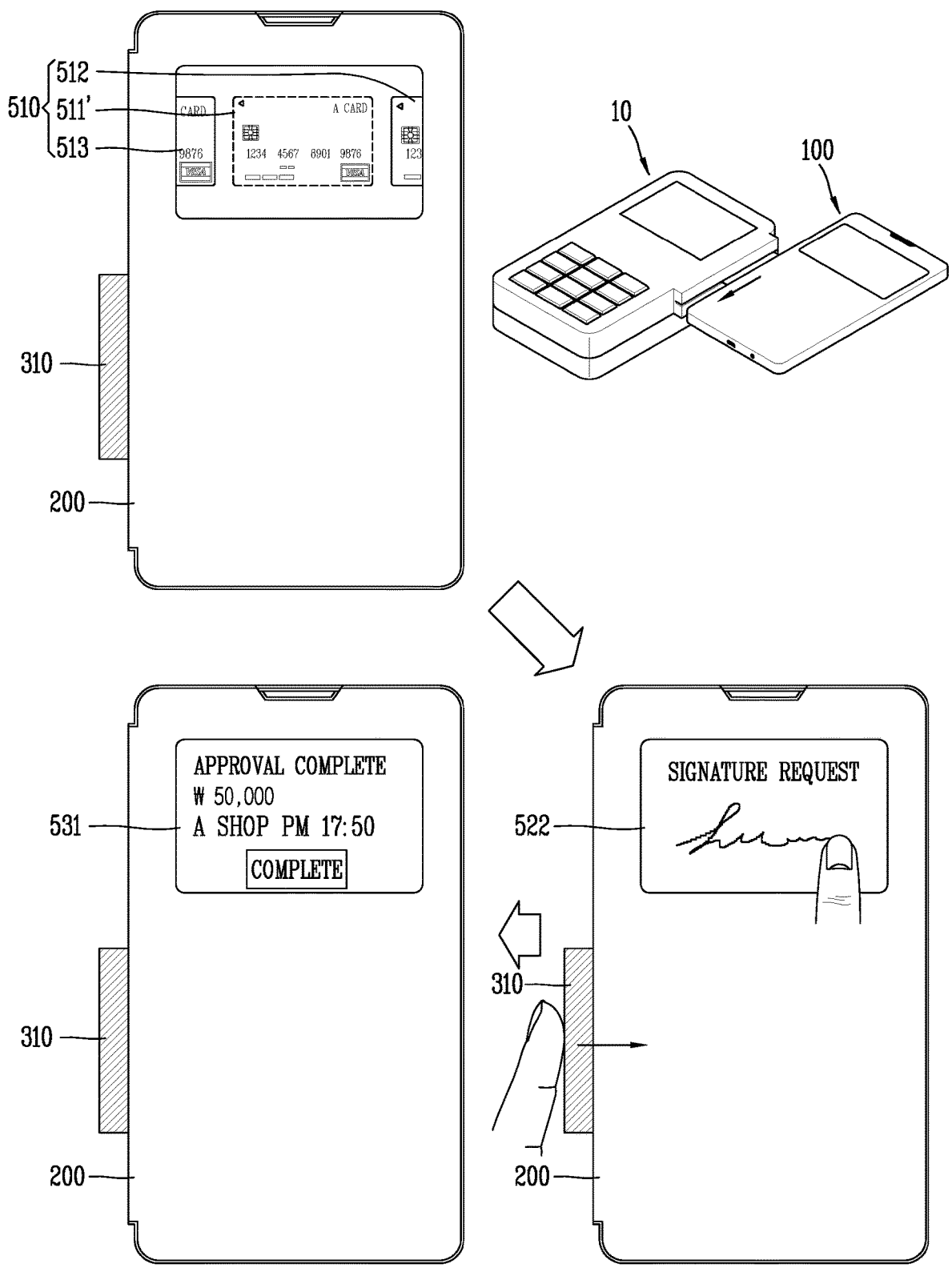
Figure 7C:
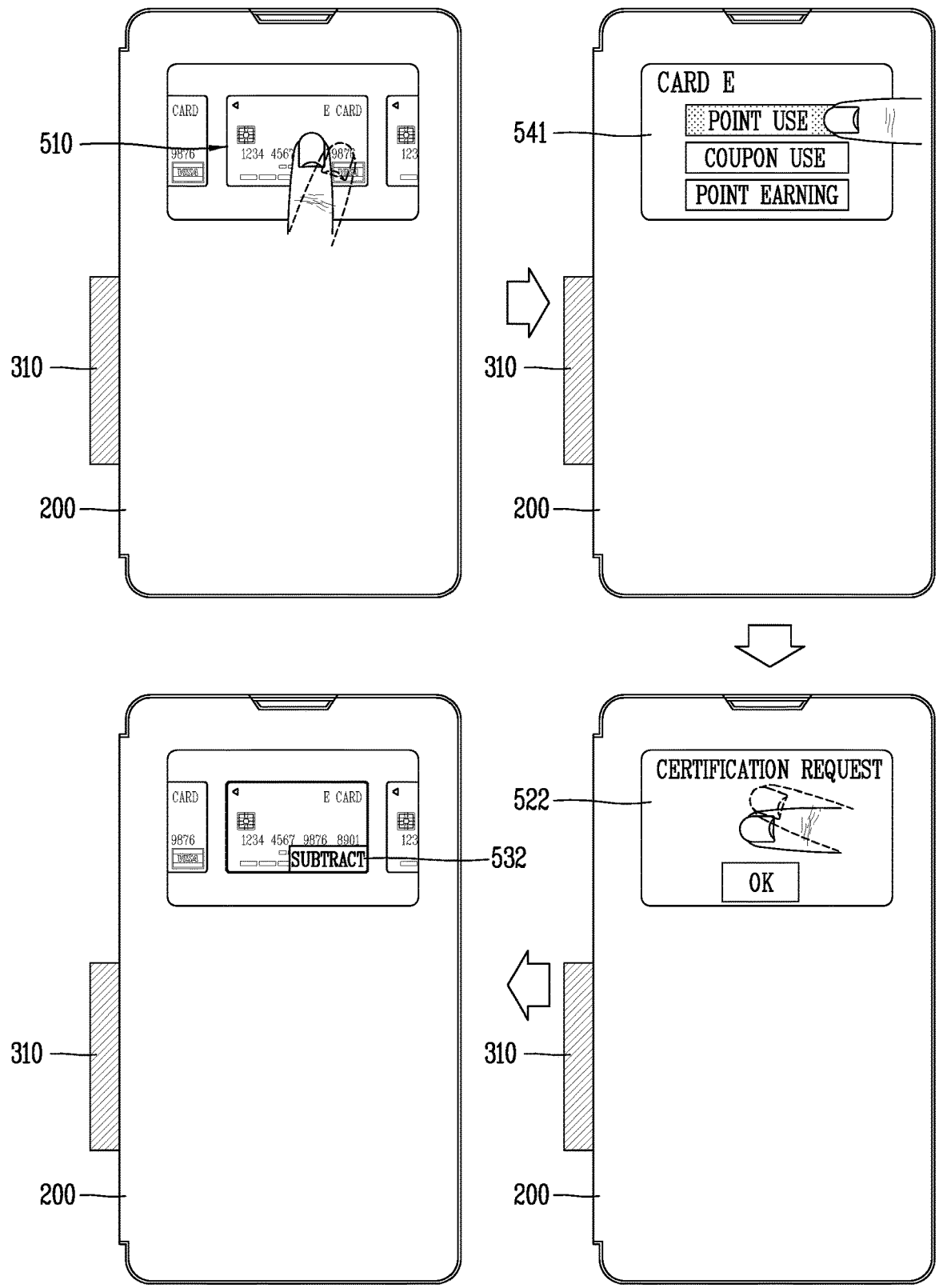

FIGS. 7A to 7C are conceptual diagrams illustrating a control method for inputting additional authentication information.

Referring to FIG. 7A, if the first content item 511, among the first to third content items 511, 512, and 513 included in the first screen information 510, is selected, the controller 180 determines whether additional authentication information is required to use card information corresponding to the first content item 511. In case where additional authentication information related to the card information is required, the controller 180 controls the display unit 151 to output an authentication input window 521.

The authentication input window 521 is displayed in an output region of the first content item 511. That is, the authentication input window 521 receives a user's touch input and outputs a trace of a touch as a signature image of the user. The user may input the signature information by applying a touch input to the display unit 151. The authentication input window 521 may include an icon for rejecting the input of the signature information.

When the signature information is input, the display unit 151 outputs a signature image 502 to overlap the first content item 511.

Meanwhile, when a touch is applied to the icon, the controller 180 outputs an inactivation content item 511' to indicate a state (inactive state) in which a function cannot be performed using card information corresponding to the first content item 511.

According to the present embodiment, the controller 180 may directly input necessary information for using the selected card information.

Referring to FIG. 7B, in a state in which the inactivation content item 511' is selected, when the card module is used by the payment device 10, the controller 180 controls the display unit 151 to output an authentication input screen 522 for inputting additional authentication information. The display unit 151 senses a trace of a touch of the user and outputs a signature image.

When the signature image is received, the controller 180 performs a payment function using the card information corresponding to the inactivation content item 511'. When the payment function is performed, the display unit 151 outputs payment completion information 531. The settlement completion information 531 includes information regarding an amount of money, time, a payment target, and the like, and may include text, an image, and the like.

The input additional authentication information is transmitted to the payment device 10.

Referring to FIG. 7C, when one content item is selected, the controller 180 outputs a function selection screen 541 for selecting some of a plurality of functions including card information of the content item on the display unit 151. For example, the card information may correspond to the use of points, earning of points, the use of coupons, and the like. The user may select a plurality of functions which can be executed in a combined manner, among a plurality of functions.

In case where additional authentication information is required to execute the selected function, the controller 180 controls the display unit 151 to output the authentication input screen 522. While the authentication input screen 522 is being output, the fingerprint sensor may be activated.

When the additional authentication information is input, the controller 180 performs the selected function. The display unit 151 may output notification information 532 indicating that the function has been performed, together with the content item.

FIGS. 8A to 8E are conceptual diagrams illustrating a control method using a card module according to various embodiments.

Figure 8A:
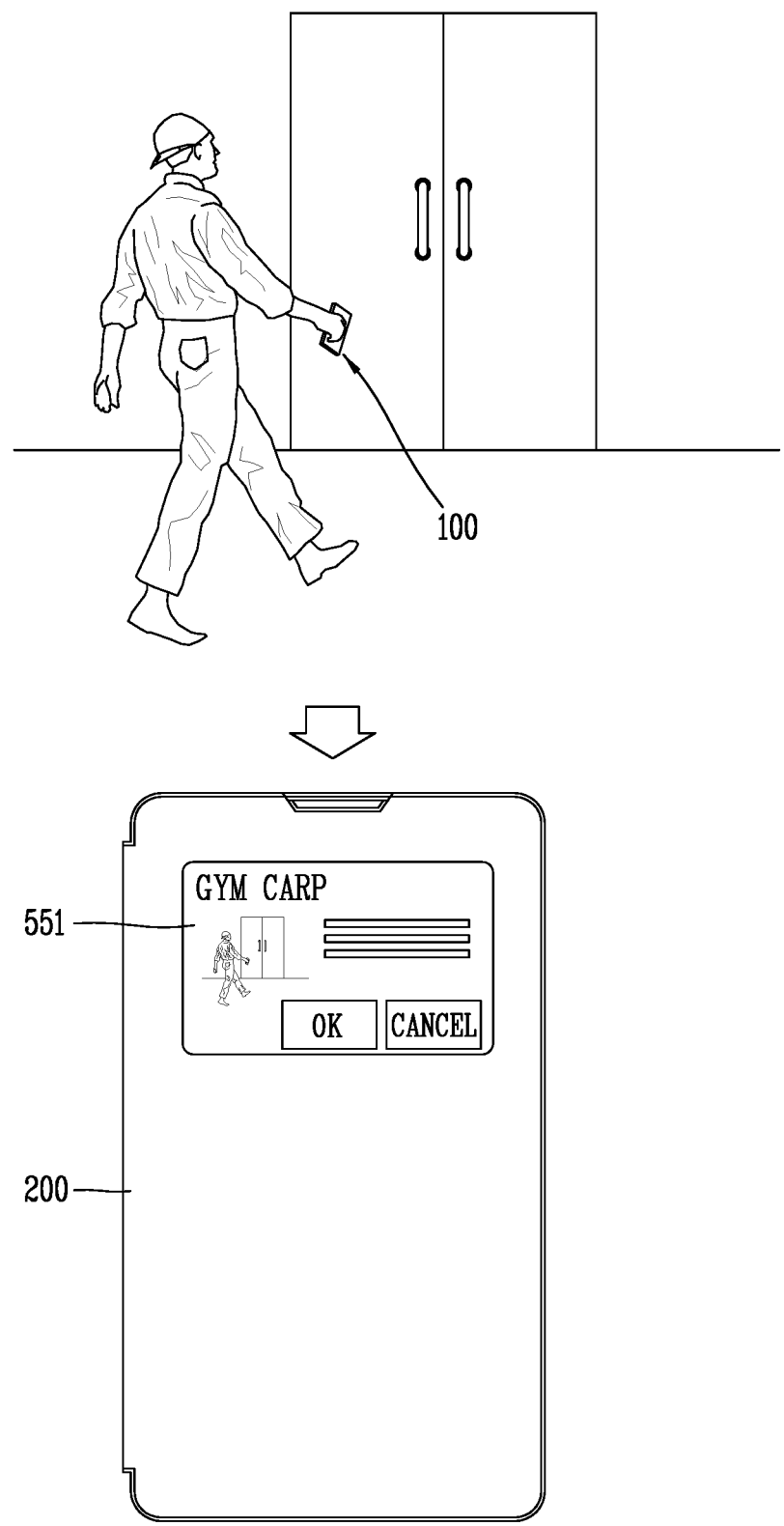
FIGS. 8A to 8E are conceptual diagrams illustrating a control method using a card module according to various embodiments.

Referring to FIG. 8A, the position information module 115 detects a location of the mobile terminal 100 including the cover 200. The controller 180 receives information related to the specific location sensed by the location information module 115 from a specific server.

The controller 180 controls the display unit 151 to output a recommended content item 551 corresponding to the selected card information using the information related to the location. For example, the card information corresponding to the recommended content item 551 may be related to a membership card available at the sensed location, an accumulation card available at the corresponding location, a coupon use card, or a card having a record of having been used at the location.

Accordingly, although the user does not select one of the plurality of content items, the user may be easily provided with desired card information, and card information that the user does not have may be provided to perform a more effective payment function.

Figure 8B:
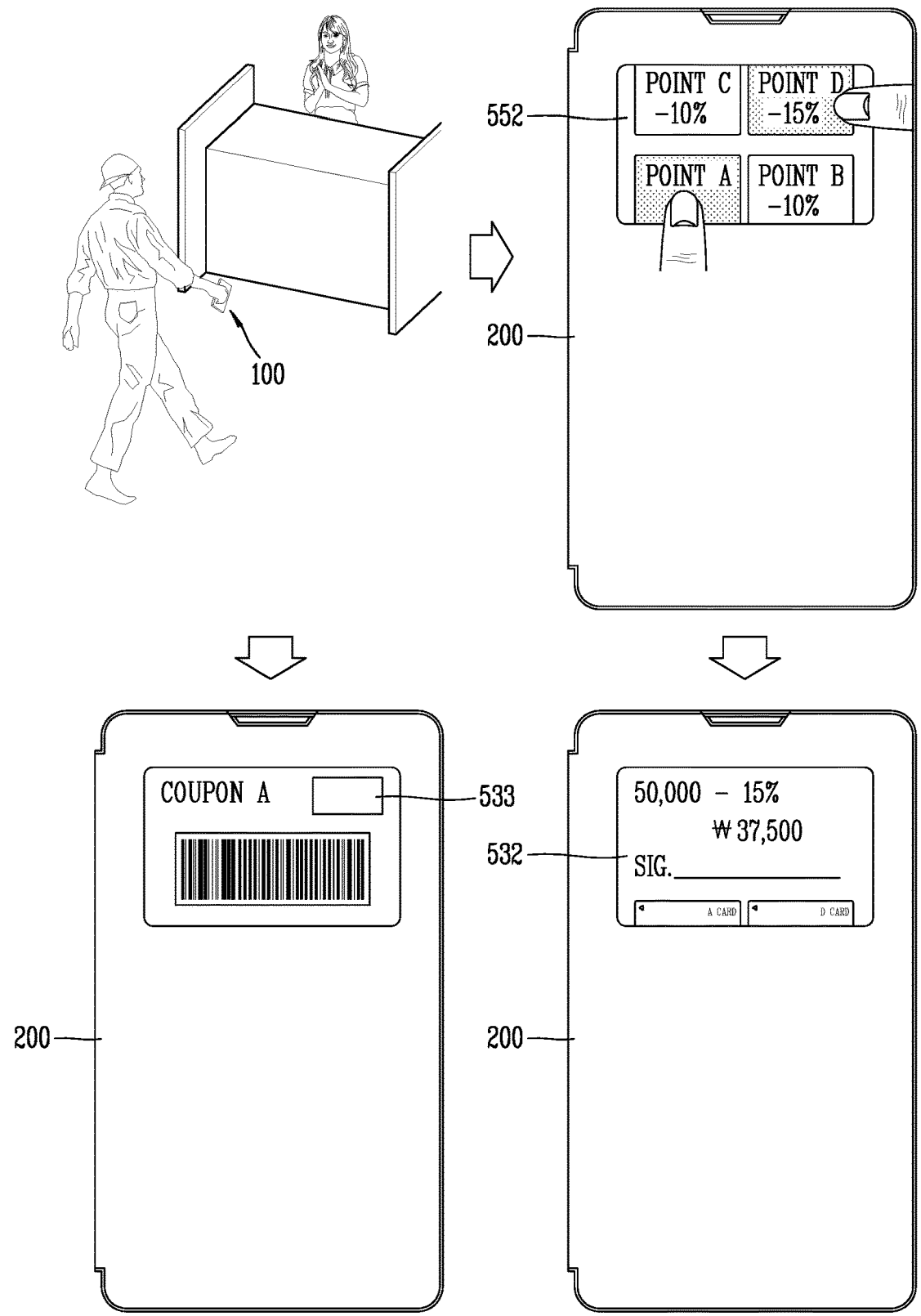

Referring to FIG. 8B, the controller 180 displays the second screen information 552 including a plurality of content items corresponding to a plurality of pieces of card information on the basis of the information related to the sensed specific location. For example, the controller 180 may search for a discount card, an accumulation card, and the like, which are available at the specific location, and may display corresponding content items.

The controller 180 may select a plurality of content items based on a user selection. The controller 180 may calculate the payment information based on the combination of the plurality of selected content items. The controller 180 outputs the payment information 532 on the display unit 151.

Meanwhile, the controller 180 detects a coupon available at the specific position based on the information related to the sensed specific position, and controls the display unit 151 to output coupon information 533. The coupon information 533 may include a barcode, so that the coupon information 533 may be used immediately. The coupon information 533 may be stored in the memory 170 or received from a specific server based on information related to the location.

Accordingly, although the user does not directly search for the card information and coupon information to be used, the user may be provided with information required for performing the card function.

However, the controller 180 provides the information in a state in which the card module is mounted on the cover, and does not provide the information when the card module is detached from the cover.

Figure 8C:
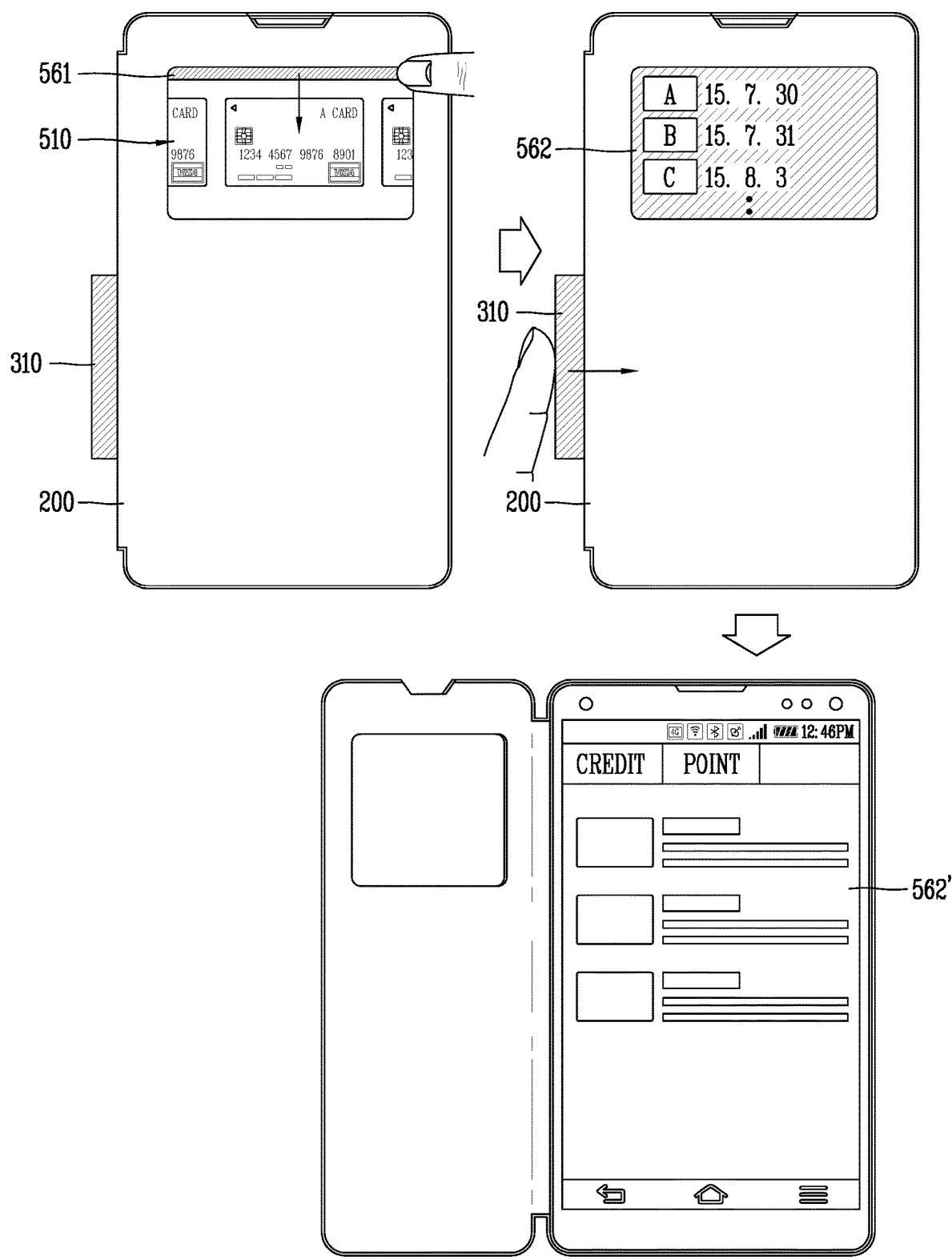

A control method for providing card function execution information using the card module will be described with reference to FIG. 8C. When it is detected that the card module 310 is drawn out from the cover 200, the display unit 151 outputs an indicator bar 561 together with the first screen information 510. The indicator bar 561 is displayed at the edge of a region of the display unit 151 exposed through the opening region.

The controller 180 controls the display unit 151 to output a payment list 562 related to the card function performed by the card module 310 based on a touch applied to the indicator bar 561 do. For example, the payment list 562 includes a type of used card information and payment information (date, use target, amount, etc.) of the card information.

In a state in which the card module is accommodated in the cover 200 again, when the cover module 200 is switched to an open state, that is, when the display unit 151 is entirely exposed, the controller controls the display unit 151 to output a list screen 562'.

According to the present embodiment, since the user may check the information of the card function executed by the card module, it is not necessary to check use history of each stored card information.

Figure 8D:
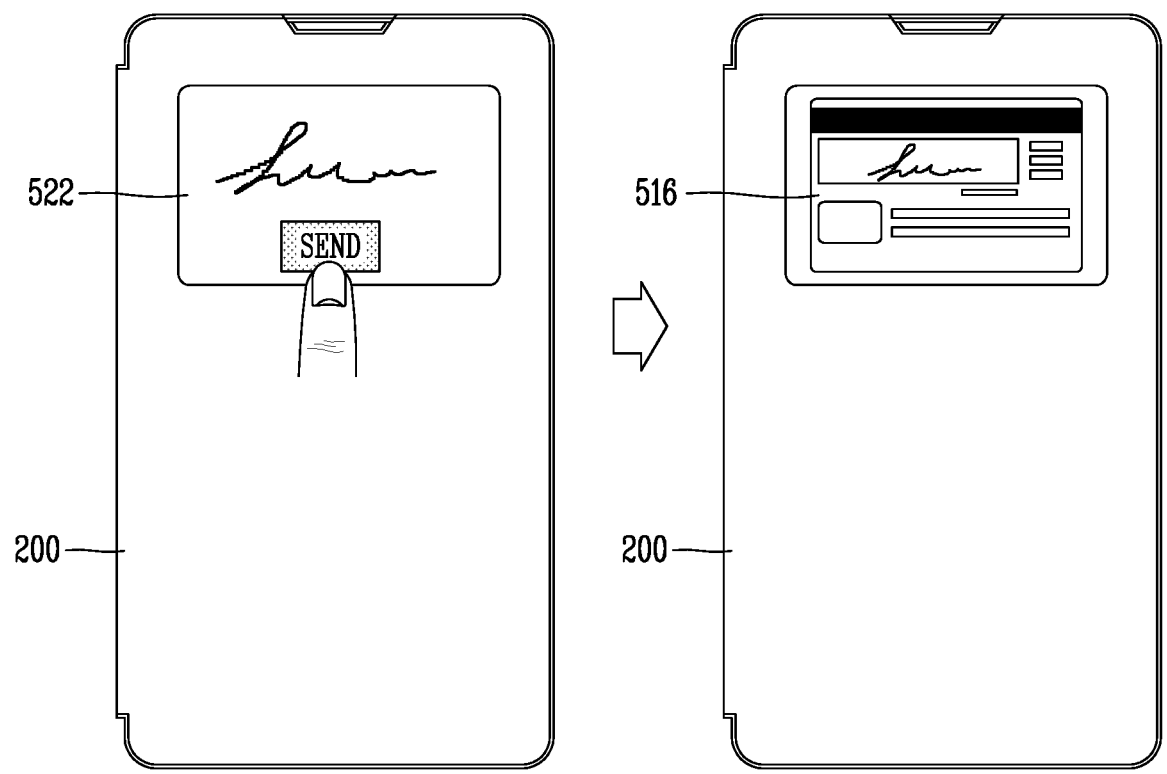

FIG. 8D is a conceptual diagram illustrating a control method of storing additional authentication information. When a touch is applied to the authentication input screen 522, the controller 180 forms a signature image based on a trace of a touch. The controller 180 stores the signature image together with at least one of pieces of the stored card information.

The display unit 151 displays the signature image together on the card image 516 corresponding to the card information. For example, the card image 516 may be a captured image of an actual card.

Figure 8E:
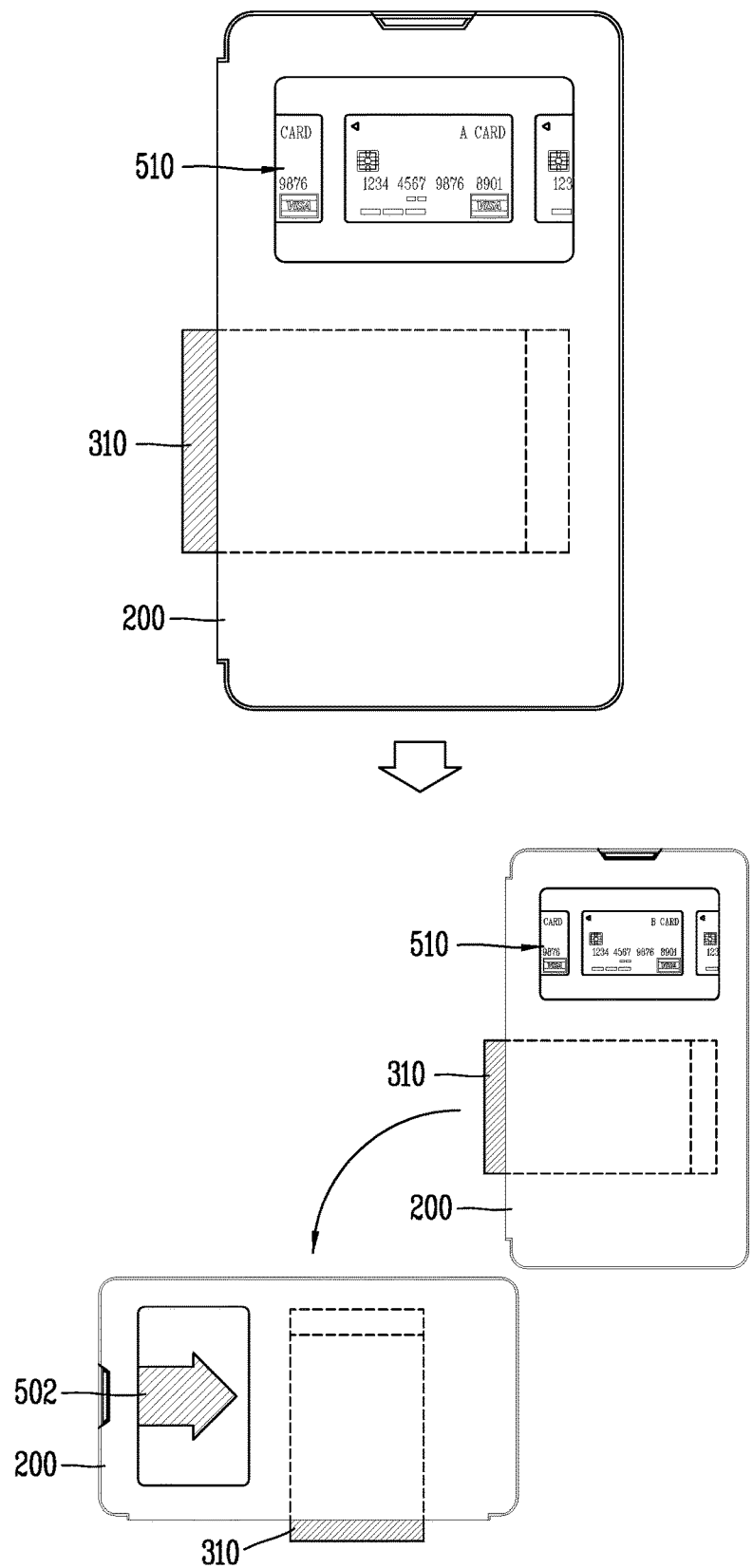

Referring to FIG. 8E, the controller 180 detects movement of the terminal body of the mobile terminal 100 in a state in which the card module 310 is drawn out from the cover 200. The controller 180 outputs a guide image 502 when the mobile terminal 100 rotates about 90° with respect to a gravity direction based on the gravity sensor. The guide image 502 indicates a direction in which the mobile terminal 100 is to move in order to use the card module 310.

Upon viewing the guide image 502, the user may move the card module 310 in a state in which the card module 310 is in contact with the payment device to perform a card payment function, or the like.

FIGS. 9A to 9E are conceptual diagrams illustrating a control method of a mobile terminal having a cover according to another embodiment of the present disclosure.

Figure 9A:
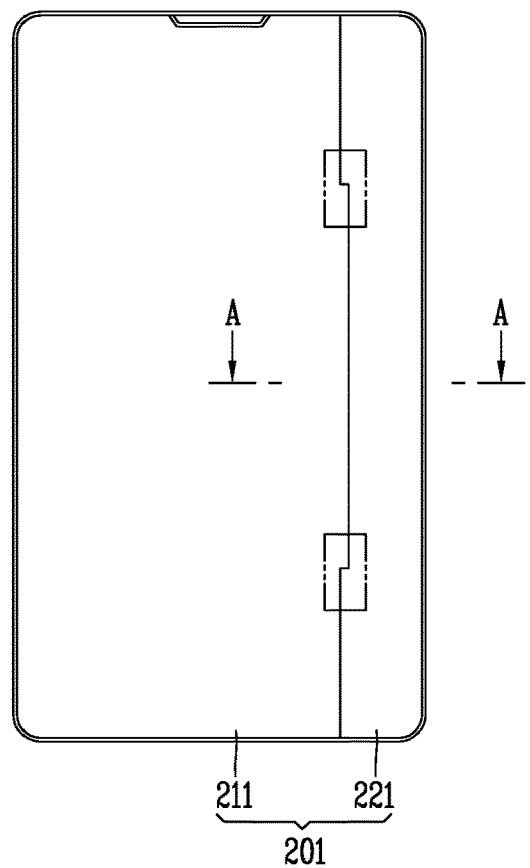
FIGS. 9A to 9E are conceptual diagrams illustrating a control method of a mobile terminal having a cover according to another embodiment of the present disclosure.
Figure 9B:
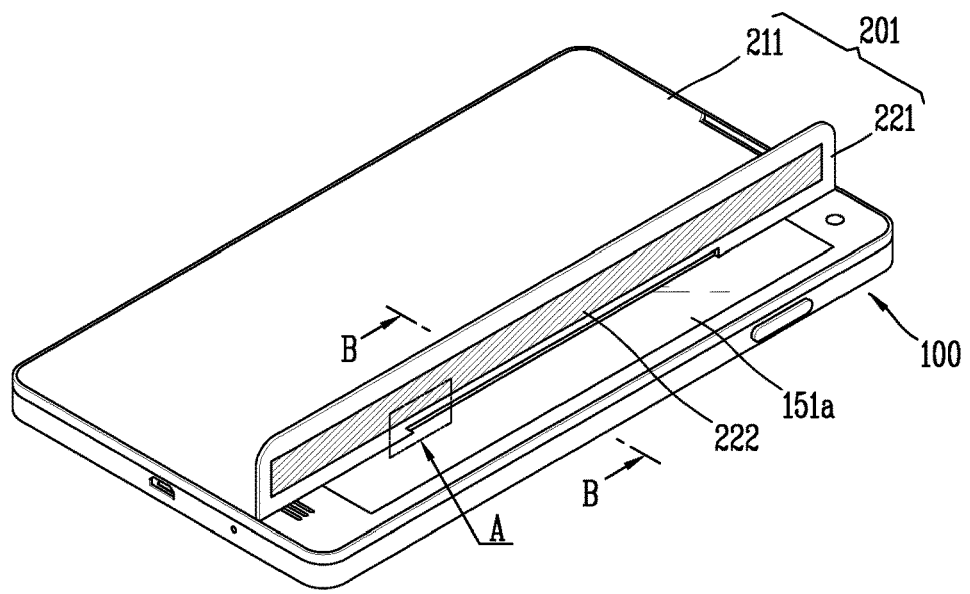

FIG. 9A is a conceptual diagram illustrating a closed state of the cover 201 according to the present embodiment, and FIG. 9B is a conceptual diagram illustrating an open state of the cover 201. Here, the open state is distinguished from an open state in which the entire display unit 151 is open by the cover 201.

The cover 201 according to the present embodiment is divided into a first region 211 and a second region 221. The first and second regions 211 and 221 are distinguished by a dividing line extending in a longitudinal direction of the display unit 151 and are formed to be folded on the basis of the dividing line. The second region 221 is rotated by an external force to form an angle with the first region 211.

Figure 9C:
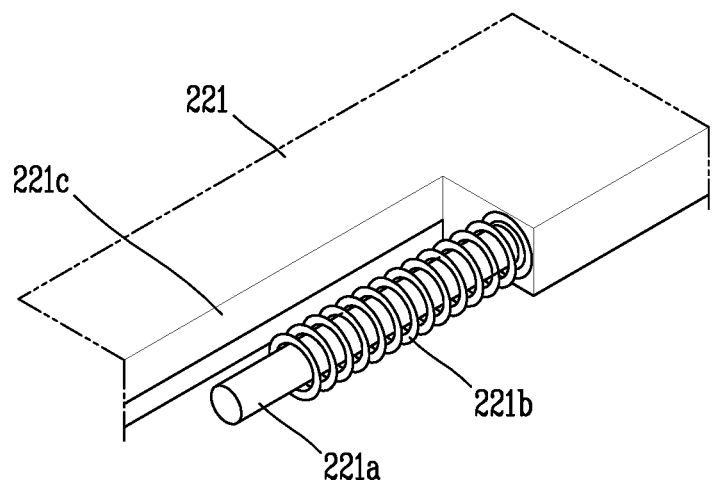
Figure 9D:
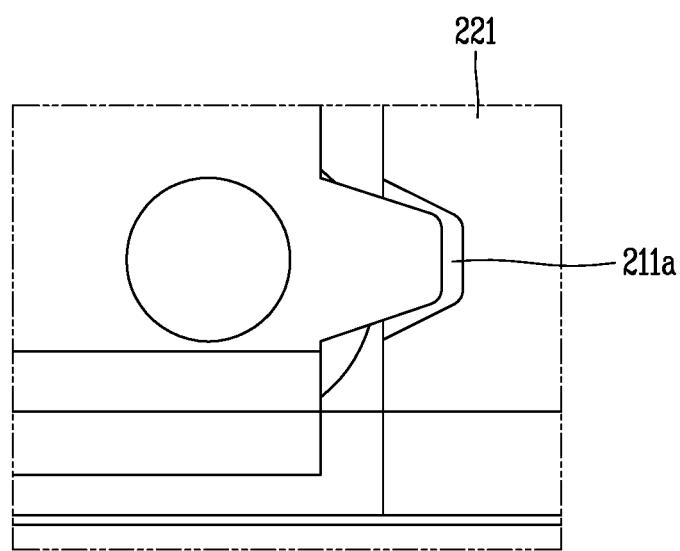

FIG. 9C is an enlarged view of region A in FIG. 9B, and FIG. 9D is a cross-sectional view, taken along B-B in FIG. 9B.

Referring to FIG. 9C, the first region 211 and the second region 221 are coupled to partially overlap each other. That is, the second region 221 includes a step 221c formed such that the first region 211 may overlap.

The second region 221 includes a coupling shaft 221b protruding from a portion of the second region 221 and a spring 221a formed to surround the coupling shaft 221b.

Referring to FIG. 9D, the first region 211 includes a protrusion, and the second region 221 includes a depression having a shape corresponding to the protrusion. A gap 221a may be formed in the first and second regions 211 and 221 by an external force (tension). When the second region 221 is folded on the basis of the first region 211 in a state where the gap 221a is formed, the protrusion of the second region 221 is caught by the step 221c, maintaining a vertical state.

In the open state, the first region 211 covers the display unit 151 and the second region 221 exposes one region of the display unit 151. Hereinafter, the one region is defined as a display region, and the display region extends in the longitudinal direction of the display unit 151 and corresponds to a region adjacent to one edge of the display unit 151. However, a shape of the display region 151b is not limited thereto, and the display region 151b is determined by a shape of the second region 221.

When the display region 151b is exposed by the second region 221, the controller 180 may activate only the display region 151b and output visual information.

A payment region including payment information is formed in the second region 221. For example, the payment region may include a magnetic part 222 including payment information. When the second region 221 is brought into contact with the payment device, the payment information may be transmitted to perform the payment function. The payment information includes card information selected by the user and additional information input from the outside (price to be paid, a discount rate, etc.).

That is, the card module is formed in the second region 221 of the cover 201. The user may perform the payment function by rotating the second region 221 to be folded with respect to the first region 211 and using the second region 221 drawn on the basis of the display unit 151 as a card module. The cover 201 and the mobile terminal 100 are electrically connected by a connection terminal and configured to transmit and receive card information.

Meanwhile, the second region 221 may include an RFID chip and an antenna unit. The controller 180 may transmit information stored in an object disposed in an adjacent region based on the RFID chip and the antenna unit. That is, the RFID chip transmits stored information using electromagnetic waves, and may transmit a portion of the card information stored in the memory 170 to the outside. For example, when card information to be used is selected, the controller 180 may position the second region 221 adjacent to an RFID reader and perform a payment function using the card information.

Meanwhile, a display module may be formed on an outer surface of the second region 221. The display module outputs visual information even when the second region 221 covers the display unit 151. The display module may further include a touch sensor for sensing a touch of a user. A fingerprint sensor may be formed on the inner surface of the second region 221.

Hereinafter, a control method of the mobile terminal using the cover 201 according to a specific embodiment will be described.

Figure 9E:
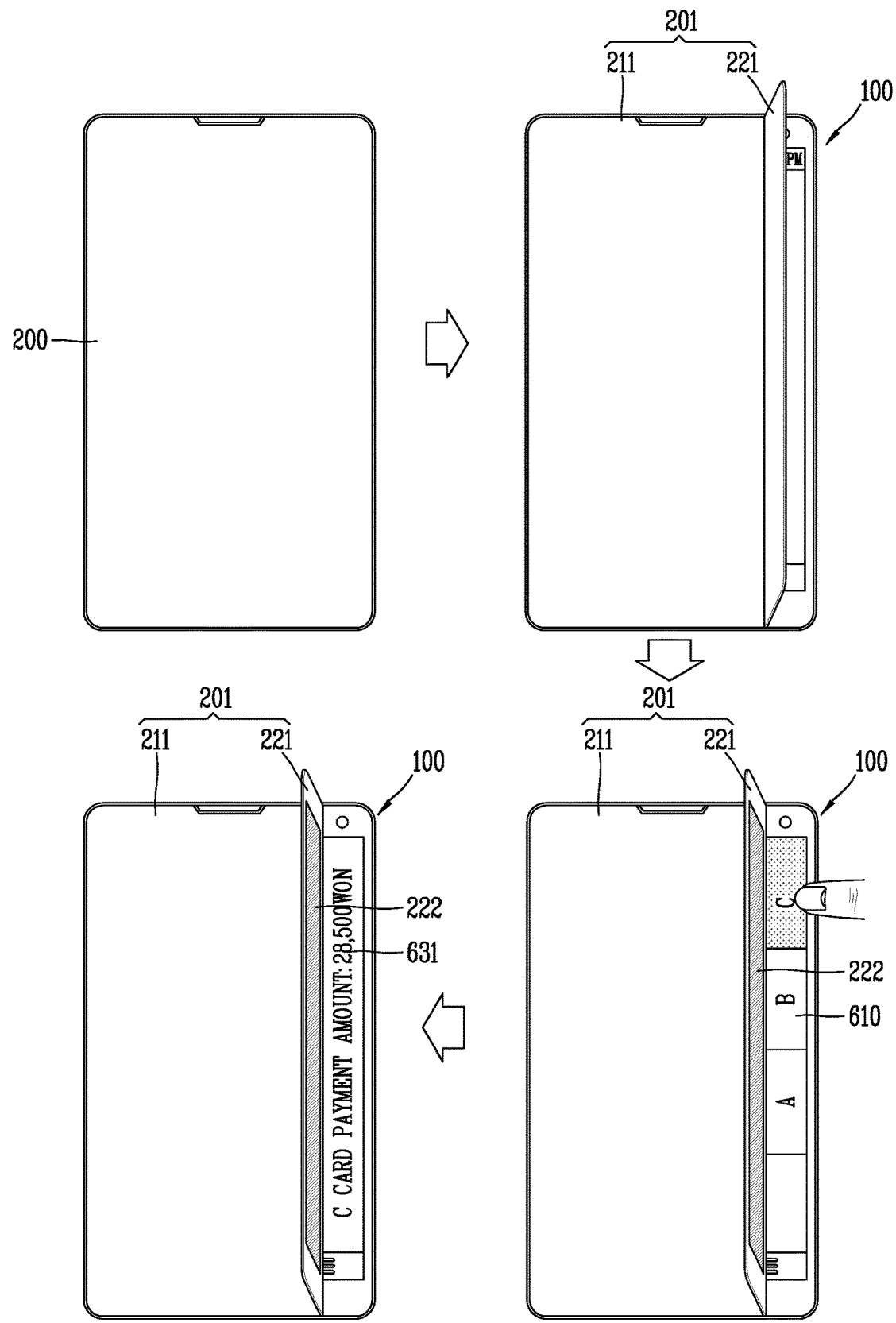

Referring to FIG. 9E, when a display region 151b of the display unit 151 is exposed by the second region 221, the controller 180 controls the display unit 151 to output first screen information 610. The cover 201 may further include a sensor for sensing movement of the second region 221. The display unit 151 may determine whether the second region is open by sensing whether the second region 221 is touched.

The first screen information 610 may include the plurality of content items, and the plurality of content items may correspond to a plurality of pieces of different card information, respectively. On the basis of a touch applied to the first screen information 610, the controller 180 applies at least one of the plurality of content items to the card module of the second region 221. After the content item is selected, when a payment function is performed by contact with the payment device, the controller controls the display unit 151 to output payment information 631 on the display region 151b.

According to the present embodiment, the card function may be performed by utilizing a region of the cover that covers the display unit 151, without mounting the card module within the cover or the terminal body of the mobile terminal.

Hereinafter, a control method of the card function using the second region will be described.

FIGS. 10A to 10D are conceptual diagrams illustrating an authentication method using a second region of a cover according to various embodiments.

Figure 10A:
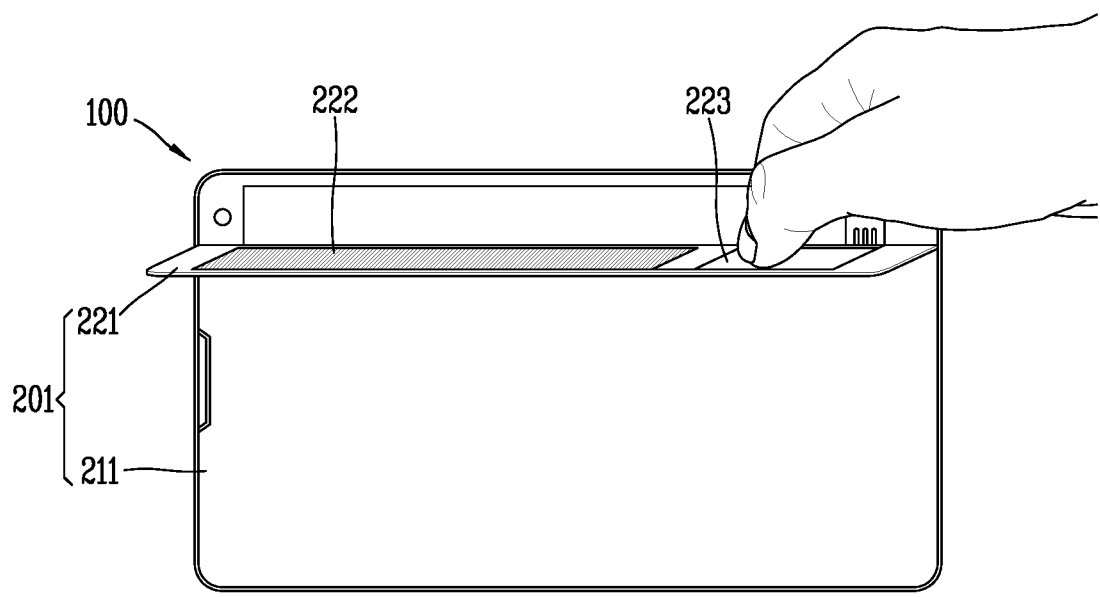
FIGS. 10A to 10D are conceptual diagrams illustrating an authentication method using a second region of a cover according to various embodiments.
Figure 10A:
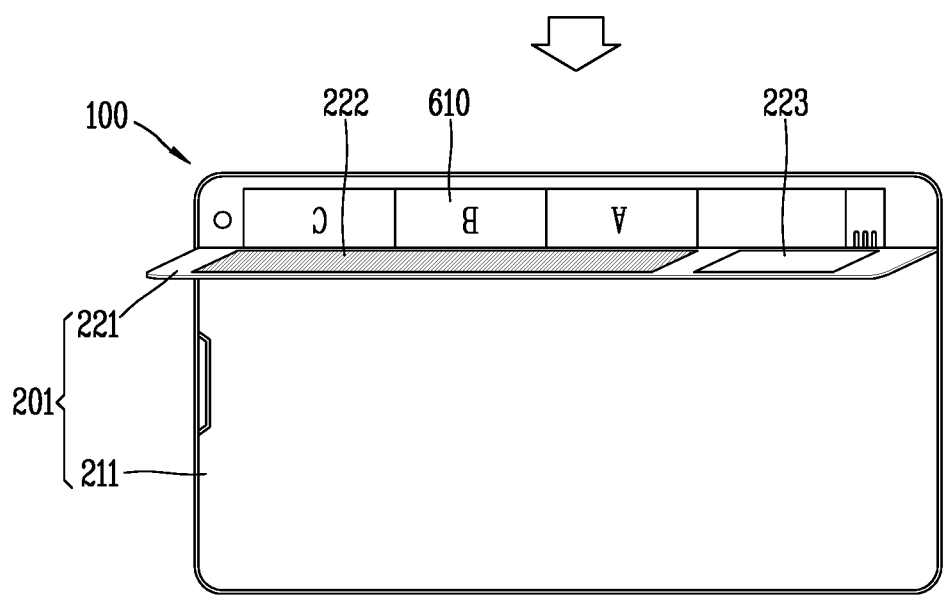

The cover 201 according to FIG. 10A further includes a fingerprint sensor 223 formed on an inner surface of the second region 221. The fingerprint sensor 223 may be disposed adjacent to a magnetic part 222.

When the display region 151*b* is exposed by the second region 221, the controller 180 activates the fingerprint sensor 223. The controller 180 may maintain the display region 151*b* in an inactive state until the user is authenticated by the fingerprint sensor 223.

If a fingerprint sensed by the fingerprint sensor 223 matches a previously stored user fingerprint, the controller 180 completes the user authentication. The display unit 151 outputs the first screen information 610 to the display region 151*b*.

Figure 10B:
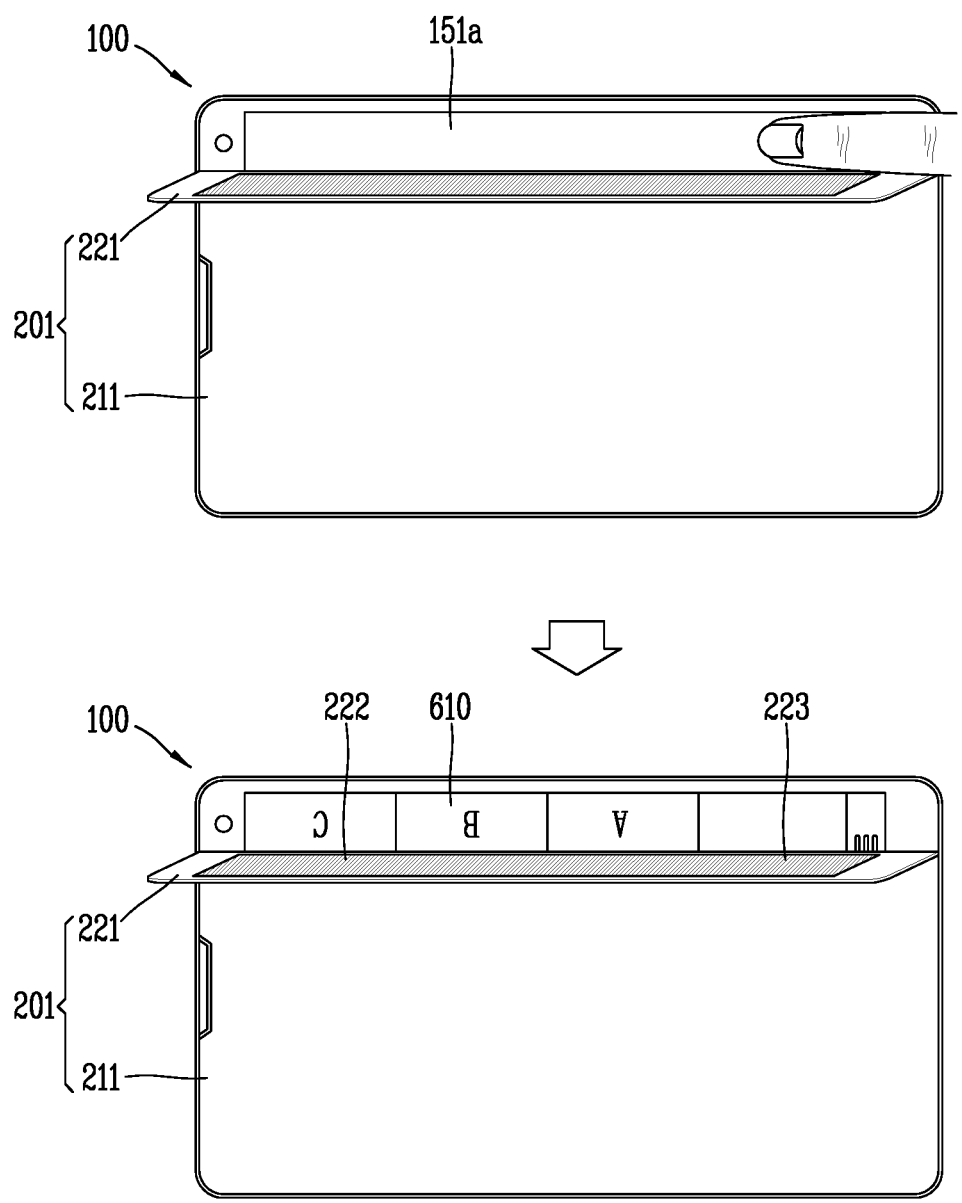

Referring to FIG. 10B, when the display region 151*b* is exposed by the second region 221, the controller 180 activates a fingerprint sensor formed in the display region 151*b*.

If a fingerprint sensed by the fingerprint sensor 223 matches the previously stored user fingerprint, the controller 180 completes the user authentication. The display unit 151 outputs the first screen information 610 to the display region 151*b*. The display unit 151 may temporarily output the fingerprint image sensed by the fingerprint sensor 223.

According to the present embodiment, since the user may perform the user authentication procedure directly using the second region or using one exposed region of the display unit 151 in a state where the second region is switched to the open state, a separate control command for authentication is unnecessary.

Figure 10C:
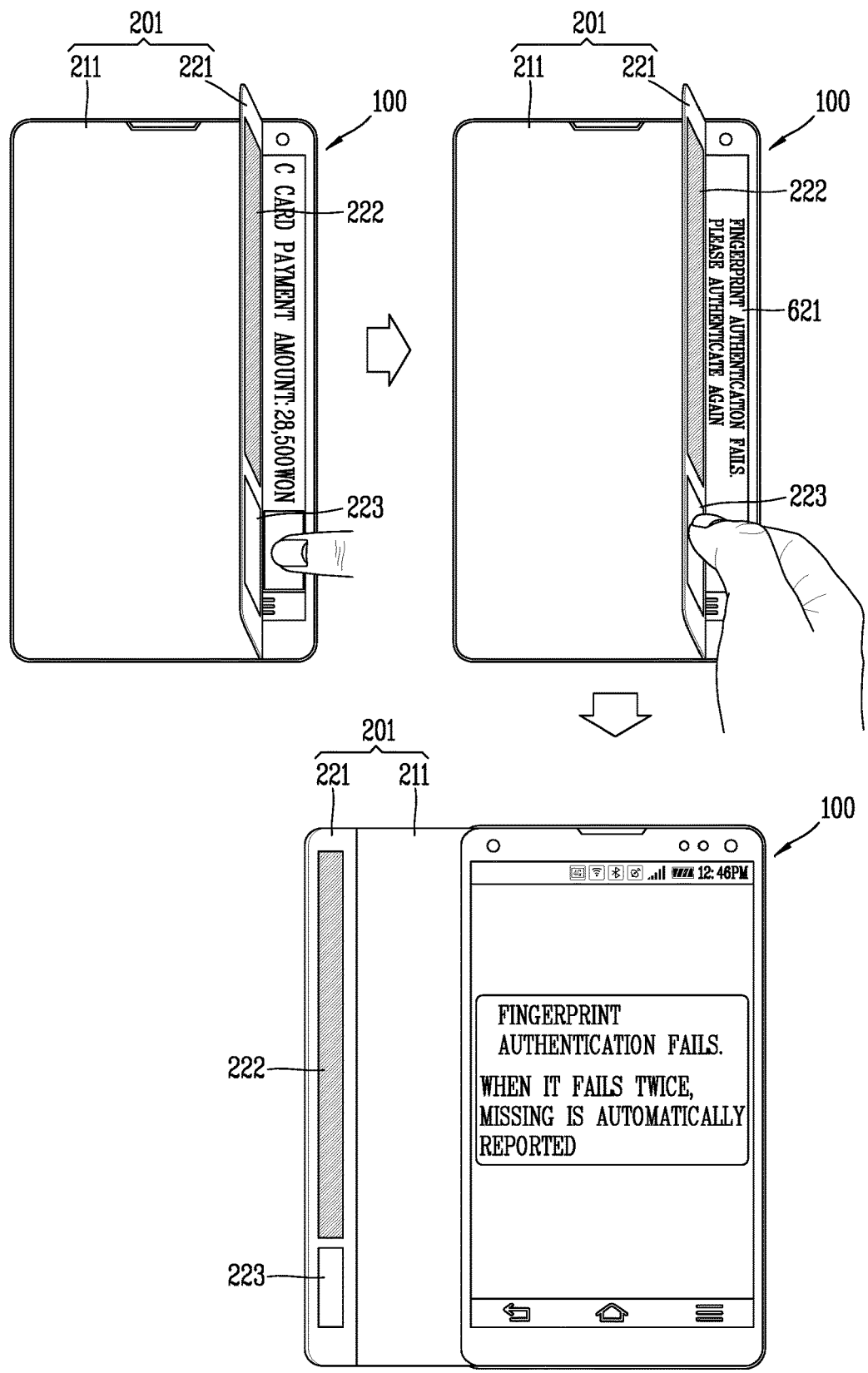

FIG. 10C is a conceptual diagram illustrating an authentication procedure performed after the second region contacts the payment device and payment information is received. When the second region 221 contacts the payment device, the controller 180 controls the display unit 151 to output the received payment information 631 together with card information applied to the second region 221. The state in which the payment information 631 is output on the display unit 151 corresponds to a state in which the payment step has not yet been completed.

The display unit 151 may output an icon for receiving a touch input to proceed with payment based on the payment information. The controller 180 activates the fingerprint sensor 223 formed in the second region 221 based on a touch applied to the icon.

If the authentication by the fingerprint sensor 223 fails, the controller 180 controls the display unit 151 to output authentication failure information 621 to the display region 151*b*.

When the entire region of the display unit 151 is exposed by the first and second regions 211 and 221, the controller 180 controls the display unit 151 to display an authentication notification screen 622 including the authentication failure information. The authentication notification screen 5622 may include an authentication failure count and a warning message in case of continuous authentication failure.

Figure 10D:
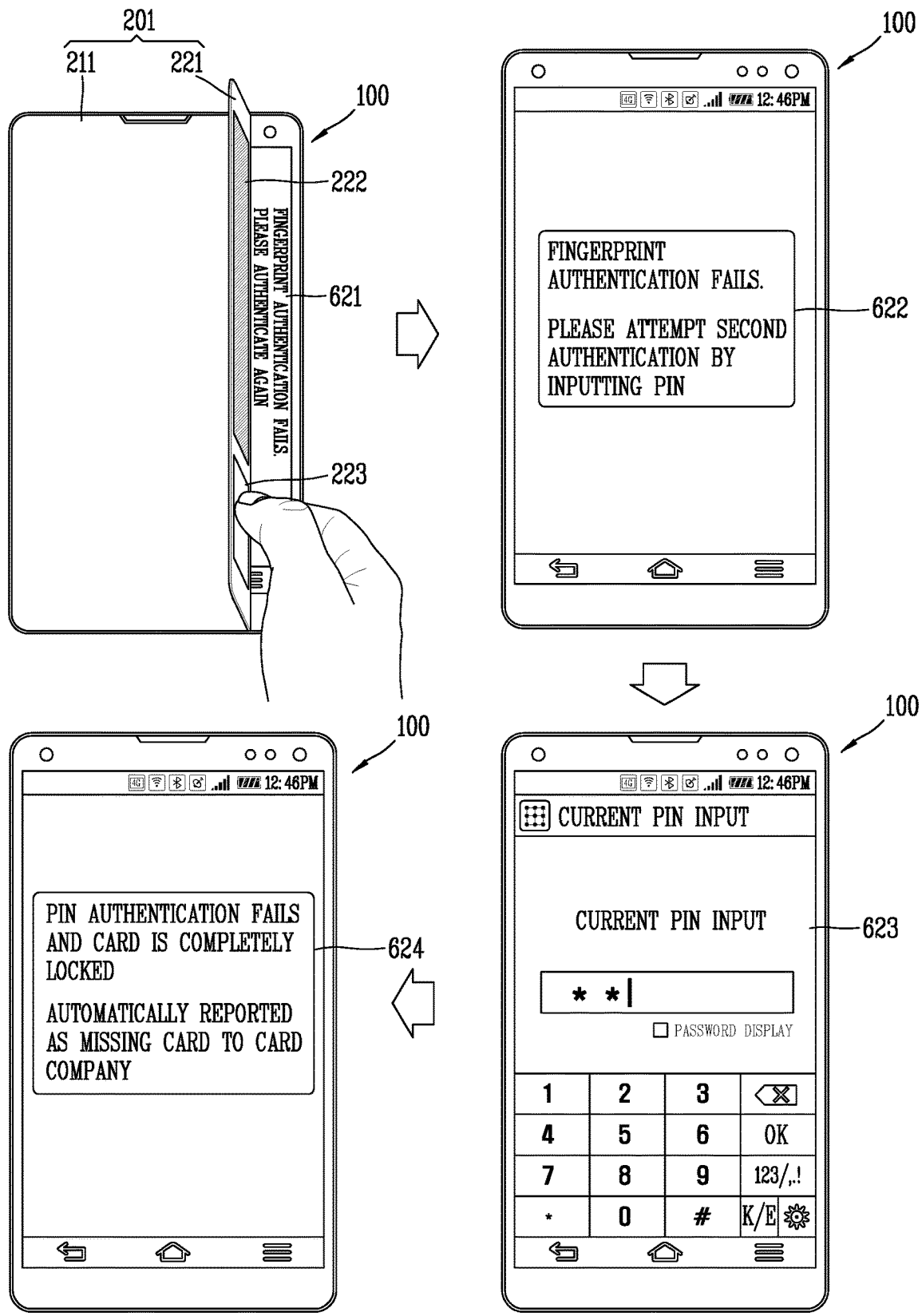

FIG. 10D is a conceptual diagram illustrating a control method in case of repeated authentication failure. The display region 151*b* outputs the authentication failure information 621 when authentication fails.

When the entire region is exposed by the cover 201, the display unit 151 outputs the authentication notification screen 622. When the authentication failure is repeated by a preset reference number, the display unit 151 outputs an additional authentication screen 623.

The additional authentication screen 623 includes an input window for receiving different kinds of authentication information. For example, the authentication information may be a password, a PIN number, and the like, previously set by the user.

Meanwhile, when authentication based on input authentication information fails again, the controller 180 interrupts use of the card module formed in the second region 221. Accordingly, the user may not be able to use the card module, although the user inputs additional authentication information in the second region 221.

According to the present embodiment, since the use of the card module is interrupted in case of repeated failure of authentication, complementation of the card module mounted on the cover which is easily exposed by someone else may be enhanced.

Figure 11A:
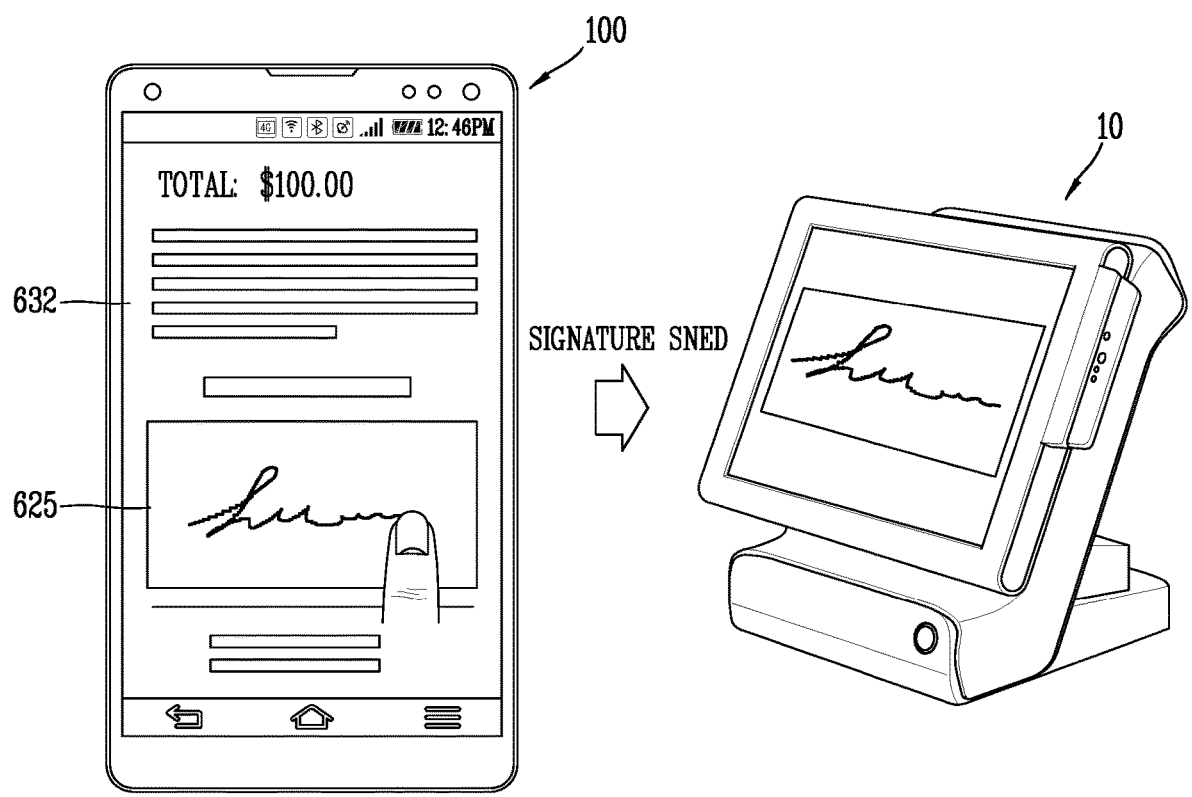
FIGS. 11A to 11B are conceptual diagrams illustrating a control method of inputting signature information.
Figure 11B:
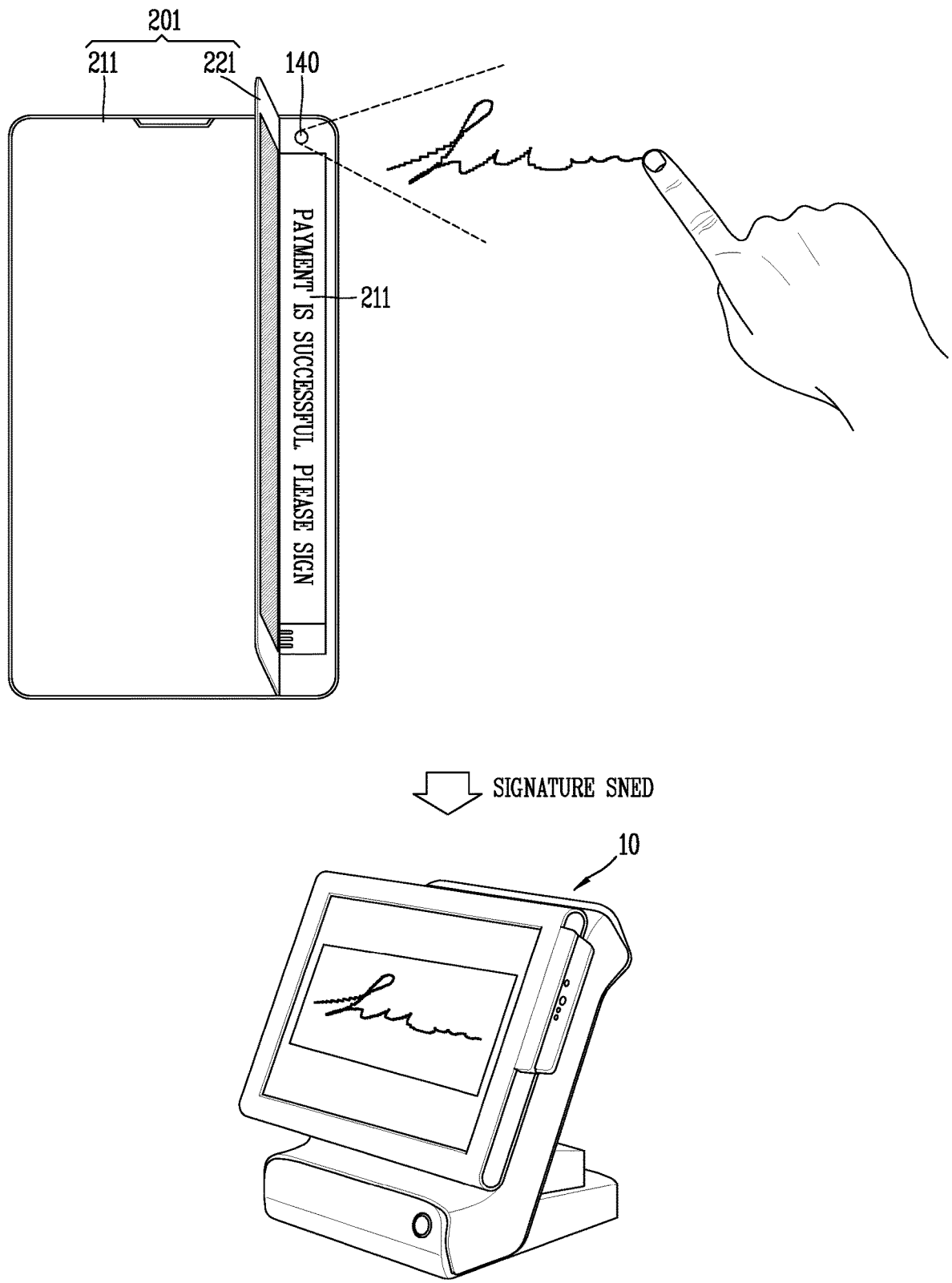

FIGS. 11A and 11B are conceptual diagrams illustrating a control method of inputting signature information.

Referring to FIG. 11A, when the payment information is received, the display unit 151 outputs a payment information screen 632. The payment information screen 632 may include a payment amount, a payment target, a payment time, a degree of discount, whether another card is used, and the like, and include an input window 625 for receiving signature information.

The controller 180 forms signature information on the display unit 151 by a touch applied to the display unit 151, and controls the display unit 151 to output a signature image corresponding to the signature information. The controller 180 transmits a signature image (or signature information) to the payment device 10. When the signature information is received by the payment device 10, the payment step may be completed.

Referring to FIGS. 9A, 9B and 11B, the controller 180 performs control to output a payment information screen 620 on the display region 151*b* and activates a motion sensor when the payment information is received. The motion sensor may be disposed on the front surface of the mobile terminal 100 exposed by the second region 221.

The controller 180 forms the signature information based on movement of a user's hand sensed by the motion sensor. The controller 180 transmits the signature image corresponding to the signature information to the payment device 10. When the signature information is received by the payment device 10, the payment step may be completed.

According to this embodiment, since the user may input the signature information to confirm completion of the payment step using the mobile terminal, it is easy to perform the payment procedure even when the user is away from the clerk, an additional input unit such as paper, a payment pad, and the like, is not necessary.

Figure 12A:
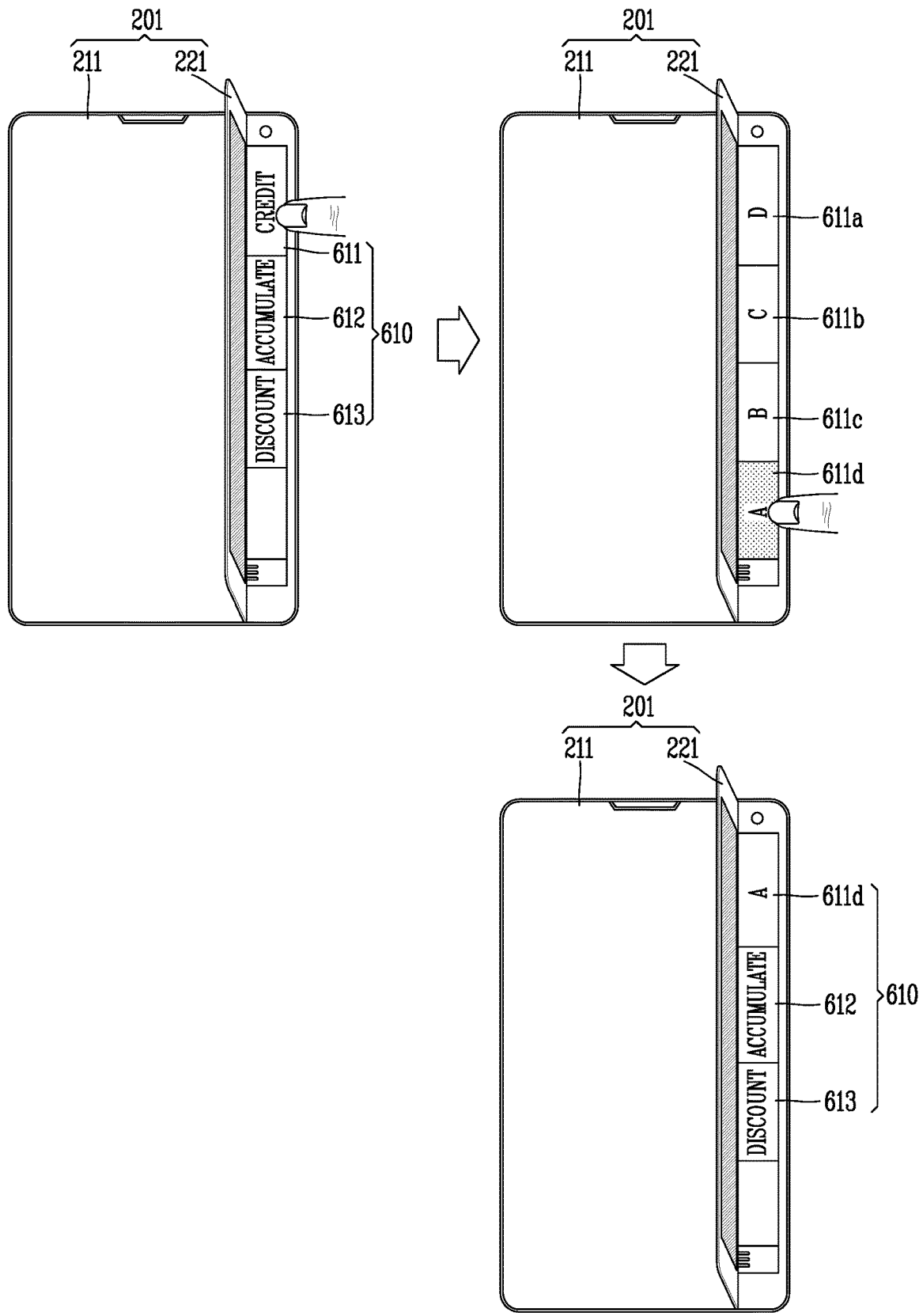
FIGS. 12A and 12B are conceptual diagrams illustrating a control method of applying card information to a card module in case where a card module is implemented in a second region.
Figure 12B:
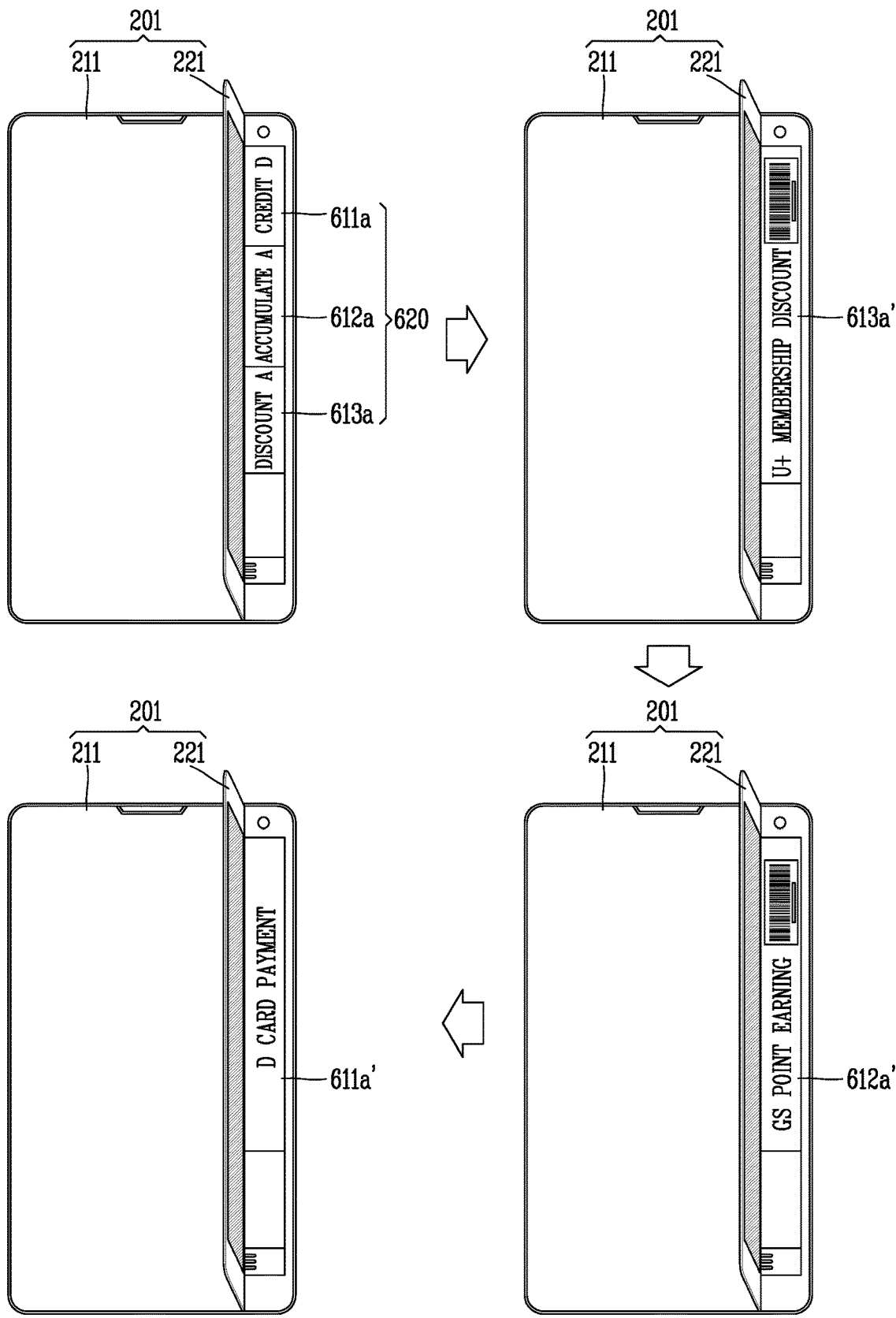
Figure 12C:
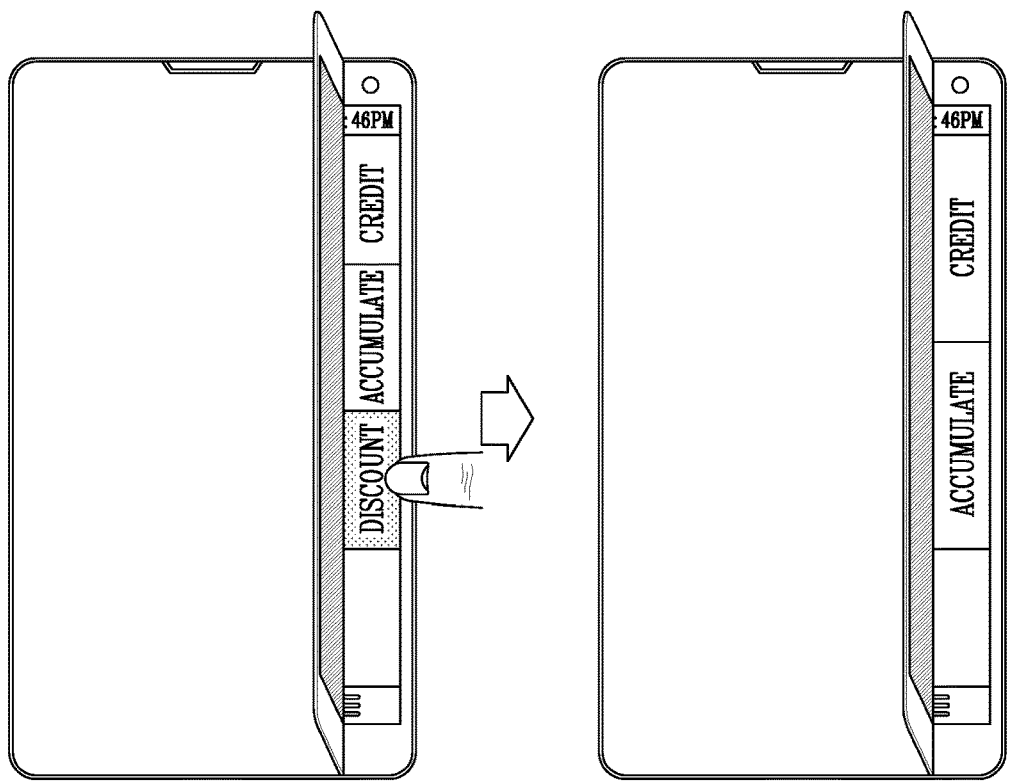
Figure 12D:
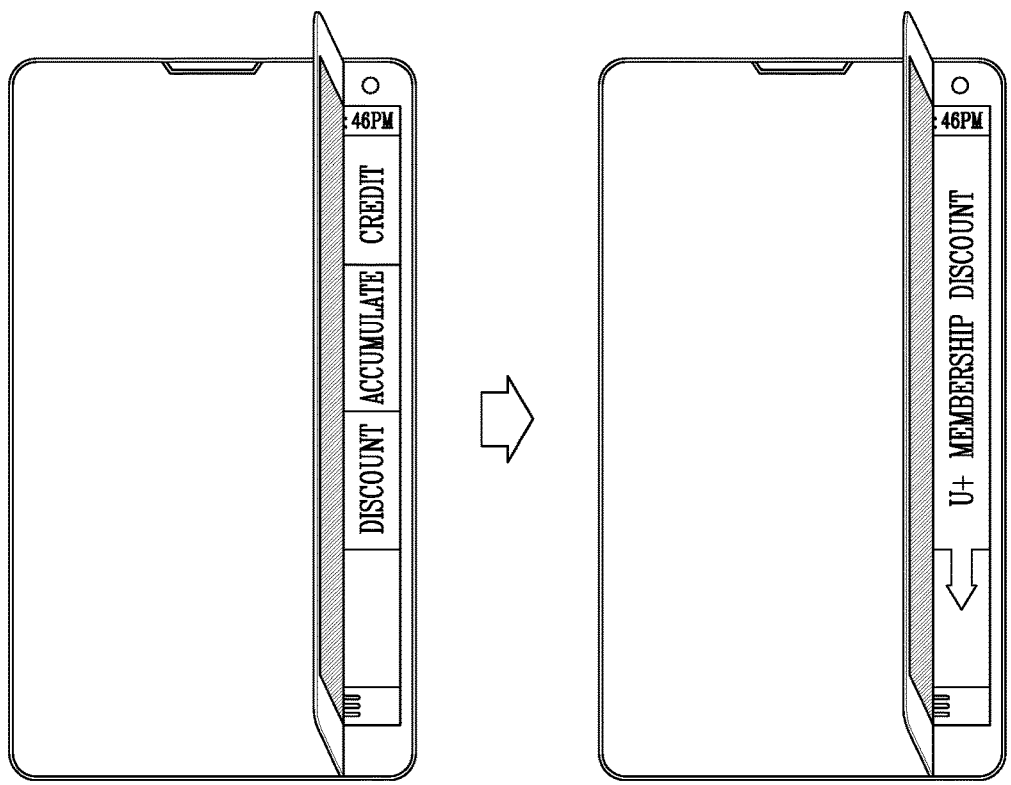

FIGS. 12A and 12B are conceptual diagrams illustrating a control method of applying card information to a card module when the card module is implemented in the second region.

Referring to FIG. 12A, when the display region 151*b* is exposed by the second region 221, the first screen information 610 including first to third categories 611, 612, and 613 is output. Here, the category is a result of classifying a plurality of pieces of card information stored in the memory 170 based on a specific criterion. The first category 611 corresponds to a credit card which may be a type of card available for paying an amount. The second category 612 corresponds to card information for earning points according to a specific criterion, and the third category 613 corresponds to card information for discounting an amount. Types of categories are not limited thereto.

When a category is selected, the display unit 151 outputs a corresponding card list. For example, when the first category 611 is selected, the first to fourth content items 611a, 611b, 611c and 611d corresponding to the card information classified into the first category 611 may be output.

The controller 180 applies card information corresponding to one selected from the plurality of content items to the card module of the second region. When the first content item 611a is selected among the plurality of content items, the controller 180 controls the display unit 151 to output the first screen information 610 including the first content item 611a on the display region 151b. That is, the first content item 611a is displayed instead of the first category 611 on the first screen information 610.

Accordingly, the user may be provided with card information classified by categories and may apply pieces of card information included in different categories to the card module in an overlapping manner.

Referring to FIG. 12B, the display unit 151 outputs a selection card screen 620 including a plurality of content items 611a, 612a, and 613a classified into different categories. When the plurality of content items are selected, the controller 180 sequentially outputs detailed card information corresponding to each content item. For example, the controller 180 sequentially outputs discount card information 613a', accumulation card information 612a', and payment card information 611a'.

Alternatively, the user may check the detailed card information corresponding to the plurality of selected content items by applying a touch to the display region 151b.

Figure 13:
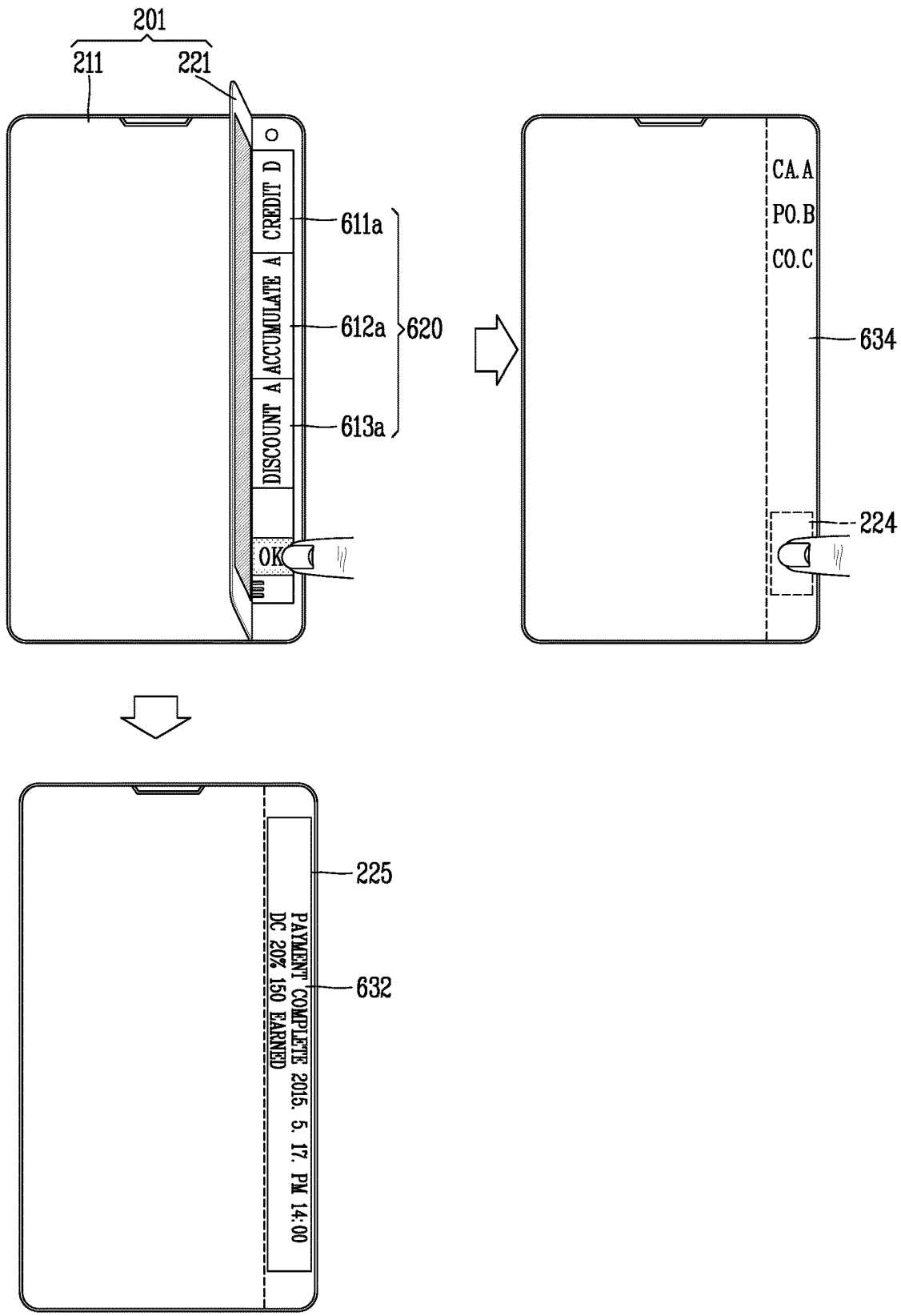
FIG. 13 is a conceptual diagram illustrating a control method of outputting card information to a display module of a second region.

FIG. 13 is a conceptual diagram illustrating a control method of outputting card information to the display module of the second region. The display region 151b outputs a selection card screen 620 including a plurality of content items 611a, 612a, and 613a classified into different categories.

After the plurality of content items are selected, when the display unit 151 is switched to the closed state by the second region 221, the controller 180 outputs the selection card information 634 by a display module (not shown) formed on an outer surface of the second region 221.

The display module (not shown) is activated in the closed state and outputs visual information although the display unit 151 is switched to the inactive state. The selection card information 634 may be text or an image regarding the selected card. The controller 180 may activate the fingerprint sensor 224 to receive additional authentication information for proceeding with payment by the selected content items.

Meanwhile, after payment is completed according to the card information of the selected content items, when the second region 221 is switched to the closed state, the controller 180 controls the display module to output payment information 632. Alternatively, when the second region 221 is switched to the closed state, the controller 180 may form a control command to complete the payment step.

Meanwhile, the second region 221 may be configured as a light-transmissive region, rather than including the display module. Accordingly, when the display unit 151 is switched to the closed state, visual information of one region on the display unit 151 corresponding to the second region 221 may be noticed.

According to the present embodiment, even when the display unit 151 is in the closed state, the card information or payment information may be easily recognized.

Figure 14A:
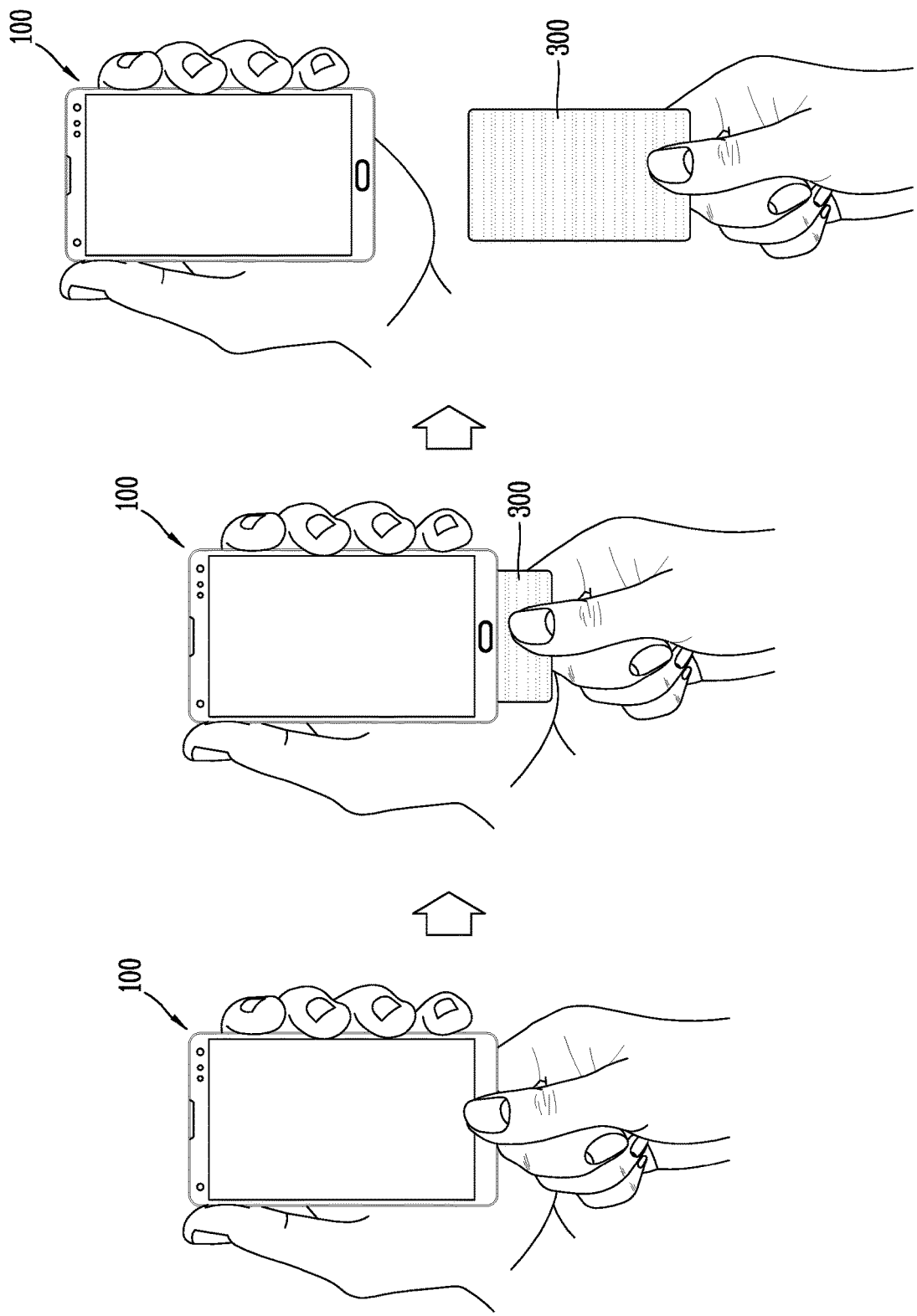
FIGS. 14A to 14C are conceptual diagrams illustrating a control method of a card module according to another embodiment.
Figure 14B:
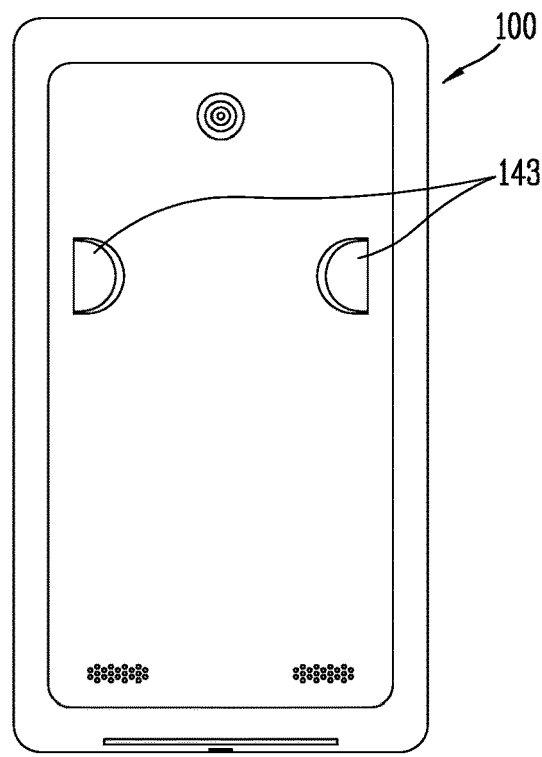
Figure 14C:
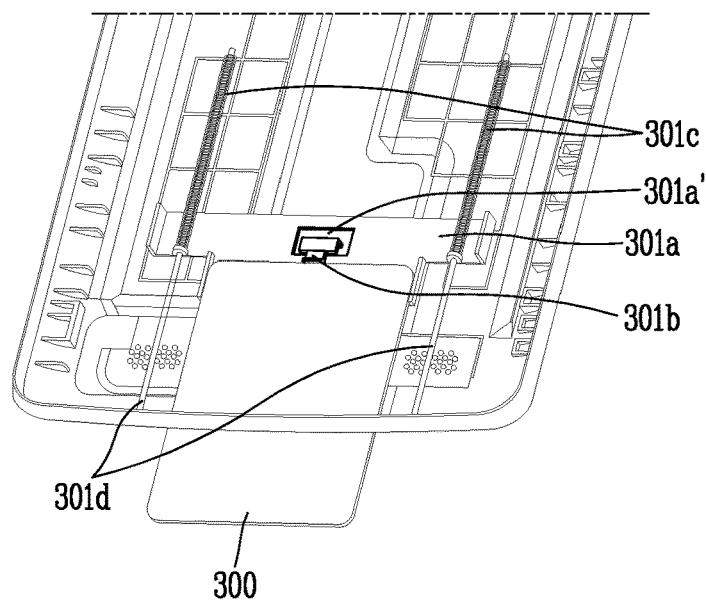

FIGS. 14A to 14C are conceptual diagrams illustrating a control method of a card module according to another embodiment. Referring to FIG. 14A, the card module 300 according to the present embodiment is mounted inside the terminal body of the mobile terminal 100. The card module 300 is formed to be detachable from the terminal body by an external force of the user.

The fingerprint sensor 143 may be provided on the rear surface of the terminal body of the mobile terminal 100 according to the present embodiment. When user authentication is completed by the fingerprint sensor in a state in which the card module 300 is accommodated in the terminal body of the mobile terminal, the controller 180 elastically moves the card module 300 such that a region of the card module 300 is exposed to the outside.

Referring to FIG. 14C, the terminal body includes an elastic moving part 301 connected to the card module 300 to elastically move the card module 300. The elastic moving part 301 includes a moving plate 301a and a fixing part 301b for fixing the card in the received state. The moving plate 301a includes a hole 301a' into which one end of the fixing part 301b is inserted, and the other end of the fixing part 301b overlaps the card module 300 to fix the card module 300. A pair of guide rods 301d are formed at both ends of the moving plate 301a and a pair of elastic members 301c are formed along the guide rods 301d.

When user authentication is completed, the controller 180 moves the card module 300 to be drawn to the outside by the elastic member 301c. Meanwhile, the card module 300 may be separated from the fixing part 301b by an external force. When an external force is applied to move the card module 300 to the inside of the terminal body, the card module 300 is again inserted into the fixing part 301b and stored therein.

Addition of Description of Structure Fixed when Received Inside

Figure 15A:
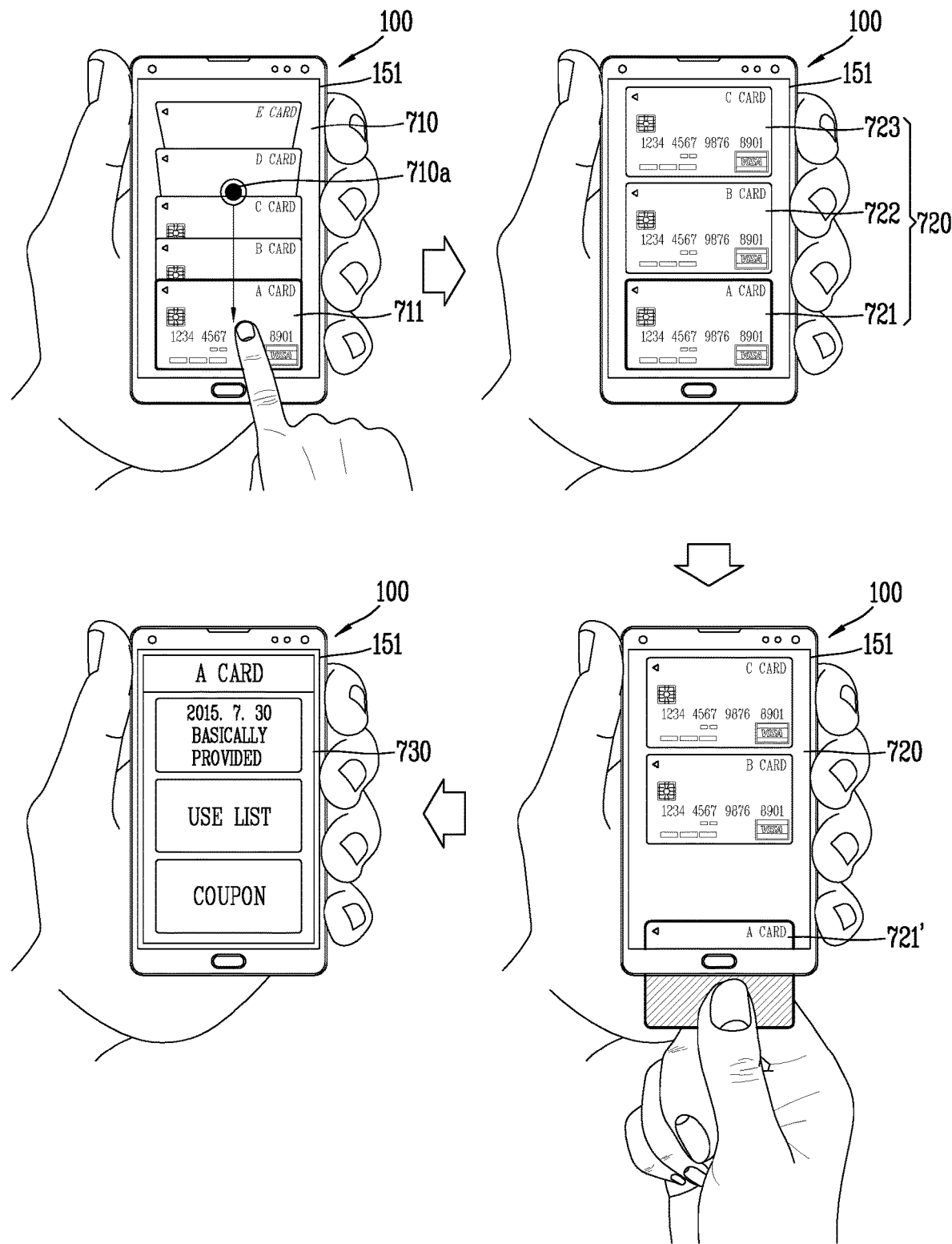
FIGS. 15A to 15C are conceptual diagrams illustrating a control method of the card module of FIG. 14A.
Figure 15B:
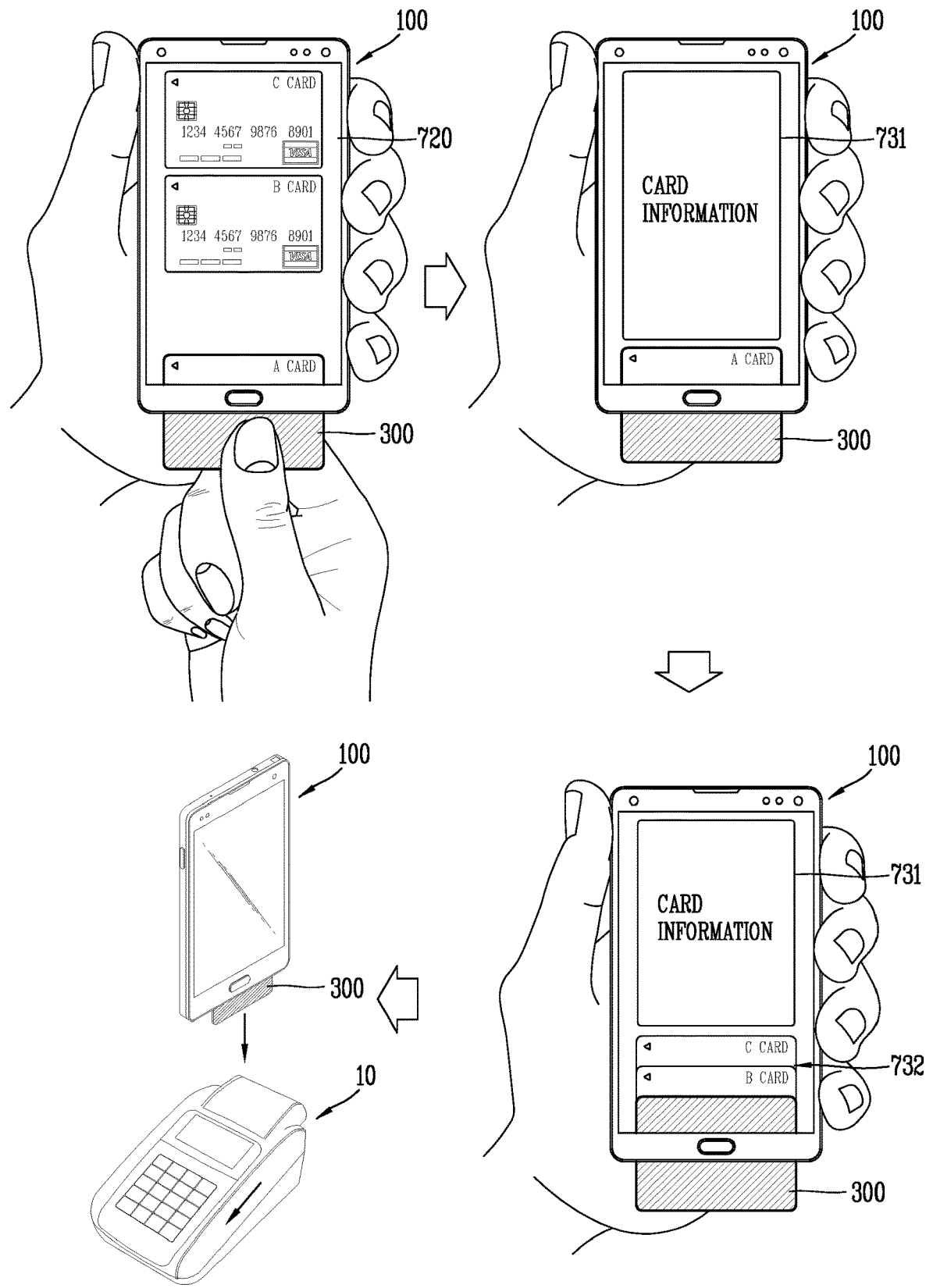
Figure 15C:
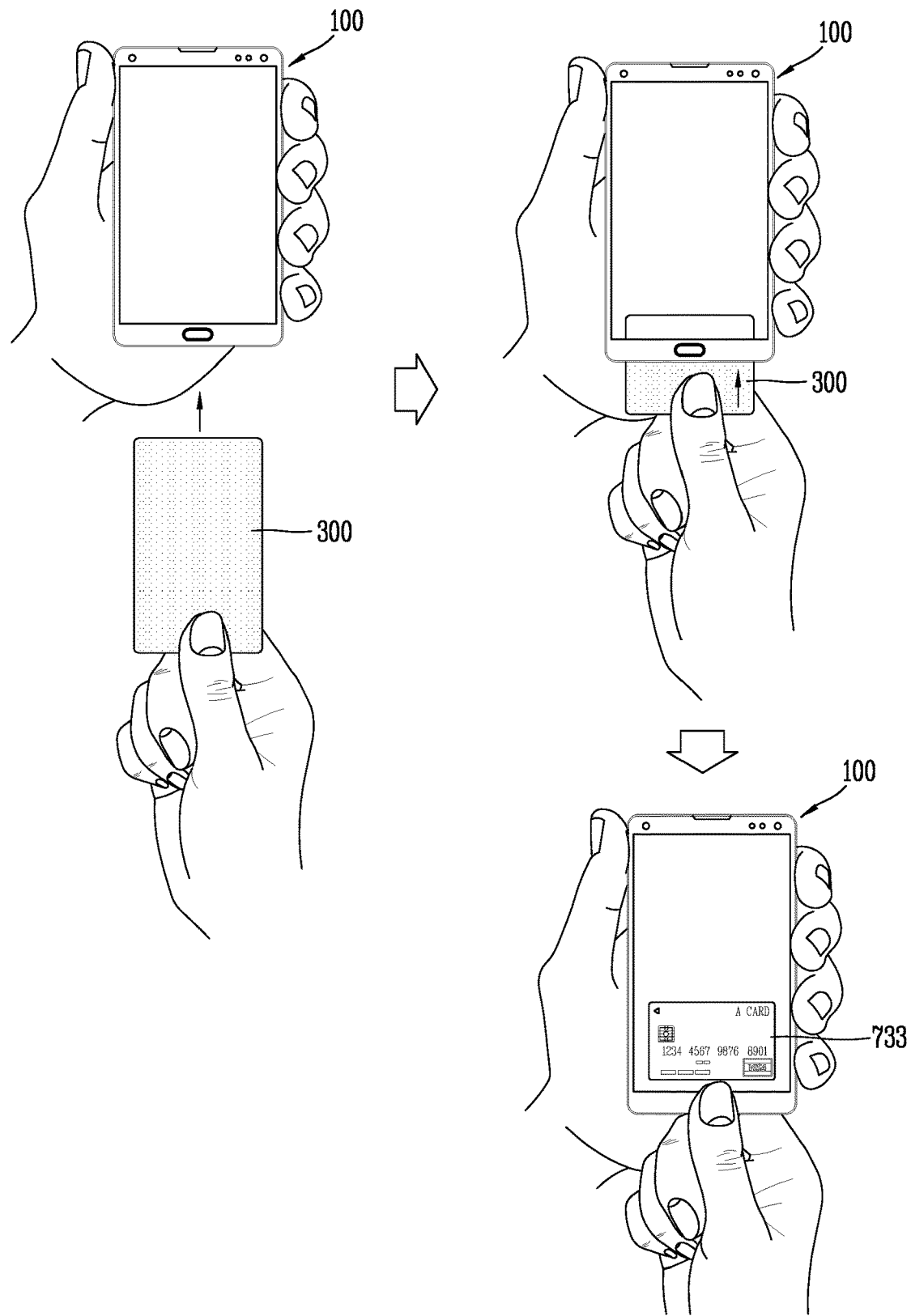

FIGS. 15A to 15C are conceptual diagrams illustrating a control method of the card module of FIG. 14A. Referring to FIG. 15A, the display unit 151 displays a fingerprint input part 710a for detecting a fingerprint in one region. The display unit 151 outputs first screen information 710 including content items 711 corresponding to a plurality of pieces of card information.

After user authentication is completed by sensing the user's fingerprint at the fingerprint input part 710a, when a specific type of touch is applied, the controller outputs second screen information 720 including first to third content items 721, 722, and 723 corresponding to a plurality of pieces of card information registered by the user. Among the first to third content items 721, 722, and 723, the first content item 721 currently applied to the card module 300 is disposed at a lowermost end of the display unit 151. Since the card module 300 is disposed in a region overlapping the lower end of the display unit 151, the user may intuitively recognize that the content item disposed at the lower end of the display unit 151 is applied to the card module 300.

When the card module 300 is sensed to be drawn out from the terminal body the controller 180 controls the display unit 151 to change the output state of the first content item 721 accordingly. That is, the display unit 151 outputs the first content item 721 by a degree to which the card module 300 remains in the terminal body. The first content item 721 preferably has the same image as that of an actual plastic card.

When the card module 300 is drawn out from the terminal body by a specific range or greater, the display unit 151 may output card information 730 of the first content item 721 applied to the card module 300. The card information 730 may include a card name, an expiration date, user information, usage details, coupon information that may be used together, and the like. Here, the specific range is set to such a degree that the card module 300 may be brought into contact with the payment device.

According to the present embodiment, when a card is drawn out for use of the card module 300, content items to be applied to the card module is output to be easily recognized and card information applied immediately before use of the card module is provided, thereby inducing the user to accurately use the card.

Referring to FIG. 15B, when the card module 300 is drawn out by more than the specific range, the controller 180 controls the display unit 151 to output the card information 731 together with one region of content item applied to the card module 300.

When a touch is applied to the one region of the content item, the display unit 151 outputs additional content item 732 corresponding to card information available to be used together with card information of the selected content item. The controller 180 may apply the additional content item 732 to the card module by a touch applied to the additional content item 732.

Referring to FIG. 15C, when the card module 300 is completely separated from the terminal body 300 and then inserted into the terminal body 300, the display unit 151 may output an image based on a degree to which the card module 300 is inserted into the terminal body 300. Here, the image may be content item corresponding to card information applied to the card module 300.

The image 733 may be implemented to have the same image as that of the actual plastic card, but is not limited thereto. Or, the image may include a record in which the card information has been used by the card module 300.

Accordingly, the user may check the card information and usage details of the card information which have not been provided while the card module is completely separately used.

Figure 16:
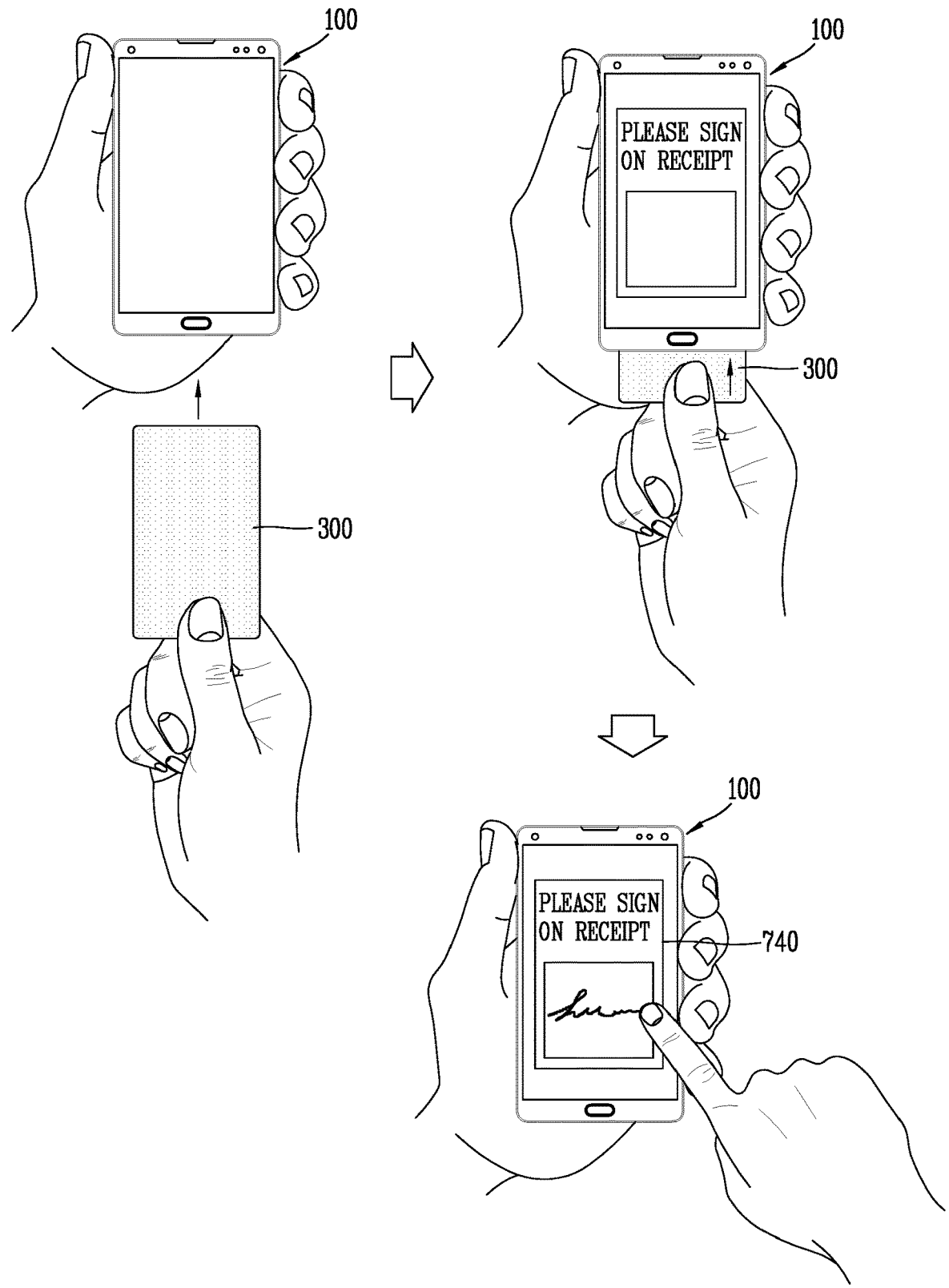
FIG. 16 is a conceptual diagram illustrating a control method for inputting additional authentication information when a card module is used in a detached state.

FIG. 16 illustrates a control method for inputting additional authentication information when the card module is used in a detached state. Referring to FIG. 14A, the card module 300 may be detached from the terminal body and brought into contact with the payment device.

If additional authentication information is required to complete the payment procedure, the controller 180 receives payment information when the card module 300 is switched to an accommodated state (or housed state). The display unit 151 outputs an input window 740 for receiving the additional authentication information according to the payment information. The display unit 151 may output the payment information together with the input window 740.

The controller 180 may form signature information based on a touch applied to the input window 740. Alternatively, the controller 180 may receive fingerprint information through the input window 740.

FIGS. 17A to 17E illustrate a control method according to an embodiment in which the card module is detachable.

Figure 17A:
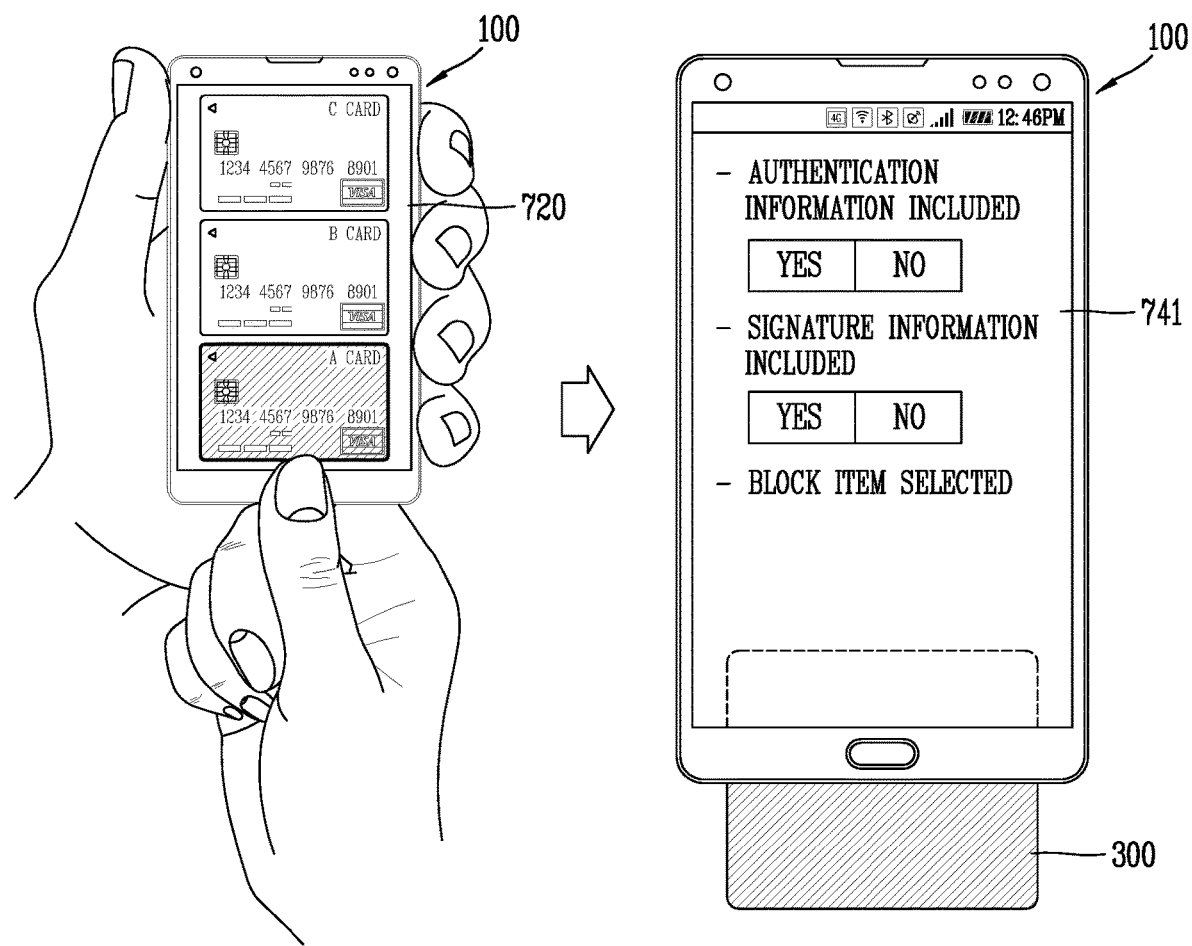
FIGS. 17A to 17E are conceptual diagrams illustrating a control method according to an embodiment in which a card module is detachable.

Referring to FIG. 17A, in a state in which the second screen information 720 displaying a selected content item is output, when the card module is drawn out by more than a predetermined range, the controller 180 outputs a setting screen 741 for selecting additional information to be applied.

For example, the setting screen 741 may selectively apply authentication information and signature information when the card module is detached from the terminal body. In addition, when the card information of the selected content item includes a plurality of functions, it is possible to apply a control command that interrupts at least one function.

Accordingly, if the card module is detached and placed in a state in which someone else may use the card module, restrictions on use of the card module may be applied, thereby preventing misuse of the card module.

Figure 17B:
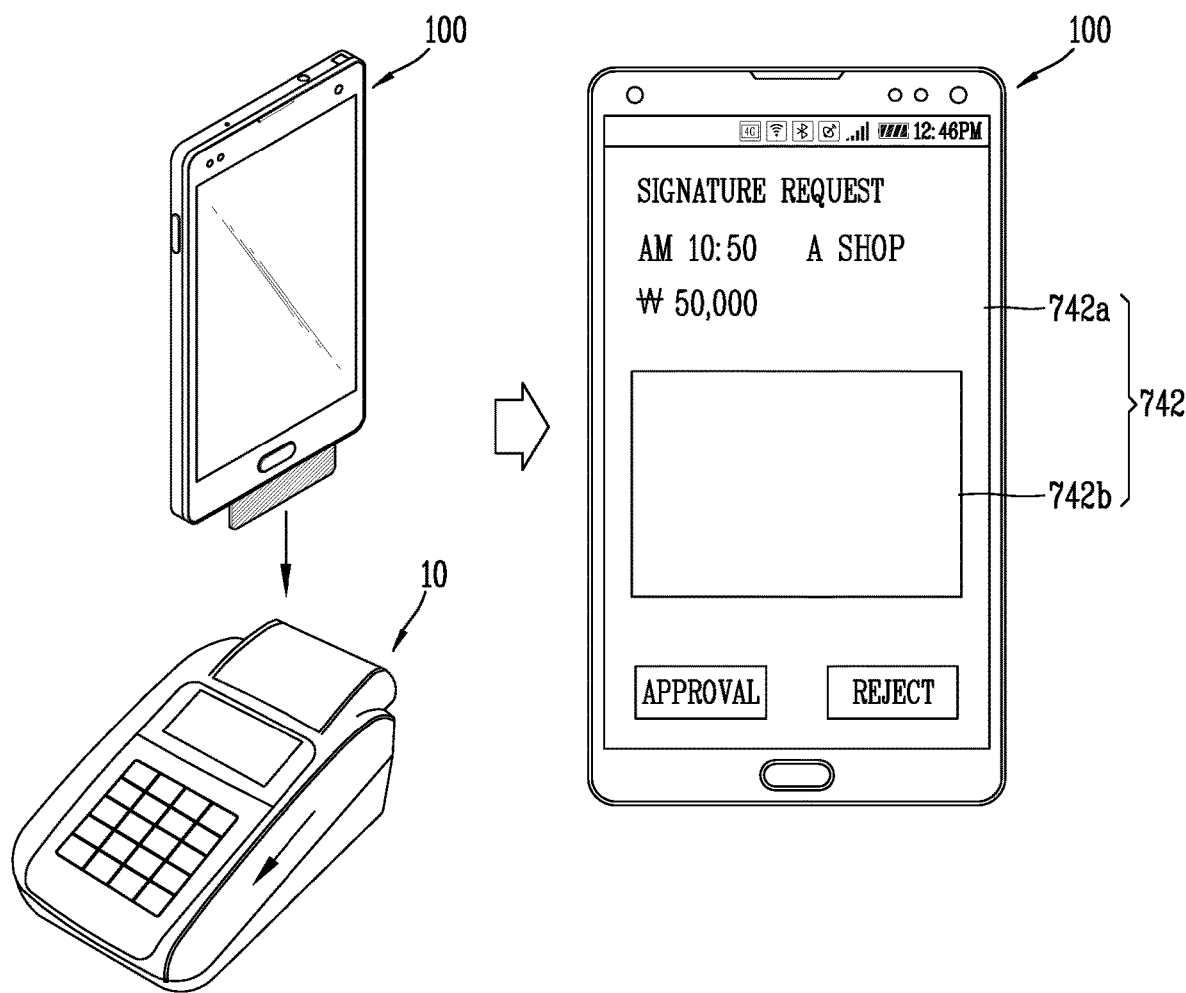

Referring to FIG. 17B, in a state in which the card module 300 is drawn out from the terminal body to expose a portion thereof, when the card module 300 is in contact with the payment device, payment information is formed. When the payment information is received, the controller 180 controls the display unit 151 to output additional information screen 742. The additional information screen 742 includes payment information 742a and an input window 742b.

When the user uses the card module in a state in which the card module is mounted in the terminal body, the user may check payment information in real time and input additional information through the display unit 151.

Figure 17C:
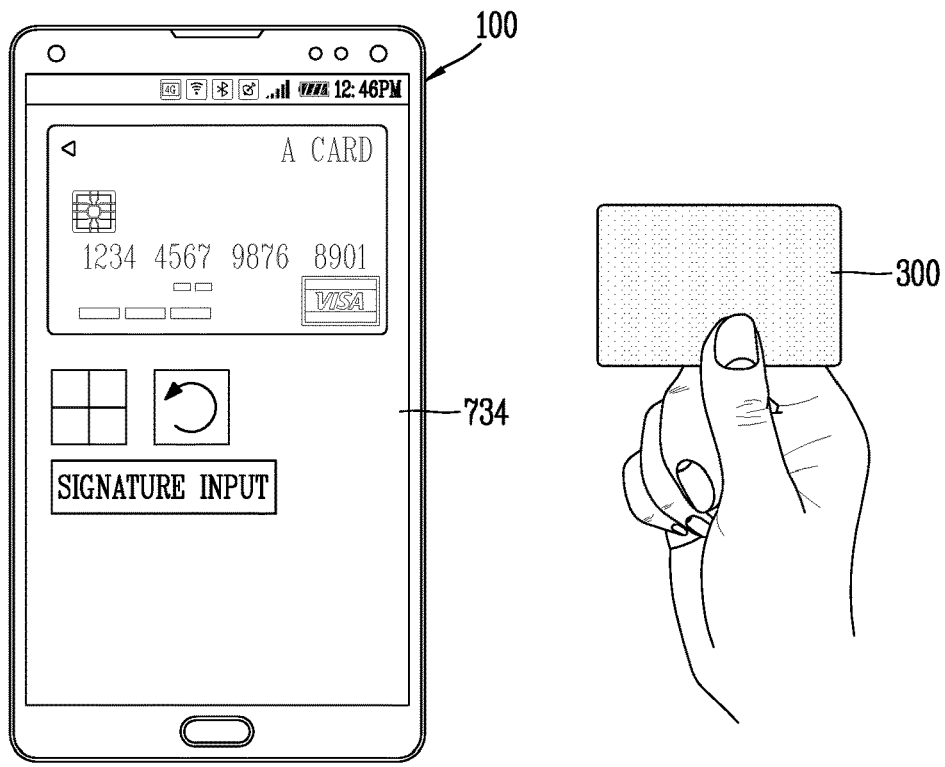
Figure 17C:
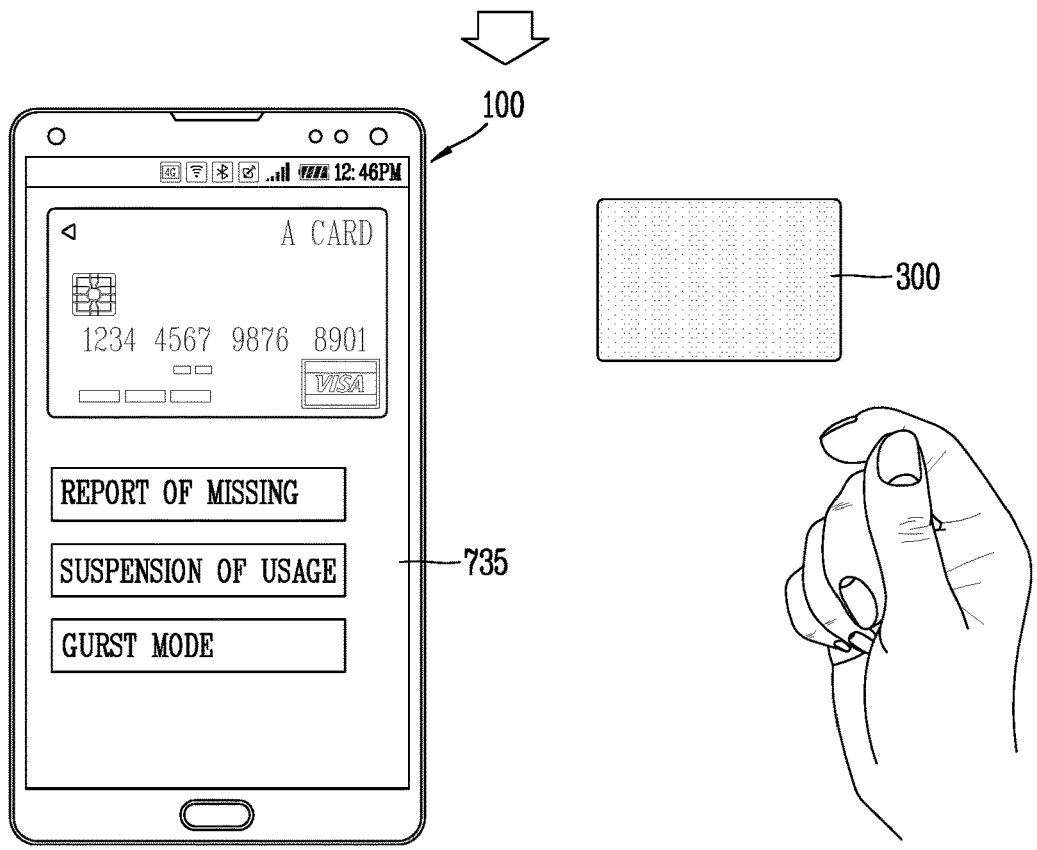

Referring to FIG. 17C, the card module 300 may include a touch sensor or a fingerprint sensor for sensing a touch of a user's hand. When the contact with the user's hand is released, the card module transmits corresponding information to the mobile terminal.

While the contact state of the card module with the user's hand is maintained, the controller 180 outputs a first image 734 including information on the use of the card module. The first image 734 may include an image of the card and graphic images for receiving a signature or adding content item to be used together with the card.

When information indicating that the contact between the card module and the user's hand is released is received, the controller 180 outputs a second image 735 for interrupting the use of the card module. The second image 735 may include a graphical image for selecting reporting missing of the card module, deactivating the card module, and switching to a guest mode.

Figure 17D:
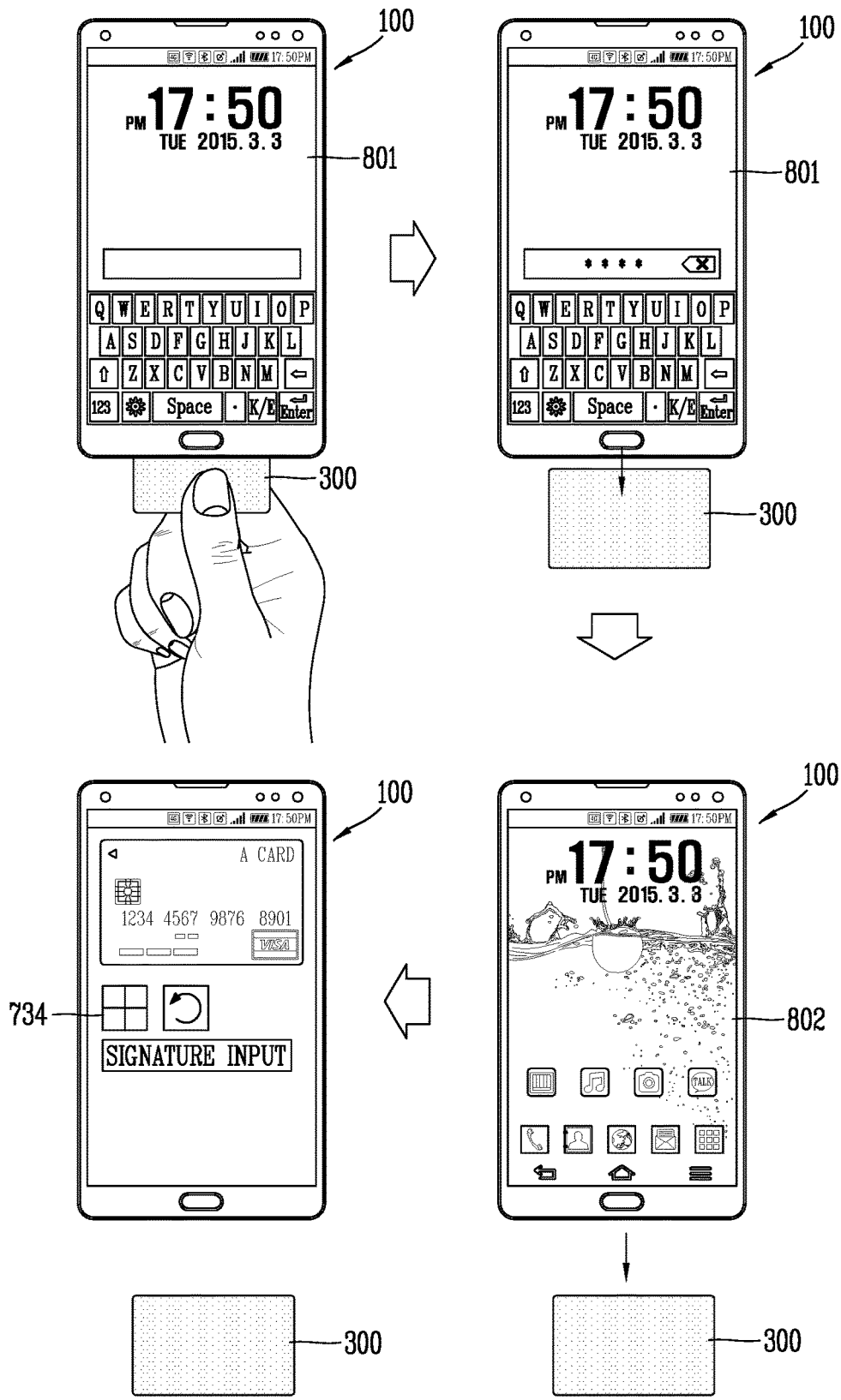

Referring to FIG. 17D, the controller 180 performs user authentication based on the fingerprint sensor mounted on the outside of the terminal body, and draws out the card module 300.

When the card module 300 is drawn out from the terminal body in a locked state of the mobile terminal, the controller 180 may release the locked state. That is, when the card module 300 is drawn out from the terminal body, the display unit 151 switches a lock screen 801 to a home screen page 802 (or an execution screen of a specific function).

If a control command is not applied to the display unit 151, the controller 180 controls the display unit 151 to output the first image 734 related to the use of the card module.

That is, when user authentication for the use of the card module is completed, the locked state is also released to use the mobile terminal, so that the user does not need to perform the authentication process, separately.

Figure 17E:
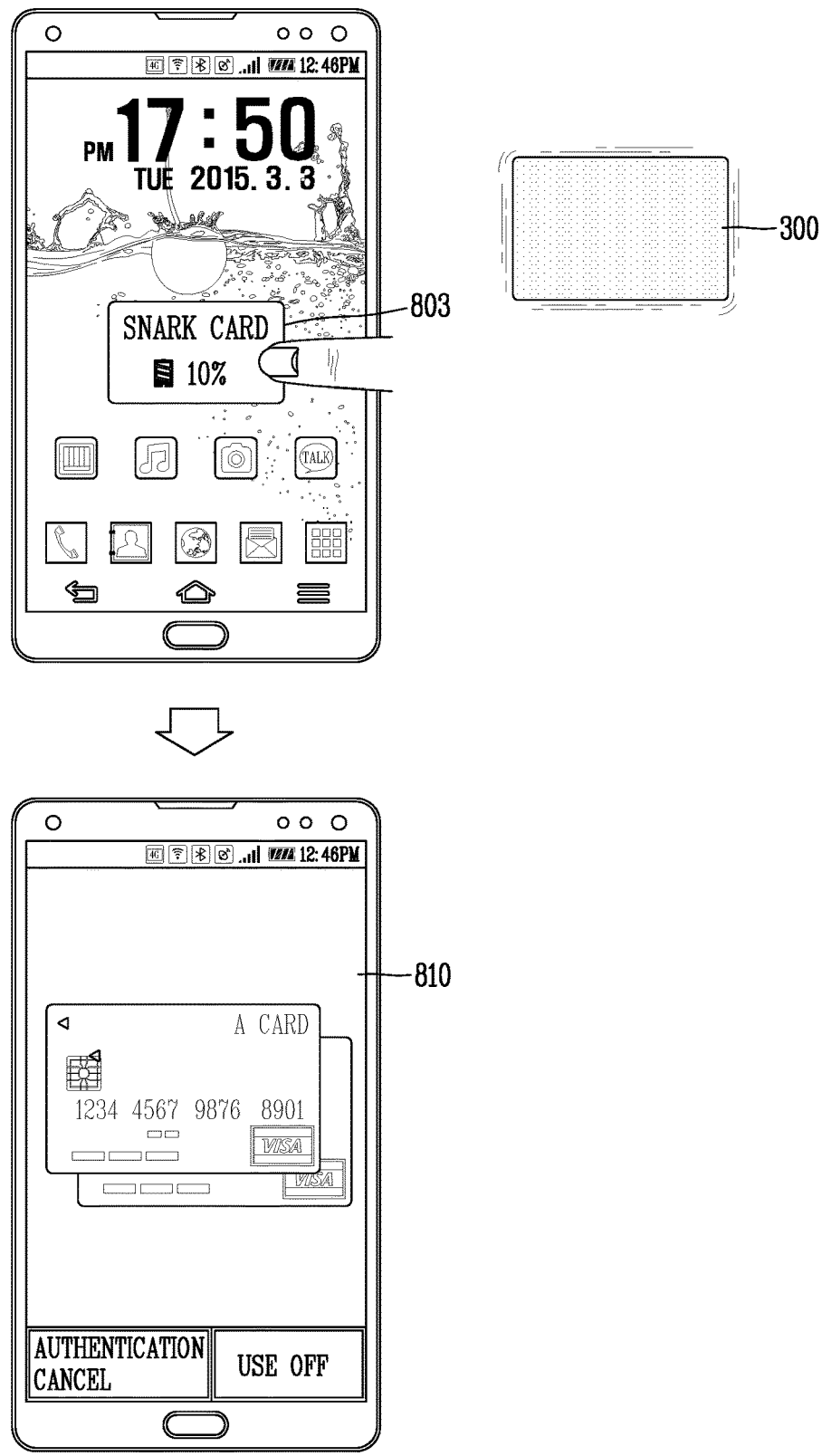

Referring to FIG. 17E, the card module 300 may include a battery. The card module 300 may store the selected card information and transmit or store payment details based on power provided by the battery. The battery may be charged while the card module 300 is accommodated in the terminal body.

The controller 180 may receive the low power state information of the battery, and the display unit 151 outputs low power information 803.

Based on a touch applied to the low power information 803, the controller 180 controls the display unit 151 to output the card information 810 applied to the card module 300. The controller 180 may restrict the use of the card or change the applied card information based on the touch applied to the applied card information 810.

Figure 18A:
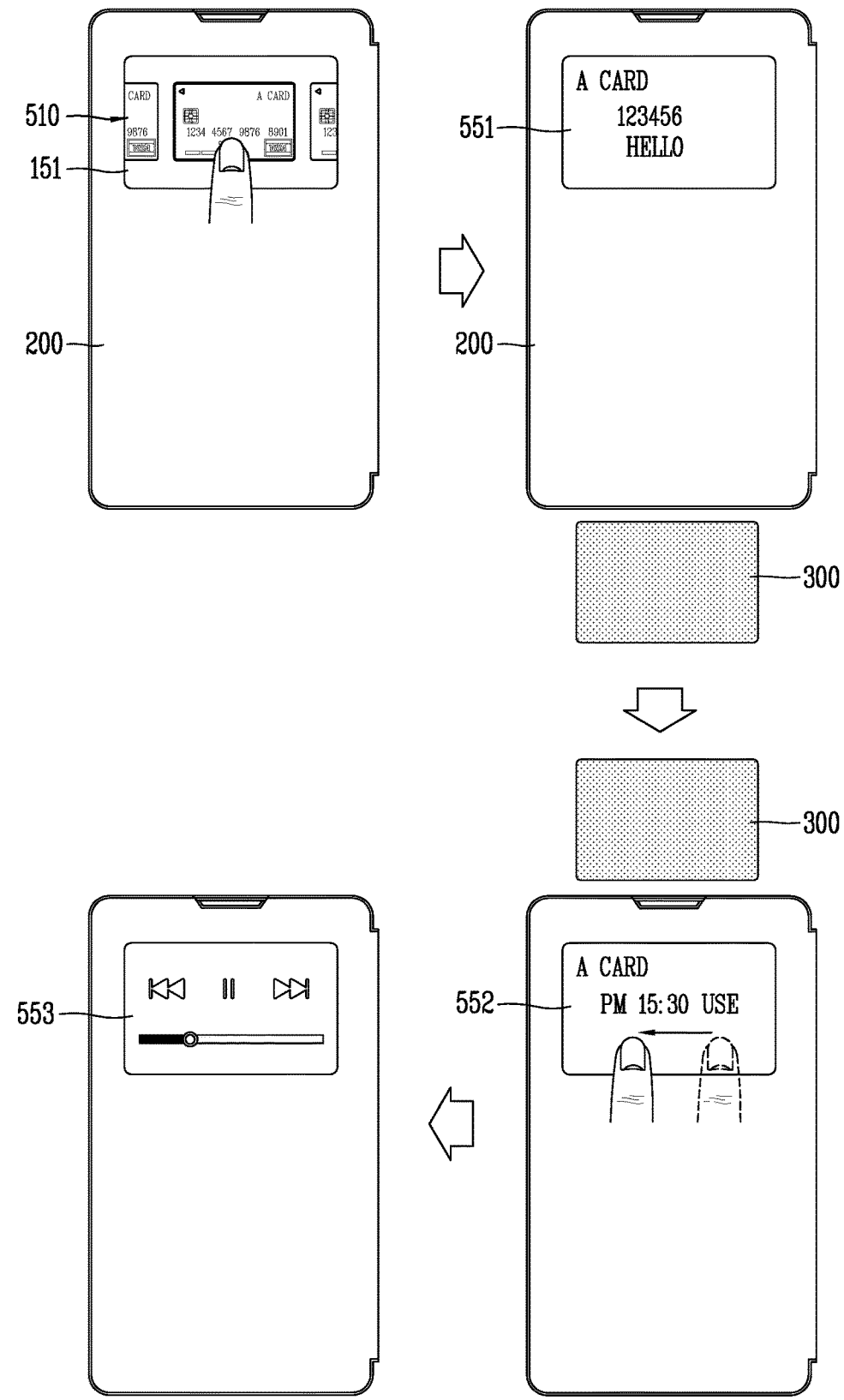
FIGS. 18A and 18B are conceptual diagrams illustrating a control method of a card module received in a cover according to another embodiment.
Figure 18B:
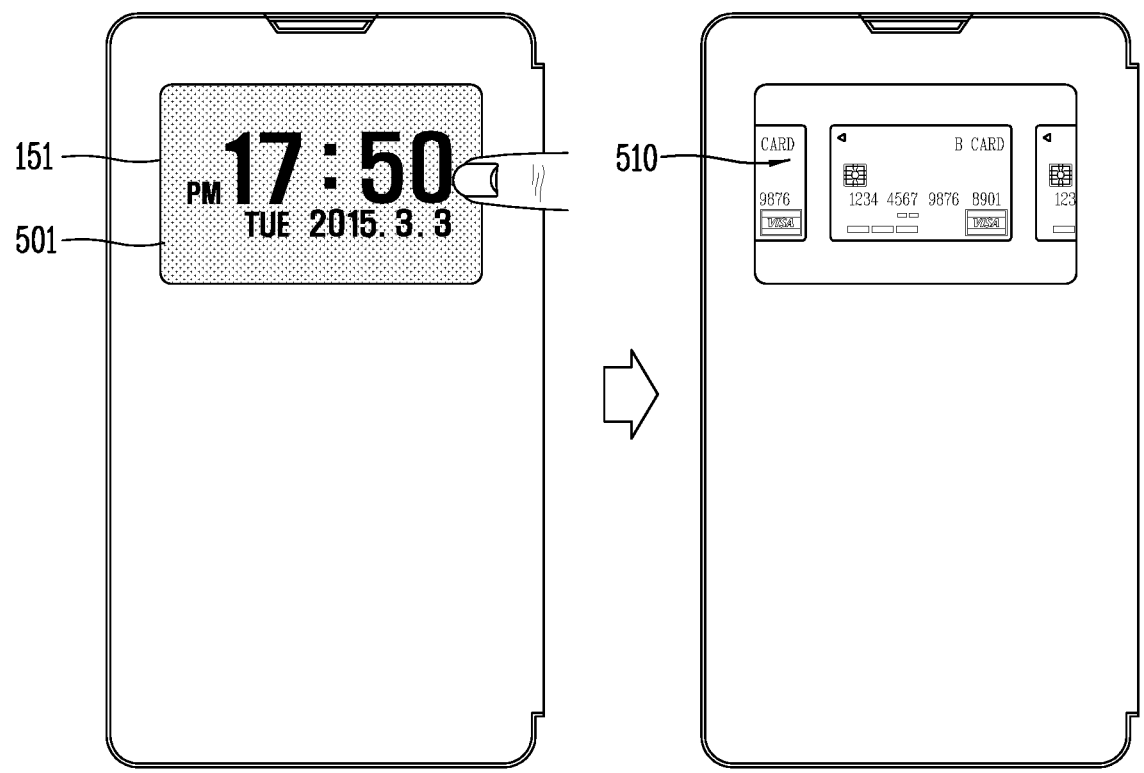

FIGS. 18A and 18B are conceptual diagrams illustrating a control method of a card module accommodated in the cover according to another embodiment.

Referring to FIG. 18A, the card module 300 is accommodated in an internal space of the cover 200 so as to overlap the opening region of the cover 200. The card module 300 may be made of a transparent material or may include a display module.

When one content item is selected in a state in which first screen information 510 including a plurality of content items is output on the display unit 151, information 551 of the selected content item is output.

When it is sensed that the card module 300 is separated from the cover 200, the controller 180 controls the display unit 151 to output payment information 552 of the card module 300. Meanwhile, in a state in which the card module 300 is separated, the display unit 151 may output an execution screen of another application.

Referring to FIG. 18B, the card module 300 includes a display module, and may be made of a light-transmissive material.

The display unit 151 may output visual information 501 penetrating through the transparent card module 300. In this state, when a touch is applied to the display module of the card module 300, the display module may output the first screen information 510 including a plurality of content items.

Accordingly, the display module of the card module may output visual information for use of the card module, when necessary.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

INDUSTRIAL APPLICABILITY

The embodiments of the present disclosure relates to the mobile terminal with enhanced security regarding the use of a card stored therein and may be applied to various industrial fields including a card payment function.

The invention claimed is:

1. A mobile terminal comprising:
a terminal body;
a memory storing at least one piece of card information;
a display unit provided on one surface of the terminal body and displaying screen information including at least one content item corresponding to the at least one piece of card information;
a card module provided to be withdrawable from the terminal body; and
a controller selecting the at least one content item based on a touch applied to the screen information and applying the at least one piece of card information corresponding to the selected at least one content item to the card module,
wherein when the screen information includes a plurality of content items corresponding to a plurality of pieces of card information and arranged in a first direction, the controller switches content items displayed on the display unit on the basis of a touch applied in the first direction, selects a second content item as one of the plurality of content items on the basis of a touch applied in a second direction toward an accommodation region of the card module on the display unit, different from the first direction, applies the selected second content item to the card module, and controls the card module to perform a card function using card information corresponding to the selected second content item,
wherein while the card module is performing the card function using the card information corresponding to the selected second content item, the display unit displays the image in which the second content item is inserted into the card module,
wherein the terminal body includes a cover provided to open and close the display unit,
wherein the cover has an opening region,
wherein the card module is accommodated in an internal space of the cover so as to overlap the opening region of the cover, is formed of a light-transmissive material, and includes a display module,
wherein the display unit outputs visual information penetrating through the transparent card module, and
wherein when a touch is applied to the display module of the card module, the display module of the card module outputs screen information including the plurality of content items.

2. The mobile terminal of claim 1, wherein
a partial region of the display unit is exposed through the opening region in a closed state in which the cover covers the display unit.

3. The mobile terminal of claim 2, wherein
when the card module is drawn out from the terminal body, the display unit controls the controller to output the screen information through the opening region.

4. The mobile terminal of claim 3, wherein
in a state in which the card module is accommodated in the terminal body, one region of the card module is exposed to an outside, and
the card module is configured to be drawn out by an external force.

5. The mobile terminal of claim 4, wherein
the card module includes a first region in which a magnetic part including payment information is provided and a second region exposed to the outside in the accommodated state and moved by the external force.

6. The mobile terminal of claim 1, further comprising:
a fingerprint sensor sensing a fingerprint on one surface of the terminal body; and
an elastic part installed inside the terminal body and configured to move the card module,
wherein when user authentication is completed by the sensed fingerprint in a state in which the card module is accommodated in the terminal body, the controller controls the elastic part to draw out one region of the card module.

7. The mobile terminal of claim 6, wherein
when one region of the card module is drawn out to the outside in a locked state in which controlling by a touch applied to the display unit is partially limited, the controller releases the locked state.

8. The mobile terminal of claim 7, wherein
when the card module is separated from the terminal body, the controller controls the display unit to output an image including information regarding use of the card module.

9. The mobile terminal of claim 7, wherein
when a plurality of the content items are selected, the controller determines whether the plurality of pieces of card information corresponding to the plurality of card items can be used together.

10. The mobile terminal of claim 1, wherein
before or after the card module is brought into contact with a payment device, the controller controls the display unit to output an additional authentication screen for receiving additional authentication information.

11. The mobile terminal of claim 10, wherein
the controller forms a signature image on the basis of a trace of a touch applied to the additional authentication screen, and transmits the signature image, as additional authentication information, to the payment device.

12. The mobile terminal of claim 1, wherein
the display unit displays the selected at least one content item in one region overlapping the accommodation region of the card module, and
the controller controls the display unit such that at least one region of the selected at least one content item disappears on the basis of a degree to which the card module is drawn out.

13. The mobile terminal of claim 1, wherein
when the card module is drawn out, the controller controls the display unit to output a setting screen for setting additional authentication information to be applied to the card module together with card information of the selected at least one content item.

14. The mobile terminal of claim 1, wherein
the card module is formed to be separable from the terminal body and includes a battery charged in a state of being accommodated in the terminal body, and
when a low power state of the battery is received, the controller controls the display unit to output information regarding the low power state of the battery.

15. The mobile terminal of claim 14, wherein
the card module further includes a touch sensor, and
the controller receives information regarding a user's touch input by the touch sensor, and when the touch input is released, the controller controls the display unit to output screen information for interrupting use of the card module, and
the screen information includes card information applied to the card module and a plurality of icons for reporting missing of the card module, deactivating the card module, and switching a mode.

16. The mobile terminal of claim 1, further comprising:
a location sensing unit sensing a location of the terminal body,
wherein the controller controls the display unit to output recommended content item based on sensed location information.

17. The mobile terminal of claim 1, wherein representative information including a card name, an expiration date of the card information corresponding to the second content item is displayed in a remaining region of the second content item displayed on the display unit, and
wherein as a region in which the second content item is output is changed, a portion of the second content item disappears from the display unit.

18. A method for controlling a mobile terminal including a terminal body and a card module installed to be withdrawable by the terminal body, the method comprising:
controlling a display unit to output screen information including at least one content item corresponding to at least one piece of card information;
applying a selected content item to the card module;
when the card module is brought into contact with a payment device, performing a payment function using card information corresponding to the selected content item; and
outputting a result in accordance with the performing of the payment function,
when the screen information includes a plurality of content items corresponding to a plurality of pieces of card information and arranged in a first direction, switching content items displayed on the display unit on the basis of a touch applied in the first direction;
selecting a second content item as one of the plurality of content items on the basis of a touch applied in a second direction toward an accommodation region of the card module on the display unit, different from the first direction, and applying the selected second content item to the card module;
controlling the card module to perform a card function using card information corresponding to the selected second content item; and
while the card module is performing the card function using the card information corresponding to the selected content item, controlling the display unit to display the image in which the second content item is inserted into the card module,
wherein the terminal body includes a cover provided to open and close the display unit,
wherein the cover has an opening region,
wherein the card module is accommodated in an internal space of the cover so as to overlap the opening region of the cover, is formed of a light-transmissive material, and includes a display module,
wherein the display unit output visual information penetrating through the transparent card module, and
wherein when a touch is applied to the display module of the card module, the display module of the card module outputs screen information including the plurality of content items.

19. The method of claim 18, further comprising:
receiving authentication information to draw out the card module from the terminal body.

* * * * *